United States Patent
Arimilli et al.

(10) Patent No.: US 6,515,984 B1
(45) Date of Patent: *Feb. 4, 2003

(54) DATA/VOICE/FAX COMPRESSION MULTIPLEXER

(75) Inventors: Harinarayana Arimilli, Coon Rapids, MN (US); Ashish A. Thanawala, Saratoga, CA (US); Vasant Kumar Kanchan, Sunnyvale, CA (US)

(73) Assignee: Multi-Tech Systems, Inc., Mounds View, MN (US)

( * ) Notice: Subject to any disclaimer, the term of this patent is extended or adjusted under 35 U.S.C. 154(b) by 14 days.

This patent is subject to a terminal disclaimer.

(21) Appl. No.: 09/711,754

(22) Filed: Nov. 13, 2000

Related U.S. Application Data

(63) Continuation of application No. 08/903,032, filed on Jul. 29, 1997, now Pat. No. 6,151,333, which is a continuation of application No. 08/229,958, filed on Apr. 19, 1994, now Pat. No. 5,682,386.

(51) Int. Cl.$^7$ .......................... H04L 12/66; H04L 12/28
(52) U.S. Cl. ...................... 370/352; 370/40.1; 379/90.3
(58) Field of Search ................................ 370/352, 353, 370/354, 355, 356, 401; 379/93

(56) References Cited

U.S. PATENT DOCUMENTS

| 3,304,372 A | 2/1967 | Filipowsky et al. ........... 179/2 |
| 3,781,818 A | 12/1973 | Pardoe et al. ............. 340/172.5 |
| 3,789,165 A | 1/1974 | Campanella et al. .... 179/170.2 |

(List continued on next page.)

FOREIGN PATENT DOCUMENTS

| CA | 2104701 | 7/1994 | ............. H04L/5/22 |
| DE | 3504064 | 8/1986 | ........... G08C/21/00 |
| DE | 3630469 | 3/1988 | ............. G06F/3/03 |
| DE | 3409532 | 4/1989 | |

(List continued on next page.)

OTHER PUBLICATIONS

U.S. Patent Application Serial No. 08/338,340, filing date Nov. 10, 1994, entitled: Computer–Based Multifunctional Personal Communication System With Caller ID.
AT&T Moden Designer's Guide, AT&T Microelectroncis, (Oct. 25, 1993).
Bellcore Technical Reference TR–NWT–000030, Issue 2, (Oct. 1992).

(List continued on next page.)

Primary Examiner—Huy D. Vu
Assistant Examiner—Steven Nguyen
(74) Attorney, Agent, or Firm—Schwegman, Lundberg, Woessner & Kluth, P.A.

(57) ABSTRACT

A data multiplexing network is described which multiplexes a plurality of asynchronous data channels with an asynchronous data stream representing compressed voice signals and/or facsimile signals onto a single synchronous data packet stream. The single synchronous data packet stream is then transmitted by a high speed statistical multiplexer over a composite link to a second site using a modified high-level synchronous data link control protocol with an overlay of a priority statistical multiplexing algorithm. The asynchronous data channels and the compressed voice channel and/or facsimile signals are demultiplexed and reconstructed for sending to other asynchronous computer terminals and to a standard telephone or facsimile analog port at the second site, respectively. PBX trunk interfaces are also provided to allow PBX's to share the composite link between sites. Communication between the first site by voice or facsimile and the second site is transparent to the users. The multiplexer efficiently allocated the bandwidth of the composite link by detecting silence periods in the voice signals and suppressing the sending of the voice information to preserve bandwidth.

The transmission of facsimile information is performed by decoding the fax transmissions, sending only the facsimile image packets over the multiplexed composite link and reassembling, with carrier, the facsimile signals at the remote site for transmission over an analog telephone line to a remote facsimile machine.

24 Claims, 57 Drawing Sheets

U.S. PATENT DOCUMENTS

| | | | |
|---|---|---|---|
| 3,904,830 A | 9/1975 | Every, Sr. et al. | 179/18 FH |
| 3,973,081 A | 8/1976 | Hutchins | 179/1 SA |
| 3,973,089 A | 8/1976 | Puckette | 179/170 |
| 3,997,732 A | 12/1976 | Every, Sr. et al. | 179/18 |
| 4,074,081 A | 2/1978 | Humm | 179/84 |
| 4,100,377 A | 7/1978 | Flanagan | 179/15 AS |
| 4,751,736 A | 6/1988 | Gupta et al. | 381/31 |
| 4,757,527 A | 7/1988 | Beniston et al. | 379/410 |
| 4,760,595 A | 7/1988 | Arai | 379/385 |
| 4,761,646 A | 8/1988 | Choquet et al. | 340/825.52 |
| 4,761,781 A * | 8/1988 | Calvignac et al. | |
| 4,764,955 A | 8/1988 | Galand et al. | 379/411 |
| 4,771,425 A * | 9/1988 | Baran et al. | |
| 4,794,595 A | 12/1988 | Ohyama | 370/110.1 |
| 4,804,957 A | 2/1989 | Selph | 340/870 |
| 4,807,250 A | 2/1989 | Tanaka | 375/28 |
| 4,809,271 A | 2/1989 | Kondo et al. | 370/111 |
| 4,813,040 A | 3/1989 | Futato | 370/111 |
| 4,827,085 A | 5/1989 | Yaniv et al. | 178/18 |
| 4,835,765 A | 5/1989 | Bergmans et al. | 370/32.1 |
| 4,839,802 A | 6/1989 | Wonak et al. | 364/200 |
| 4,845,746 A | 7/1989 | Li | 379/411 |
| 4,847,900 A | 7/1989 | Wakim | 379/424 |
| 4,862,449 A | 8/1989 | Hoefkens et al. | 370/32.1 |
| 4,864,559 A | 9/1989 | Perlman | 370/60 |
| 4,866,732 A | 9/1989 | Carey et al. | 375/1 |
| 4,873,715 A | 10/1989 | Shibata | 379/93 |
| 4,884,264 A | 11/1989 | Servel et al. | 370/58.1 |
| 4,887,265 A | 12/1989 | Felix | 370/94.1 |
| 4,890,282 A | 12/1989 | Lambert et al. | 370/79 |
| 4,890,316 A | 12/1989 | Walsh et al. | 379/98 |
| 4,901,333 A | 2/1990 | Hodgkiss | 375/98 |
| 4,905,282 A | 2/1990 | Mcglynn et al. | 380/48 |
| 4,912,756 A | 3/1990 | Hop | 379/60 |
| 4,912,758 A | 3/1990 | Arbel | 379/388 |
| 4,914,650 A | 4/1990 | Sriram | 370/60 |
| 4,926,416 A | 5/1990 | Weik | 370/60.1 |
| 4,926,448 A | 5/1990 | Kraul et al. | 375/121 |
| 4,932,048 A | 6/1990 | Kenmochi et al. | 379/67 |
| 4,935,954 A | 6/1990 | Thompson et al. | 379/89 |
| 4,942,569 A | 7/1990 | Maeno | 370/60 |
| 4,953,210 A | 8/1990 | Mcglynn et al. | 380/48 |
| 4,965,789 A | 10/1990 | Bottau et al. | 370/79 |
| 4,972,457 A | 11/1990 | O'Sullivan | 379/59 |
| 4,972,462 A | 11/1990 | Shibata | 379/89 |
| 4,972,483 A | 11/1990 | Carey | 381/31 |
| 4,977,591 A | 12/1990 | Chen et al. | 379/410 |
| 4,987,586 A | 1/1991 | Gross et al. | 379/93 |
| 4,991,169 A | 2/1991 | Davis et al. | 370/77 |
| 4,993,022 A | 2/1991 | Kondo et al. | 370/79 |
| 4,995,059 A | 2/1991 | Ishikawa | 375/27 |
| 4,996,706 A | 2/1991 | Cho | 379/93 |
| 4,998,241 A | 3/1991 | Brox et al. | 370/32.1 |
| 5,001,710 A | 3/1991 | Gawrys et al. | 370/110.1 |
| 5,001,745 A | 3/1991 | Pollock | 379/96 |
| 5,005,183 A | 4/1991 | Carey et al. | 375/1 |
| 5,008,901 A | 4/1991 | Wallach et al. | 375/8 |
| 5,008,926 A | 4/1991 | Misholi | 379/89 |
| 5,014,232 A | 5/1991 | Andre | 364/724.19 |
| 5,020,058 A | 5/1991 | Holden et al. | 370/109 |
| 5,025,443 A | 6/1991 | Gupta | 370/76 |
| 5,036,513 A | 7/1991 | Greenblatt | 370/125 |
| 5,044,010 A | 8/1991 | Frenkiel et al. | 379/61 |
| 5,046,188 A | 9/1991 | Molnar | 379/94 |
| 5,051,720 A | 9/1991 | Kittirutsunetorn | 340/310 |
| 5,054,055 A | 10/1991 | Hanle et al. | 379/142 |
| 5,062,133 A | 10/1991 | Melrose | 379/94 |
| 5,065,425 A | 11/1991 | Lecomte et al. | 379/93 |
| 5,081,647 A | 1/1992 | Bremer | 375/38 |
| 5,083,310 A | 1/1992 | Drory | 381/30 |
| 5,086,471 A | 2/1992 | Tanaka et al. | 381/36 |
| 5,099,472 A | 3/1992 | Townsend et al. | 370/32.1 |
| 5,107,519 A | 4/1992 | Ishikawa | 375/27 |
| 5,115,429 A | 5/1992 | Hluchyj et al. | 370/84 |
| 5,121,385 A | 6/1992 | Tominaga et al. | 370/80 |
| 5,127,001 A | 6/1992 | Steagall et al. | 370/62 |
| 5,127,041 A | 6/1992 | O'Sullivan | 379/59 |
| 5,127,046 A | 6/1992 | Malm | 379/98 |
| 5,130,985 A | 7/1992 | Kondo et al. | 370/94.1 |
| 5,132,966 A | 7/1992 | Hayano et al. | 370/79 |
| RE34,034 E | 8/1992 | O'Sullivan | 379/59 |
| 5,136,586 A | 8/1992 | Greenblatt | 370/110.4 |
| 5,138,662 A | 8/1992 | Amano et al. | 381/36 |
| 5,146,470 A | 9/1992 | Fujii et al. | 375/103 |
| 5,150,410 A | 9/1992 | Bertrand | 370/62 |
| 5,151,937 A | 9/1992 | Chujo et al. | 379/410 |
| 5,153,897 A | 10/1992 | Sumiyoshi et al. | 375/8 |
| 5,162,812 A | 11/1992 | Aman et al. | 375/34 |
| 5,164,982 A | 11/1992 | Davis | 379/96 |
| 5,177,734 A | 1/1993 | Cummiskey et al. | 370/32.1 |
| 5,182,762 A | 1/1993 | Shirai et al. | 375/122 |
| 5,187,591 A | 2/1993 | Guy et al. | 358/425 |
| 5,187,692 A | 2/1993 | Haneda et al. | 367/135 |
| 5,193,110 A | 3/1993 | Jones et al. | 379/94 |
| 5,195,130 A | 3/1993 | Weiss et al. | 379/90 |
| 5,206,900 A | 4/1993 | Callele | 379/142 |
| 5,208,812 A | 5/1993 | Dudek et al. | 370/100.1 |
| 5,208,850 A | 5/1993 | Kino | 379/88 |
| 5,214,656 A | 5/1993 | Chung et al. | 371/43 |
| 5,227,876 A | 7/1993 | Cucchi et al. | 358/133 |
| 5,228,026 A | 7/1993 | Albrow et al. | 370/29 |
| 5,233,660 A | 8/1993 | Chen | 381/38 |
| 5,235,595 A | 8/1993 | O'Dowd | 370/94.1 |
| 5,247,591 A | 9/1993 | Baran | 382/61 |
| 5,249,218 A | 9/1993 | Sainton | 379/59 |
| 5,258,983 A | 11/1993 | Lane et al. | 370/118 |
| 5,261,027 A | 11/1993 | Taniguchi et al. | 395/2 |
| 5,263,019 A | 11/1993 | Chu | 370/32.1 |
| 5,272,695 A | 12/1993 | Makino et al. | 370/32 |
| 5,276,703 A | 1/1994 | Budin et al. | 375/1 |
| 5,278,900 A | 1/1994 | Van Gerwen et al. | 379/410 |
| 5,280,479 A | 1/1994 | Mary | 370/85.6 |
| 5,282,197 A | 1/1994 | Kreitzer | 370/76 |
| 5,283,638 A | 2/1994 | Engberg et al. | 348/14 |
| 5,283,819 A | 2/1994 | Glick et al. | 379/90 |
| 5,289,539 A | 2/1994 | Maruyama | 379/410 |
| 5,295,136 A | 3/1994 | Ashley et al. | 370/32.1 |
| 5,297,203 A | 3/1994 | Rose et al. | 380/9 |
| 5,301,246 A | 4/1994 | Archibald et al. | 380/23 |
| 5,305,312 A | 4/1994 | Fornek et al. | 370/62 |
| 5,307,413 A | 4/1994 | Denzer | 380/49 |
| 5,309,562 A | 5/1994 | Li | 395/200 |
| 5,313,498 A | 5/1994 | Sano | 375/103 |
| 5,317,604 A | 5/1994 | Osterweil | 375/122 |
| 5,319,682 A | 6/1994 | Clark | 375/122 |
| 5,327,520 A | 7/1994 | Chen | 395/2.28 |
| 5,329,472 A | 7/1994 | Sugiyama | 364/724.19 |
| 5,333,196 A | 7/1994 | Jakab | 379/413 |
| 5,341,374 A | 8/1994 | Lewen et al. | 370/85.4 |
| 5,343,473 A | 8/1994 | Cidon et al. | 370/85.6 |
| 5,343,521 A | 8/1994 | Jullien et al. | 379/410 |
| 5,347,572 A | 9/1994 | Avni | 379/100 |
| 5,355,365 A | 10/1994 | Bhat et al. | 370/85.13 |
| 5,355,406 A | 10/1994 | Chencinski et al. | 379/88 |
| 5,365,577 A | 11/1994 | Davis et al. | 379/96 |
| 5,371,853 A | 12/1994 | Kao et al. | 395/2.32 |
| 5,377,260 A | 12/1994 | Long | 379/95 |
| 5,379,292 A | 1/1995 | Kurata et al. | 370/85.6 |
| 5,379,340 A | 1/1995 | Overend et al. | 379/93 |
| 5,381,412 A | 1/1995 | Otani | 370/84 |
| 5,384,780 A | 1/1995 | Lomp et al. | 370/94.1 |

| | | | |
|---|---|---|---|
| H1413 H | 2/1995 | Gunn | 375/8 |
| 5,388,150 A | 2/1995 | Schneyer et al. | 379/67 |
| 5,390,239 A | 2/1995 | Morris et al. | 379/93 |
| 5,390,250 A | 2/1995 | Janse et al. | 379/410 |
| 5,402,474 A | 3/1995 | Miller et al. | 379/93 |
| 5,406,557 A | 4/1995 | Baudion | 370/61 |
| 5,406,560 A | 4/1995 | Kondo et al. | 370/94.1 |
| 5,408,401 A | 4/1995 | Miyazaki | 363/21 |
| 5,408,522 A | 4/1995 | Ikehata et al. | 379/98 |
| 5,414,773 A | 5/1995 | Handelman | 380/49 |
| 5,414,796 A | 5/1995 | Jacobs et al. | 395/2.3 |
| 5,416,776 A | 5/1995 | Panzarella et al. | 370/85.11 |
| 5,425,089 A | 6/1995 | Chan et al. | 379/183 |
| 5,438,614 A | 8/1995 | Rozman et al. | 379/93 |
| 5,440,547 A | 8/1995 | Easki et al. | 370/60 |
| 5,440,698 A | 8/1995 | Sindhu et al. | 395/200.08 |
| 5,440,717 A | 8/1995 | Bosshart | 395/486 |
| 5,444,704 A | 8/1995 | Henderson et al. | 370/84 |
| 5,444,770 A | 8/1995 | Davis et al. | 379/99 |
| 5,448,555 A | 9/1995 | Bremer et al. | 370/20 |
| 5,452,289 A | 9/1995 | Sharma et al. | 370/32.1 |
| 5,453,986 A | 9/1995 | Davis et al. | 370/62 |
| 5,457,601 A | 10/1995 | Georgopulos et al. | 361/686 |
| 5,463,616 A | 10/1995 | Kruse et al. | 370/24 |
| 5,465,267 A | 11/1995 | Todoroki | 375/279 |
| 5,471,470 A | 11/1995 | Sharma et al. | 370/81 |
| 5,472,351 A | 12/1995 | Greco et al. | 439/353 |
| 5,473,676 A | 12/1995 | Frick et al. | 379/99 |
| 5,479,407 A | 12/1995 | Ko et al. | 370/94.1 |
| 5,479,475 A | 12/1995 | Grob et al. | 379/58 |
| 5,481,562 A | 1/1996 | Pearson et al. | 375/222 |
| 5,483,576 A | 1/1996 | Staples | 379/58 |
| 5,490,060 A | 2/1996 | Malec et al. | 364/401 |
| 5,493,609 A | 2/1996 | Winseck, Jr. et al. | 379/96 |
| 5,506,868 A | 4/1996 | Cox et al. | 375/222 |
| 5,506,900 A | 4/1996 | Fritz | 379/402 |
| 5,515,398 A | 5/1996 | Walsh et al. | 375/222 |
| 5,521,975 A | 5/1996 | Hashimoto | 379/382 |
| 5,526,423 A | 6/1996 | Ohuchi et al. | 379/67 |
| 5,532,898 A | 7/1996 | Price | 361/119 |
| 5,535,204 A | 7/1996 | Li | 370/76 |
| 5,546,448 A | 8/1996 | Caswell et al. | 379/142 |
| 5,600,649 A | 2/1997 | Sharma et al. | 370/435 |
| 5,619,508 A | 4/1997 | Davis et al. | 370/495 |
| 5,631,745 A | 5/1997 | Wong et al. | 358/434 |
| 5,644,629 A | 7/1997 | Chow | 379/142 |
| 5,675,640 A | 10/1997 | Tappert et al. | 379/373 |
| 5,682,386 A * | 10/1997 | Arimilli et al. | 370/468 |
| 5,699,410 A | 12/1997 | Imamura et al. | 379/67 |
| 5,699,417 A | 12/1997 | Khojasteh | 379/142 |
| 5,699,418 A | 12/1997 | Jones | 379/142 |
| 5,745,558 A | 4/1998 | Richardson, Jr. et al. | 379/189 |
| 6,009,082 A | 12/1999 | Caswell et al. | 370/276 |
| 6,151,333 A * | 11/2000 | Arimilli et al. | 370/468 |

FOREIGN PATENT DOCUMENTS

| | | | | |
|---|---|---|---|---|
| DE | 3490532 | 4/1989 | | H04M/11/00 |
| EP | 0364866 | 4/1990 | | H04L/5/16 |
| EP | 0429054 | 5/1991 | | H04L/29/06 |
| EP | 0443548 | 8/1991 | | G10L/9/14 |
| EP | 0488685 | 6/1992 | | H04Q/11/04 |
| EP | 0488865 | 6/1992 | | E01F/9/01 |
| EP | 0510411 | 10/1992 | | H04M/3/42 |
| EP | 0526104 | 2/1993 | | H04L/12/56 |
| EP | 0582537 | 2/1994 | | H04L/29/06 |
| EP | 0581528 | 5/1994 | | G06F/1/00 |
| EP | 0614305 | 9/1994 | | H04N/1/00 |
| EP | 0630141 | 12/1994 | | H04M/3/42 |
| EP | 0650286 | 4/1995 | | H04M/11/06 |
| GB | 2210237 | 6/1989 | | H04L/5/12 |
| GB | 2260670 | 4/1993 | | H04M/1/66 |
| GB | 2268663 | 1/1994 | | H04M/1/57 |
| JP | 59044140 | 3/1984 | | |
| JP | 59-081947 | 5/1984 | | H04L/11/20 |
| JP | 59-044140 | 7/1984 | | |
| JP | 63-019951 | 1/1988 | | |
| JP | 63-124658 | 5/1988 | | |
| JP | 63-054052 | 8/1988 | | H04M/11/06 |
| JP | 64-068052 | 3/1989 | | |
| JP | 1198144 | 8/1989 | | |
| JP | 02-034077 | 2/1990 | | H04M/1/66 |
| JP | 193489 | 7/1990 | | |
| JP | 257748 | 10/1990 | | |
| JP | 2246941 | 10/1990 | | A61B/8/00 |
| JP | 03-009643 | 1/1991 | | H04M/1/66 |
| JP | 03-153152 | 7/1991 | | H04M/3/42 |
| JP | 3162052 | 7/1991 | | H04M/1/66 |
| JP | 03-162052 | 7/1991 | | H04M/1/66 |
| JP | 03-237853 | 10/1991 | | H04M/3/38 |
| JP | 03-280797 | 12/1991 | | H04Q/5/00 |
| JP | 04-319847 | 11/1992 | | H04M/3/42 |
| WO | 91/07044 | 5/1991 | | H04M/11/00 |
| WO | 91/15067 | 10/1991 | | H04K/1/00 |
| WO | 92/06550 | 4/1992 | | H04M/11/00 |
| WO | 92/20028 | 11/1992 | | G06F/12/10 |
| WO | 93/11643 | 6/1993 | | H04N/11/00 |
| WO | 93/22869 | 11/1993 | | H04M/11/00 |
| WO | 94/26056 | 11/1994 | | H04M/11/00 |

OTHER PUBLICATIONS

Copy of European Search Report (Application No. EP 94304742), completed Jun. 8, 1995 by Examiner Mikkelsen.
European Search Report for Application No. EP 93403164 completed on Sep. 21, 1995 by Examiner Lambley; 4 pages.
IBM Technical Disclosure Bulletin.
Rockwell Application Note, Doc No. 29800N73, Order No. 873, (Oct. 1991).
U.S. West Caller ID, 1 p., (Jul. 18, 1994).
"Radish System Lets Phone Users Send Voice, Data Simultaneously", PC Week, 9(19), pp. 53, (May 11, 1992).
"Telewriting Terminal Equipment", CCITT, Recommendation T. 150, (1988).
"***PICFON Card Brochure", Specom Technologies Corp., (Published Prior to Applicant's Invention).
"A Family of 2–Wire, Duplex Modems Operating at Data Signalling Rates", CCITT, V.32, Facsimile Recommendation, (1988).
"Applications of the MT8841 Calling Number Identification Circuit", Mitel Microelectronics Digital/Analog Communications Handbook, Doc. No. 9161–001–060–NA, Issue 1 , pp. 12–307, (1993).
"AT&T Microelectronics T7540 Digital Telephone CODEC Data Sheet and Addedendum", pp. 1–4, (Jul. 1991).
"AT&T Microelectronics T7540 Digital Telephone CODEC Preliminary Data Sheet", pp. 1–64, (Jan. 1991).
"AT&T Microelectronics, High–Speed Data Pump Chip Sets", 1–91 & F1–F20, (Dec. 1991).
"AT&T Microelectronics, WE DSP16C Digital Signal Processor/CODEC Preliminary Data Sheet", 1–63, (May 1991).
"Canadian Application No. 2,104,701, Computer–Based Multifunction Personal Communications System", 52 sheets of drawing, 1–104, (Jul. 9, 1994).
CCITT V.42, "Error–Correcting Procedures for DCES Using Asynchronous–to–Synchronous Conversion", 296–370, (1988).
"Combined Use of Collision–Resolution and Collision–Avoidance Media–Access Communication Protocols", IBM Technical Disclosure Bulletin, 37, 299–301, (Oct. 1994).

"Communications for the Information Age", *IEEE Global Telecommunications Conference & Exhibition, 1 of 3,* pp. 34–36, (Nov. 28–Dec. 1).

"Computer–Based Multifunction Personal Communications System", *Canadian Application No. 2,104,701,* 1–105 and 52 drawing, (Jul. 9, 1994).

"Copy of European Search Report (Application No. EP 94304742)", *Copy of European Search Report (Application No. EP 94304742), completed Jun. 8, 1995 by Examiner Mikkelsen.*

"Copy of European Search Report by S. Lambley for Application No. EP 93403164", 5 pages, (Apr. 18, 1996).

"Copy of PCT Search Report", by C. Canosa Areste for Application No. PCT/US 95/14253, 6 pages, (May. 24, 1996).

"Copy of PCT Search Report by Areste Canosa For Application No. PCT/US95/05034", 8 pages, (Apr. 25, 1996).

"Copy of PCT Search Report by C. Canosa Areste for Application No. PCT/US95/14253", 6 pages, (May 24, 1996).

"Copy of PCT Search Report by J. Lange for Application No. PCT/US95/14826", 7 pages, (Apr. 10, 1996).

"Copy of PCT Search Report by M. Vandevenne for Application No. PCT/US95/14829", 8 pages, (Mar. 28, 1996).

"Data Communication Over the Telephone Network", *CCITT Blue Book, vol. VIII,* (1989).

"Error–Correcting Procedures for DCES Using Asynchronous–to–Synchronous Conversion", *CCITT V.* 42, vol. VIII, pp. 296–370, (1988).

"European Search Report for Application No. EP 93403164", *Completed on*Sep. 21, 1995 *by Examiner Lambley*; 4 *pages*.

"Method and Apparatus for the Statistical Multiplexing of Voice, Data, and Image Signals", *IBM Technical Disclosure Bulletin,* 35, pp. 409–411, (Nov. 1991).

"Mitel MT8841 Calling Number Identification Circuit", *Mitel Microelectronics Digital/Analog Communications Handbook, Doc. No. 9161–952–007–NA, Issue 9,* pp. 8–93–8–102, (1993).

"Mitsubishi Still Color Picture TV Phone", *Techno Japan,* 23, 6, (Jun. 1990).

"MultiX25–X.25 Pad, The New MultiX25 Pad 8 Port X.25 Packet Assembler/Disassembler for Public and Private Data Networks", *MultiTech Systems.*

"Pen Telephone Brochure", *Shimadzu,* Published Prior to Applicants's Invention.

"PICFON Card Brochure", *Specom Technologies Corp.,* Published Prior to Applicants Invention.

"Radish System Lets Phone Users Send Voice Data Simultaneously", *PC Week,* 9, 19, 53, (May 11, 1992).

"Speech Data Adaptive Multiplexer", *IBM Technical Disclosure Bulletin,* vol. 27, No. 2, 969, (Jul. 1994).

"TechTips—A Periodic Round–up of Technical Applciations, Notes, and Information on MultiTech's Data Communications Products", *MultiTech Systems, vol. 2, No. 2, May 1992.*

"Telewriter Product Description", *Optel Communication, Inc.,* (Published Prior to Applicant's Invention).

"Telewriting Terminal Equipment", *CCITT, (Recommendation T. 150),* pp. 228–277, (1988).

"The Photophone", (Product Brochure0 GTE, (Feb. 15, 1990).

"Videowriter '91 Product Description", *Optel Communications, Inc.,* (1991).

"WE DSP 16C Digital Signal Processor/CODEC Preliminary Data Sheet", *AT& T Microelectronics,* 1–64, (May 1991).

"WE DSP 16C Digital Signal Processor/CODEC Preliminary Data Sheet", *AT& T Microelectronics, 32 pages, published in May, 1991.*

"Z84C01 Z80 CPU with Clock Generator/Controler", *Zilog Intelligent Peripheral Controllers,* pp. 43–73, (1991).

"Z84C90 CMOS Z80 KIO Serial/Parallel/counter/timer", *Zilog Intelligent Peripheral Controllers,* pp. 205–224, (1991).

"Z85C01 Z10 CPU with Clock Generator/Controller", *Zilog Intelligent Peripheral Controllers,* pp. 43–73, published in 1991.

"Zilog Intelligent Perpheral Controllers, Z84C01 Z80 CPU with Clock Generator/Controller", pp. 43–73, (1991).

"Zilog Intelligent Perpheral Controllers, Z84C90 CMOS Z80 KI0 Serial/Parallel/Counter/Timer", pp. 205–224, (1991).

Akaiwa, Y., et al., "An Integrated Voice and Data Radio Access System", *IEEE,* pp. 255–258, (1992).

Callens, P., et al., "Speech Data Adaptive Multiplexer", *IBM Technical Disclosure Bull.,* 27, p. 969, (Jul. 1984).

Casale, et al., "Statistical voice/high speed data multiplexing on a 64 kbit/s channel", *Phoenix Conference on Computers and Communications,* Scottsdale, AZ, pp. 459–464, (Mar. 27, 1991).

Cuperman, V., et al., "Backward Adaptive Configurations For Low–Delay Vector Excitation Coding", *Advances In Speech Coding,* pp. 13–23, (Jan. 1, 1996).

Erskine, C., et al., "VoicePump: voice–Over–Data Modem Technology Utilizing ASM–CELP Speech Compression at 4800, 7200 and 9600 Bits Per Second", *Proceedings of the International Conference on Signal Processing Applications and Technology,* 2, pp. 1425–1429, (Sep. 28, 1993).

Gulick, et al., "Interface the ISDN to your PC with a Voice/Data Board", *Electronic Design, 35* (*29*), pp. 85–88, (Dec. 10, 1987).

Kishimoto, et al., "Simultaneous Transmission of Voice and Handwriting Signals: Sketchphone System", *IEEE Transaction on Communication, COM–29, 12,* pp. 1982–1986, (Dec. 1981).

Komiya, et al., "An approach to the multifunction graphic terminal for the ISDN environment", *IEEE Global Telecommunications Conference and Exhibition, 1* , Hollywood, FL, pp. 32–36, (Nov. 28, 1988).

Laube, M., "Audiographic Terminal", *Electrical Communication, 60* (*1*), (1986).

Mikkelsen, "Copy of European Search Report (Application No. EP 94304742)", Completed Jun. 8, 1995.

Mikkelsen, C., "International search Report for PCT Application Serial No. PCT/US 95/07720", 3.

Mikkelsen, C., *Copy of PCT Search Report for Application Serial No. PCT/US11313,* 4.

Mills, J.D., et al., "A Data and Voice System for the General Service Telephone Network", *Proceedings of the International Conference on Industrial Electronics, Control, and Instrumentation,* pp. 1143–1148, (Nov. 1987).

Noerpel, A.R., et al., "Radio Link Access Procedure for a Wireless Access Communications System", *IEEE, 2,* pp. 1111–1115, (1994).

Pierce, Jr., G.A., "Don't Just Tell Them, Show Them!", *Automation,* (Aug. 1990).

Radcliffe, M., "Video Calls Use Basic Phone Lines", *MacWeek,* (Aug. 3, 1992).

Sasaki, et al., "Variable rate voice coding system", *MILCOM 92, 1,* San Diego, CA, pp. 364–367, (Oct. 11, 1992).

Shimadzu, "Pen Telephone Brochure", (Published Prior to Applicant's Invention).

Smith, R., "Writs TVs Still Fiction, but Police Videophones Take Hold", *TE&M,* (Dec. 15, 1987).

Spragins, J.D., et al., "Telecommunications—Protocols and Design", *Communications Equipment Interface Design, Chapter 4,* Addison–Wesley Publishing Company, pp. 156, 304 & 327, (1991).

Stallings, W., "Protocols and Architecture", *Data and Computer Communications, 2nd Edition,* pp. 100–103, (1988).

Tominaga, et al., "Comparison of Coding Schemes for Telewriting Systems", *ICCC,* (1986).

\* cited by examiner

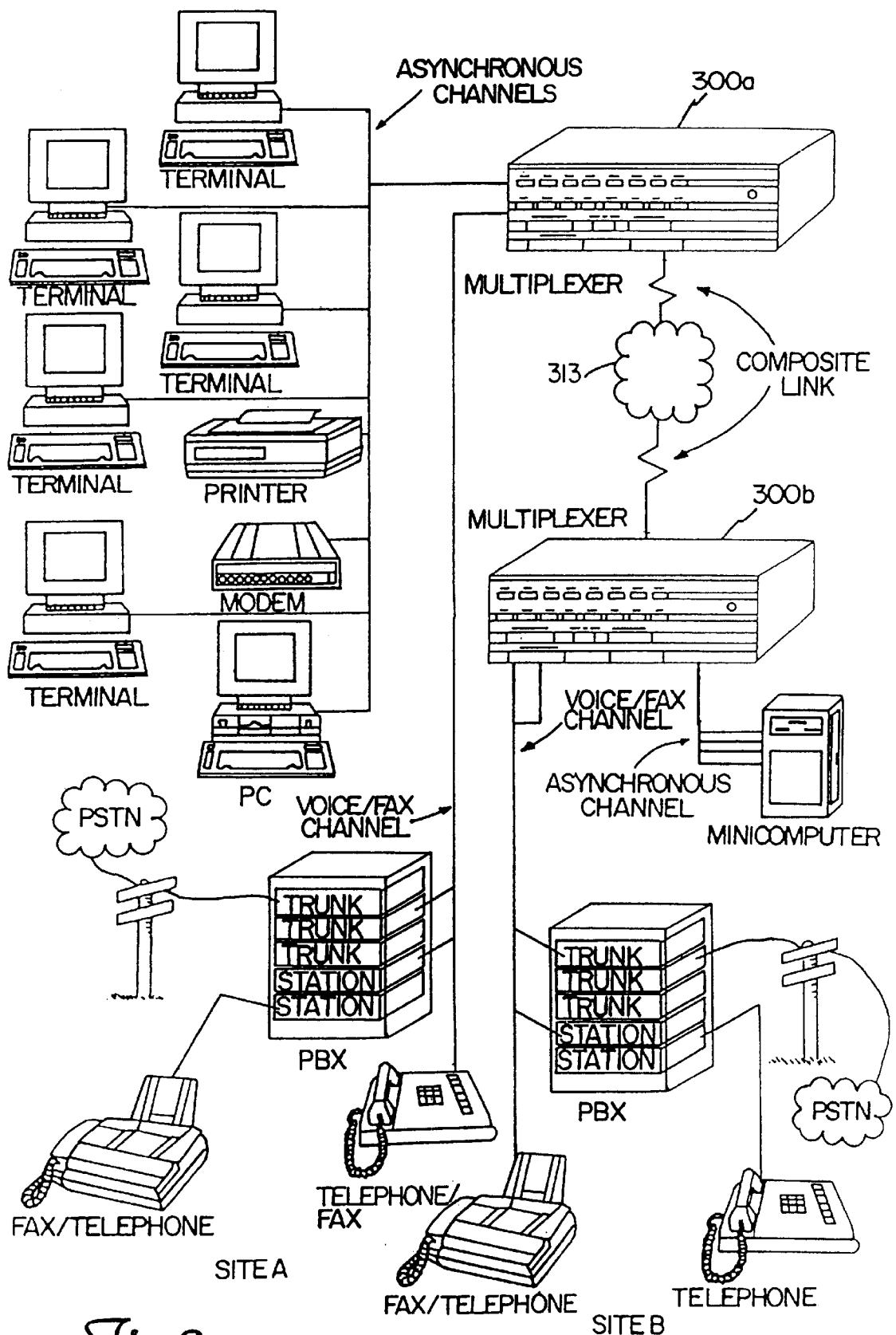
Fig. 3 TYPICAL VOICE/FAX/DATA NETWORK

FXS TO FXS

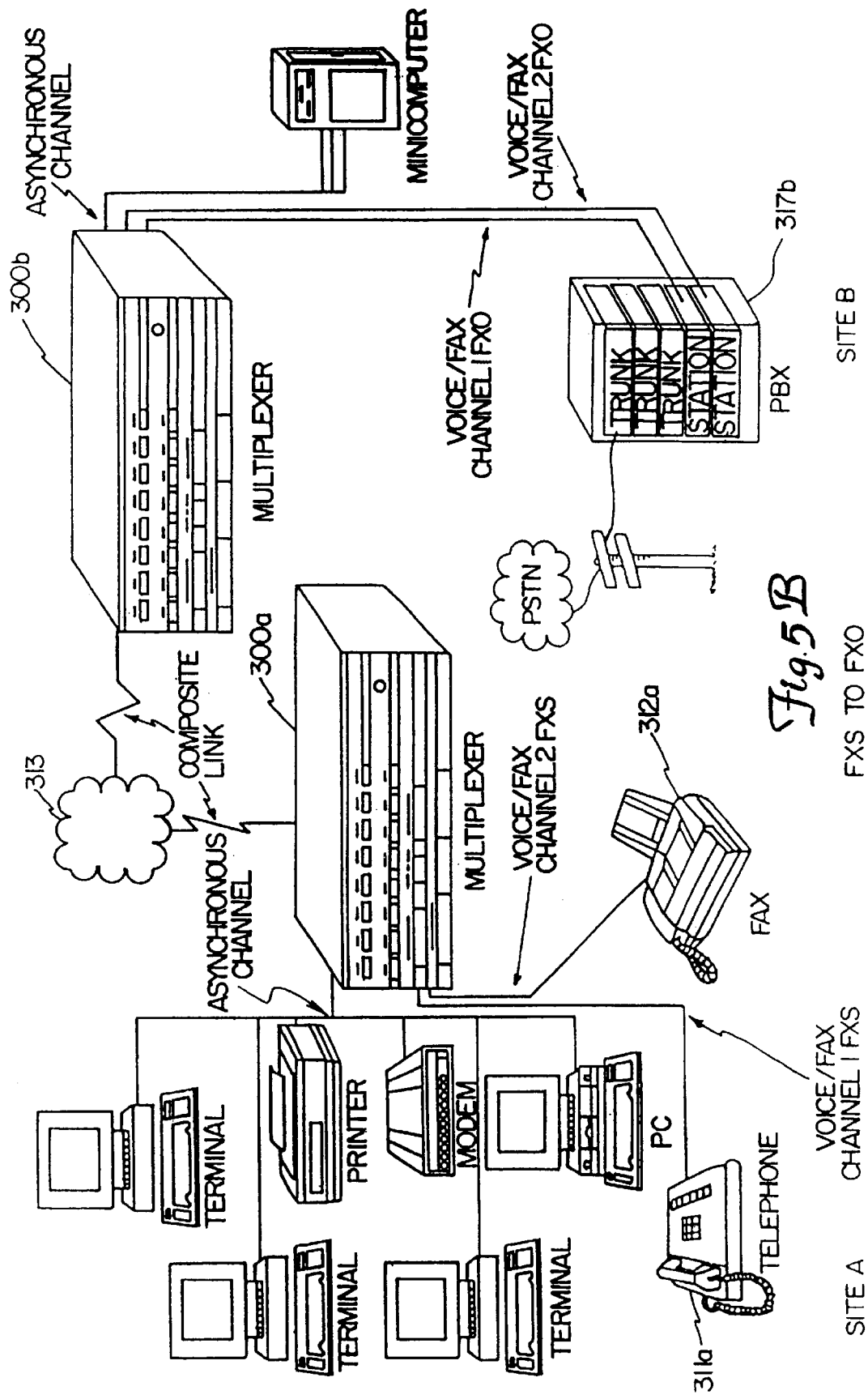

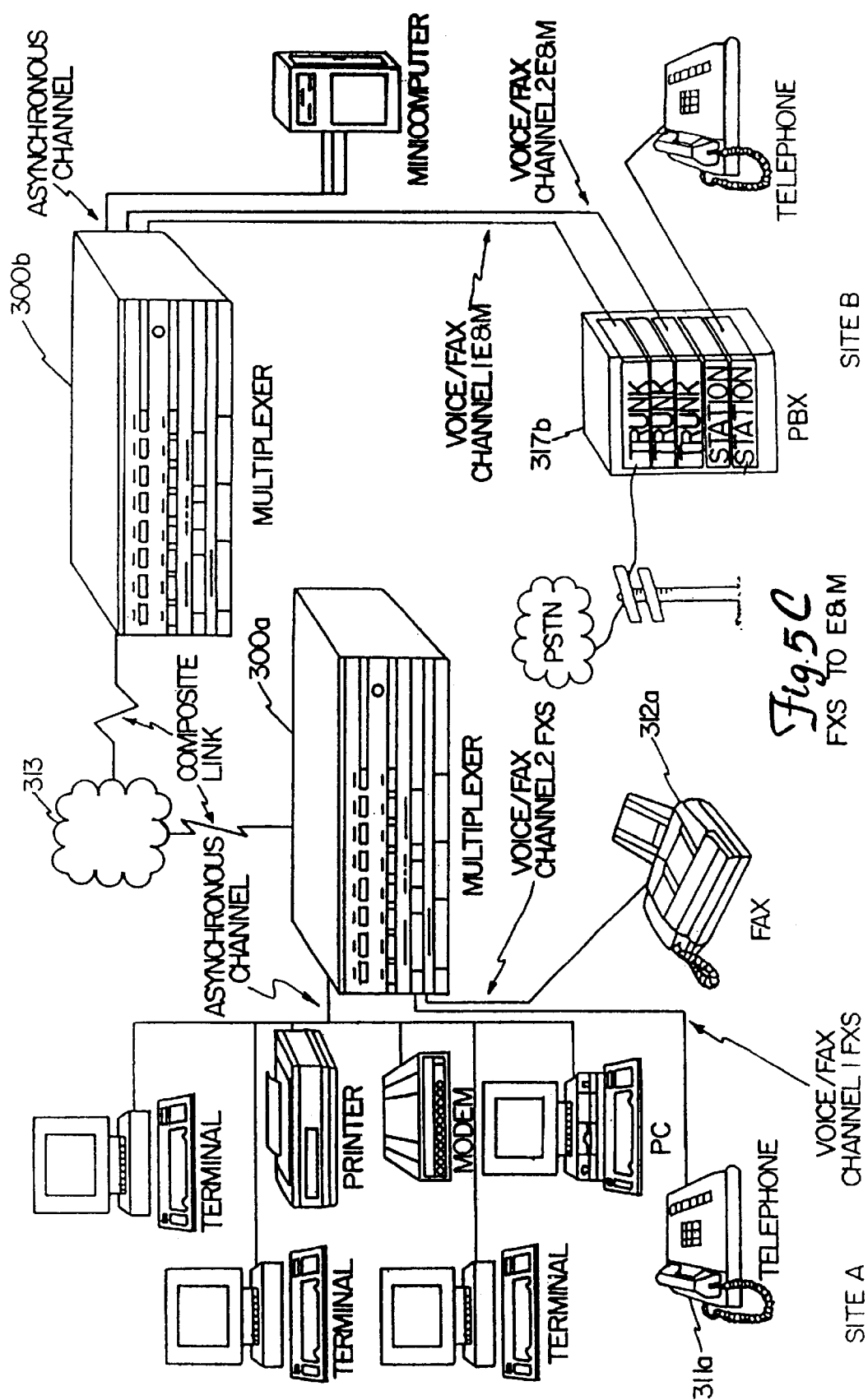

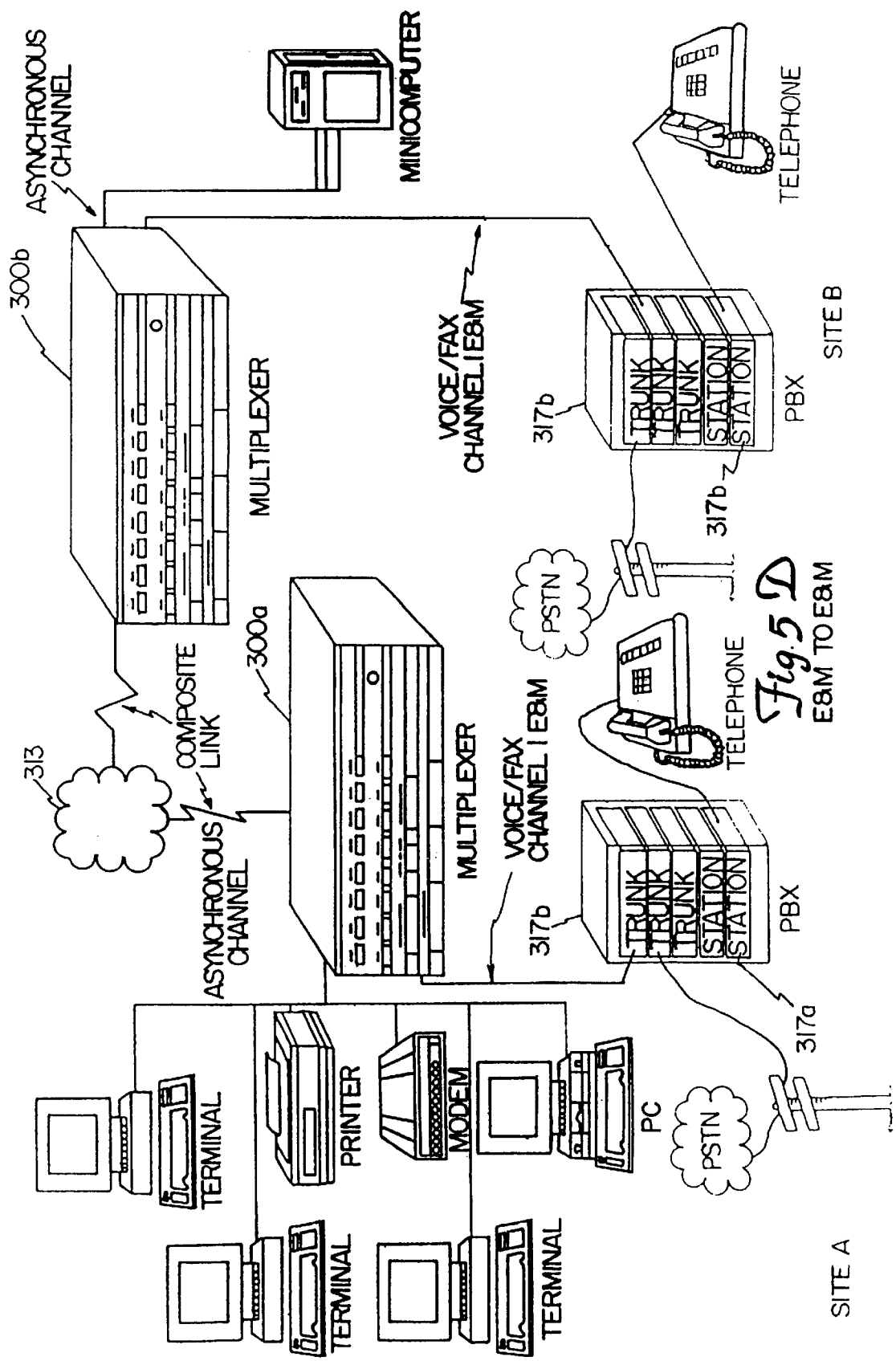

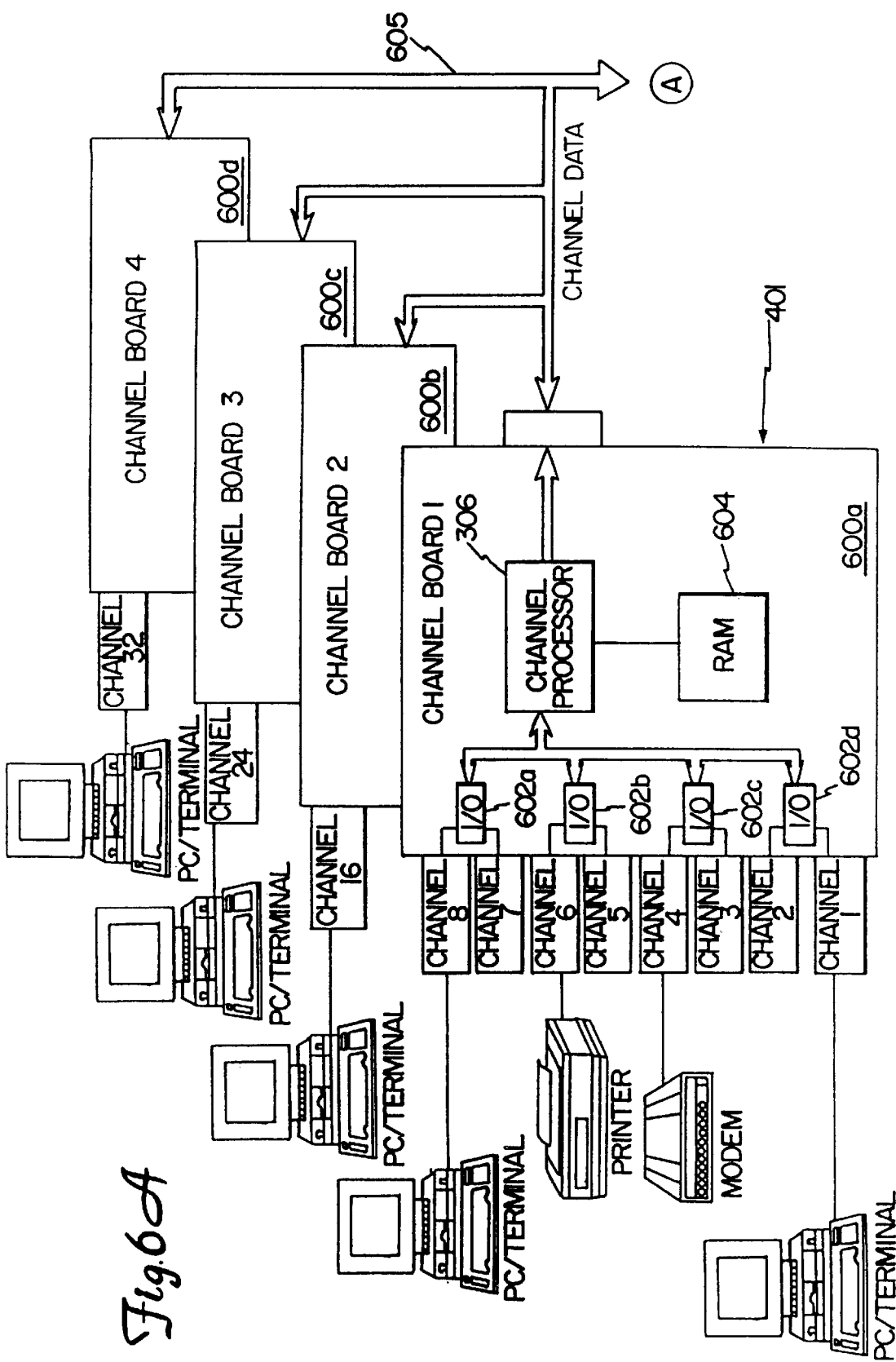

| Fig. 7A | Fig. 7B | Fig. 7C |
|---|---|---|
| Fig. 7D | Fig. 7E | Fig. 7F |
| Fig. 7G | Fig. 7H | Fig. 7I |

Fig. 7

| Fig. 8A | Fig. 8B | Fig. 8C |
|---|---|---|
| Fig. 8D | Fig. 8E | Fig. 8F |
| Fig. 8G | Fig. 8H | Fig. 8I |

Fig. 8

| Fig. 9A | Fig. 9B | Fig. 9C |
|---|---|---|
| Fig. 9D | Fig. 9E | Fig. 9F |
| Fig. 9G | Fig. 9H | Fig. 9I |

Fig. 9

| Fig. 10A | Fig. 10B | Fig. 10C |
|---|---|---|
| Fig. 10D | Fig. 10E | Fig. 10F |
| Fig. 10G | Fig. 10H | Fig. 10I |

Fig. 10

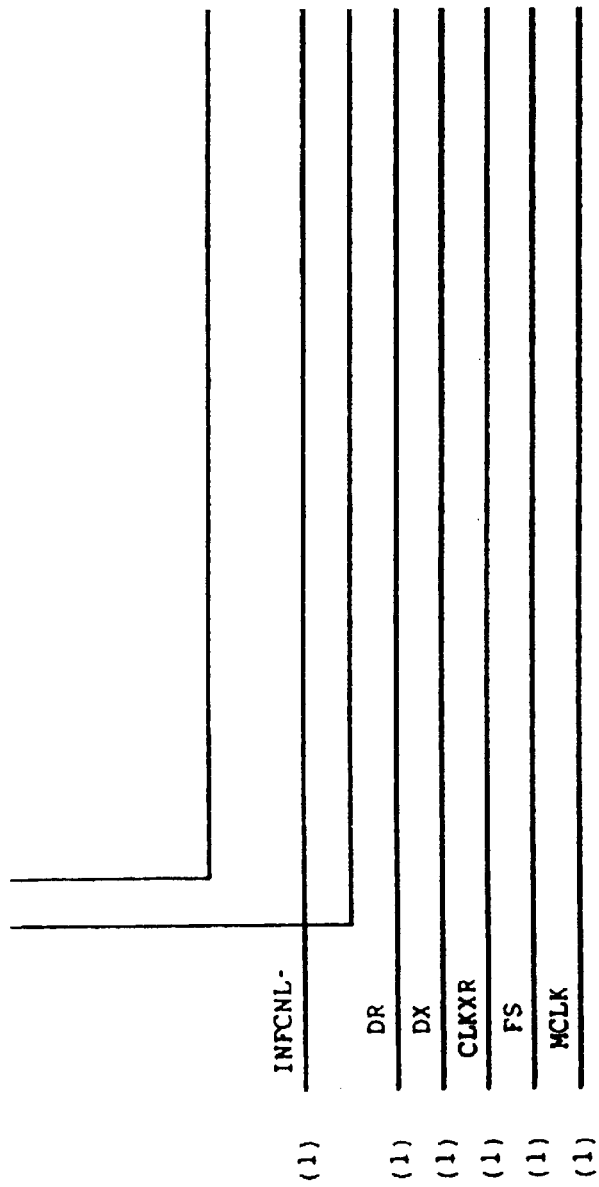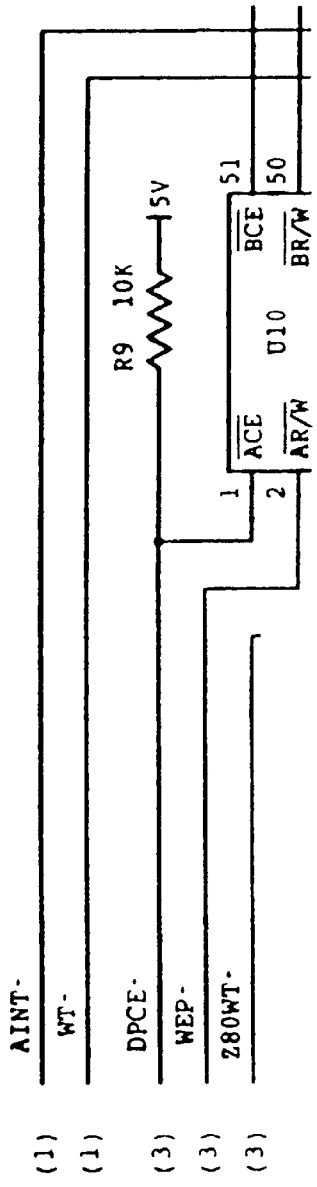
Fig. 8D

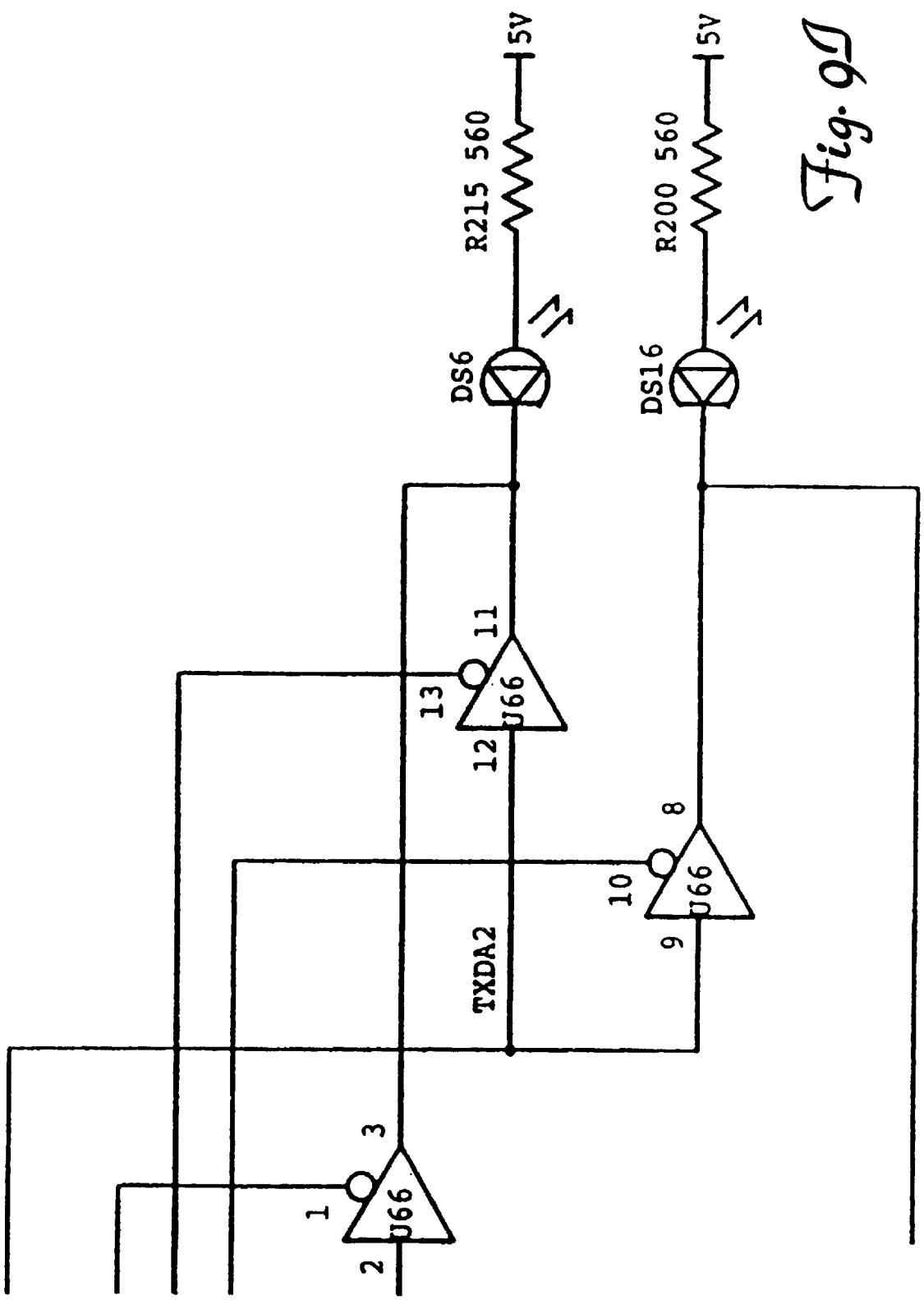

Fig. 16

| BLOCK I.D. # 02 | DEST. NODE (0-255) | BYTE COUNT | VOICE/FAX DATA | CRC BYTE #1 | CRC BYTE #2 |
|---|---|---|---|---|---|

Fig. 17

←——— 8 BYTES MAXIMUM ———→

| BLOCK I.D. # 03 | BUFFER FULL=0 BUFFER EMPTY=1 | BYTE COUNT | SOURCE NODE # OF INITIATING MUX (BYTE A) | SOURCE NODE # OF ADJACENT MUX IN NETWORK (BYTE B) | SAME SOURCE NODE # AS BYTE B | CRC BYTE #1 | CRC BYTE #2 |
|---|---|---|---|---|---|---|---|

Fig. 18

| BLOCK I.D. # 04 | DEST. NODE # (0-255) | DEST. CHANNEL # (0-31) | SOURCE NODE # (0-255) | SOURCE CHANNEL # (0-31) | SEQUENCE # (N0-N7) N=(0,9) | BYTE COUNT (0-128) | DATA BYTE #1 | ... | DATA BYTE #128 | CRC BYTE #1 | CRC BYTE #2 |

VARIABLE # OF BYTES 1 TO 128

Fig. 19

| BLOCK I.D. # (05H), 85H | DEST NODE # (0-255) | SOURCE NODE # (0-255) | SEQUENCE # (N0-N8) N=(0,9) | # OF RCV STATUS BYTES TO FOLLOW (1-4) | RCV STATUS BYTE #1 | ... | RCV STATUS BYTE #4 | # OF EIA BYTES TO FOLLOW (0-32) | EIA BYTES 1-32 | CRC BYTE #1 | CRC BYTE #2 |

MAX 4 BYTES

MAX 32 BYTES

DATA/VOICE/FAX COMPRESSION MULTIPLEXER

This application is a Continuation of U.S. Ser. No. 08/903,032 filed Jul. 29, 1997, now U.S. Pat. No. 6,151,333, issued on Nov. 21, 2000, which is a Continuation of U.S. Ser. No. 08/229,958 filed Apr. 19, 1994, now U.S. Pat. No. 5,682,386 issued on Oct. 28, 1997.

FIELD OF THE INVENTION

The present invention relates to data communication multiplexers and in particular to communication multiplexers which multiplex data, facsimile and compressed voice over a single composite link.

BACKGROUND OF THE INVENTION

Data multiplexers in the telecommunications field are used to combine several asynchronous data communication signals from individual data terminal equipment (DTE) sources such as computer terminals or personal computers (PC's) onto a single composite link. The individual asynchronous signals from the PC's are connected to the multiplexer channel inputs and converted into a single signal called the composite signal which is then sent over a single analog or digital link called the composite link. Of course, the composite link may be a dedicated telephone line, a leased line, or a single private wire.

The data multiplexer combines the channel signals from individual PC's into a composite signal by using one of a variety of techniques such as frequency division multiplexing, time division multiplexing and statistical time division multiplexing. Frequency division multiplexers assign separate frequencies to each signal and combine the frequencies onto the single composite link. Time division multiplexers assign a time slice of a single carrier to each of the channels being combined. Statistical time division multiplexers are in adaptation of a time division multiplexers in which only those channels actually sending data get a slice of time. This results in a more efficient use of the composite link.

Typically, a data multiplexer is used as an efficient alternative to traditional data communications in which a single channel uses a single telephone line link. By combining a plurality of asynchronous channels into a composite link, fewer telephone lines or leased lines and less equipment is used to transfer the data. This is especially cost effective when a four wire "leased" line is used to connect a pair of synchronous modems. This type of private line offers a degree of security that public dial-up telephone lines cannot match. In addition, the superior error correction of a synchronous multiplexer network is preferred over the single telephone line asynchronous connections. Better yet, the use of a digital line with a DSU (Digital Service Unit) connection is more reliable and error free than analog.

FIG. 1 shows a typical arrangement for a prior art connection of a plurality of PC's at building A 101 and a computer system at building B 102. The computer system at building B may be personal computers (PC's) 103 such as those shown in building A or any variety of computer equipment devices. Traditional dial-up telephone links 105a, 105b, 105c through 105n are used between the plurality of PC's in building A 101 and the plurality of data terminal equipment (DTE) devices of building B such as a VAX computer 106. Each asynchronous link, therefore, requires its own dial-up link 105a, 105b, 105c through 105n, which is in many cases not cost effective. The connections may be between two sites, or multiple sites may be connected.

FIG. 2 shows a prior art data multiplexer scheme in which a plurality of PC's 203 at building "A" 201 are multiplexed using a data multiplexer and synchronous modem 207 to transmit the information over a single telephone link 205 to building "B" 202. The signals are then demultiplexed by a similar multiplexor/modem 208 and transmitted to the DTE of building "B" 202, which for illustrative purposes is shown as a VAX computer 206.

In general, FIG. 2 describes a data multiplexer 207 and, in particular, a device manufactured by the assignee of the present invention called the MultiMux (model 900, 1600 or 3200) product from Multi-Tech Systems, Inc. of Mounds View, Minn. The product allows for up to n-RS232 connections to local PC's 203, dumb terminals, host computers such as a DEC VAX 206, or other devices which communicate via asynchronous connection. In one product environment, n equals eight where eight PC's or other asynchronous devices can be attached to eight RS232 ports. The composite link is typically handled through an proprietary protocol with data rates up to 64 kilobytes per second. Not shown is a command port for menu driven control of the operational settings of the data multiplexer.

Connections from one site to another site over a composite link using a dedicated line is an efficient use of the line resources, however additional line connections are still typically needed between the two sites or more sites for traditional telephone voice or facsimile connections between the sites. There is a need in the art, therefore, to combine compressed voice grade telephone signals with data signals and facsimile signals and transmit all over a composite link to further increase the efficient use of a single telephone line connection.

SUMMARY OF THE INVENTION

The present invention solves the aforementioned deficiencies of the prior art and solves other problems that will be understood and appreciated by those skilled in the art upon reading and understanding the present specification. The present invention describes a data multiplexing network which combines a plurality of asynchronous data channels with an asynchronous data stream representing compressed voice signals and/or facsimile signals onto a single synchronous data packet stream. The single synchronous data packet stream is then transmitted by a high speed statistical multiplexer over a composite link to a second site using a modified high-level synchronous data link control protocol with an overlay of a priority statistical multiplexing algorithm. The asynchronous data channels and the compressed voice channel and/or facsimile signals are demultiplexed and reconstructed at the second site for sending to other asynchronous data terminal equipment and to a standard telephone or facsimile analog port or PBX interface, respectively. Communication between the first site by voice or facsimile and the second site is transparent to the users.

In a further embodiment of the present invention, the transmission of facsimile information is performed by demodulating the fax transmissions, sending only the facsimile image packets over the multiplexed composite link and remodulating the facsimile signals at the remote site for transmission over an analog telephone line to a remote facsimile machine. The demodulating and remodulating of the facsimile image packets by the present invention is transparent to the facsimile machines except that certain proprietary facsimile protocols are suppressed by the stripping of the proprietary information from the facsimile header packets.

DESCRIPTION OF THE DRAWINGS

In the drawings, where like numerals describe like components throughout the several views.

FIG. 3 is a general block diagram showing the preferred embodiment of the present invention which combines both telephone and facsimile information through a number of possible alternative interfaces with digital data information for transmission to and demultiplexing at a remote site;

FIG. 5B is a diagram showing a second one of the preferred connections of the present invention which multiplexes voice telephone, facsimile information and digital data information for transmission to and demultiplexing at a remote site for connection to other DTE devices and to a remote PBX;

FIG. 5C is a diagram showing a third one of the preferred connections of the present invention which multiplexes voice telephone, facsimile information and digital data information for transmission to and demultiplexing at a remote site for connection to other DTE devices and to remote voice telephone and facsimile equipment through a remote PBX;

FIG. 5D is a diagram showing a fourth one of the preferred connections of the present invention which multiplexes voice telephone and facsimile information through a local PBX with local digital data information for transmission to and demultiplexing at a remote site for connection to other DTE devices and to remote PBX for remote voice telephone and facsimile equipment;

FIGS. 6A, 6B and 6C are detailed block diagrams of the asynchronous channel cards, the aggregate cards and the voice/fax cards, respectively, of the multiplexer shown in FIG. 4;

FIGS. 7A–7B, 7C–7I, 8A–8B, 8C–8I, 9A–9B, 9C–9I and 10A–10B, 10C–10I are detailed electrical schematic diagrams of the voice/fax card of FIG. 6C;

FIG. 16 shows a Voice/Fax Data Frame used to transmit voice/fax channel data;

FIG. 17 shows a Network Control Frame used in a networking environment;

FIG. 18 shows an Asynchronous Channel Data Frame used to transmit asynchronous channel data; and FIG. 19 shows an Acknowledgement Frame used to acknowledge communications between multiplexers.

DETAILED DESCRIPTION OF THE PREFERRED EMBODIMENTS

Figure 1:
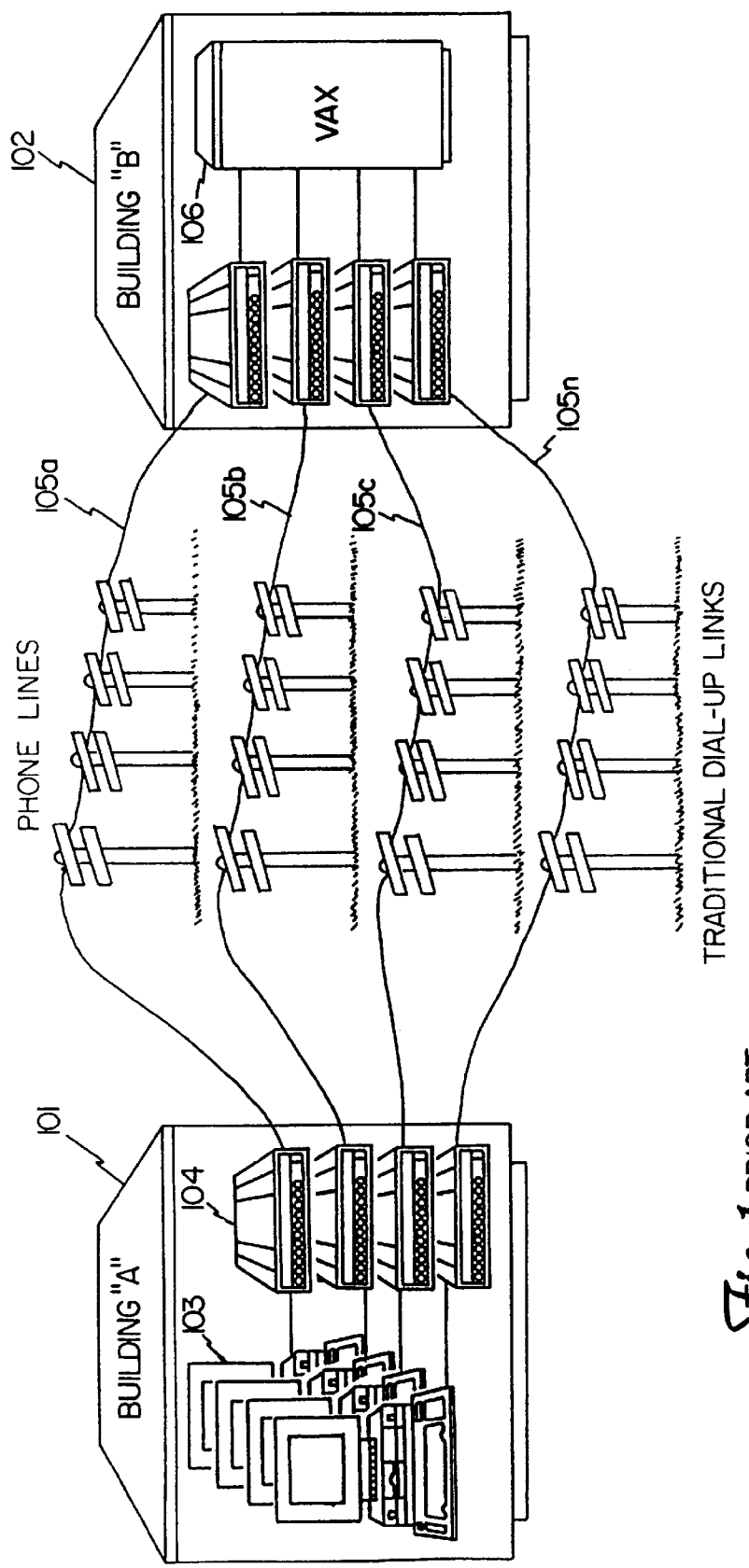
FIG. 1 is a drawing of a prior art connection between building A and building B using traditional dial-up telephone links by modem.
Figure 2:
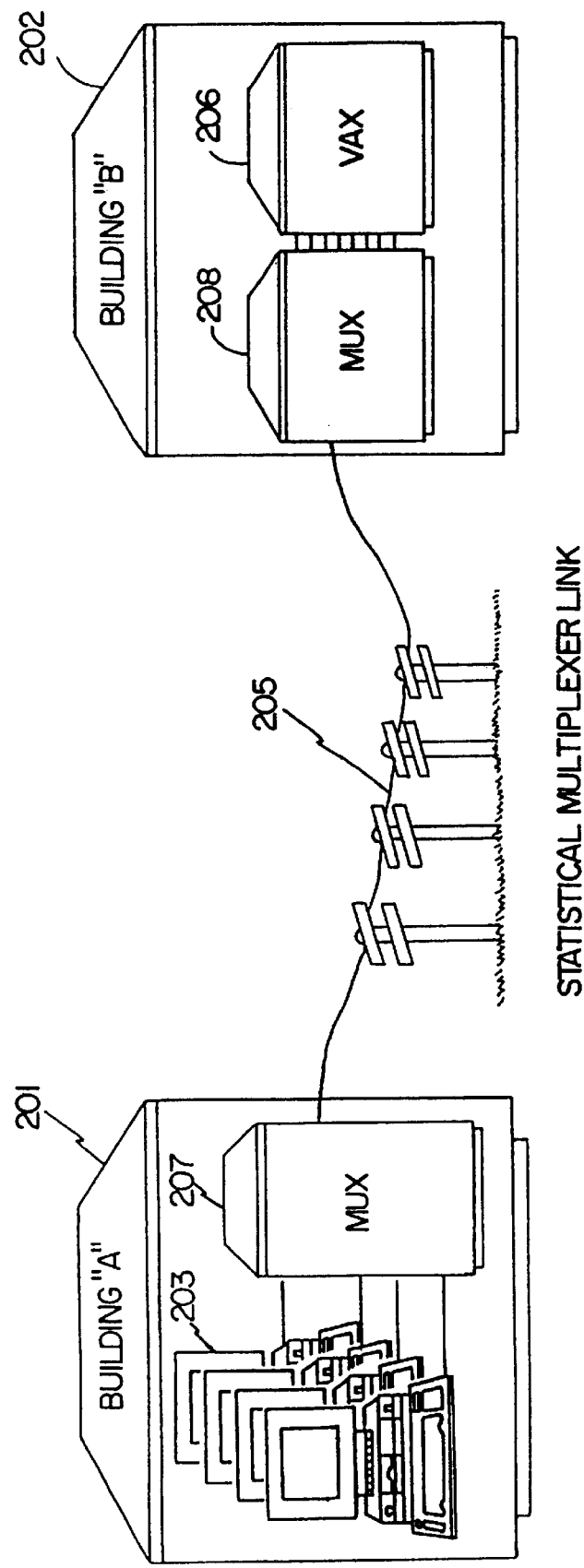
FIG. 2 is a prior art description of the connection between building A and building B using a statistical multiplexer link.

In the following Detailed Description of the Preferred Embodiment, reference is made to the accompanying drawings which form a part hereof and in which is shown by way of illustration specific embodiments in which the invention may be practiced. These embodiments are described in sufficient detail to enable those skilled in the art to practice and use the invention, and it is to be understood that other embodiments may be utilized and that electrical, logical, and structural changes may be made without departing from the spirit and the scope of the present invention. The following detailed description is, therefore, not to be taken in a limiting sense and the scope of the present invention is defined by the appended claims.

System Overview

FIG. 3 is a block diagram showing a plurality of connection combinations for the preferred embodiment of the present invention which is a communication system in which a data/voice/fax multiplexer 300a is configured to take voice information from telephone equipment, facsimile information from facsimile machines and asynchronous data from data terminal equipment (DTE) devices and combine this information and data for transmission over a single composite communications link. Data/voice/fax multiplexers 300a and 300b (generally referred to as data/voice/fax multiplexer 300) are identically configured for multiplexing and demultiplexing this data and information. The result of this connection allows telephone, facsimile and data communications between sites "A" and "B" in a method of communication which appears to users at both sites to be simultaneous and transparent.

The present invention shown in FIG. 3 connects a plurality of data terminal equipment (DTE) devices such as computers, terminals, printers, modems, etc., through asynchronous channels to the data/voice/fax multiplexer 300 at site "A". Also, telephone equipment such as telephone desk sets, PBX equipment and facsimile (fax) equipment are also connected to data/voice/fax multiplexer 300. The data/voice/fax multiplexer 300 is configured to take analog voice channel inputs from telephone equipment through specially configured voice channel interfaces to be digitized, compressed and encoded into a special packet protocol using a voice compression algorithm. Multiplexer 300 is also configured to connect to fax equipment to receive and demodulate the fax picture data to place the decoded picture data into the special packet protocol. The asynchronous data received by multiplexer 300 from the DTE devices is combined with packetized picture data and packetized compressed voice information for multiplexing and synchronous transmission over the composite link.

At site "B", multiplexer 300b operates identically to multiplexer 300a at Site "A" to multiplex outgoing data, voice or fax information and to demultiplex incoming data from site "A". Each multiplexer 300 operates to compress or decompress the digitized voice data from telephone equipment using a voice compression algorithm described more fully below. Multiplexers 300 also operate to modulate and demodulate the fax picture data so that all three forms of data (DTE data, compressed voice data and facsimile picture data) are combined using a special packet protocol for transmission over the composite link. The composite link 313 may be an analog line such as a public telephone line using synchronous modems, a private leased line using synchronous modems or a digital line using DSU (Digital Service Units).

Hardware Overview

Figure 4A:
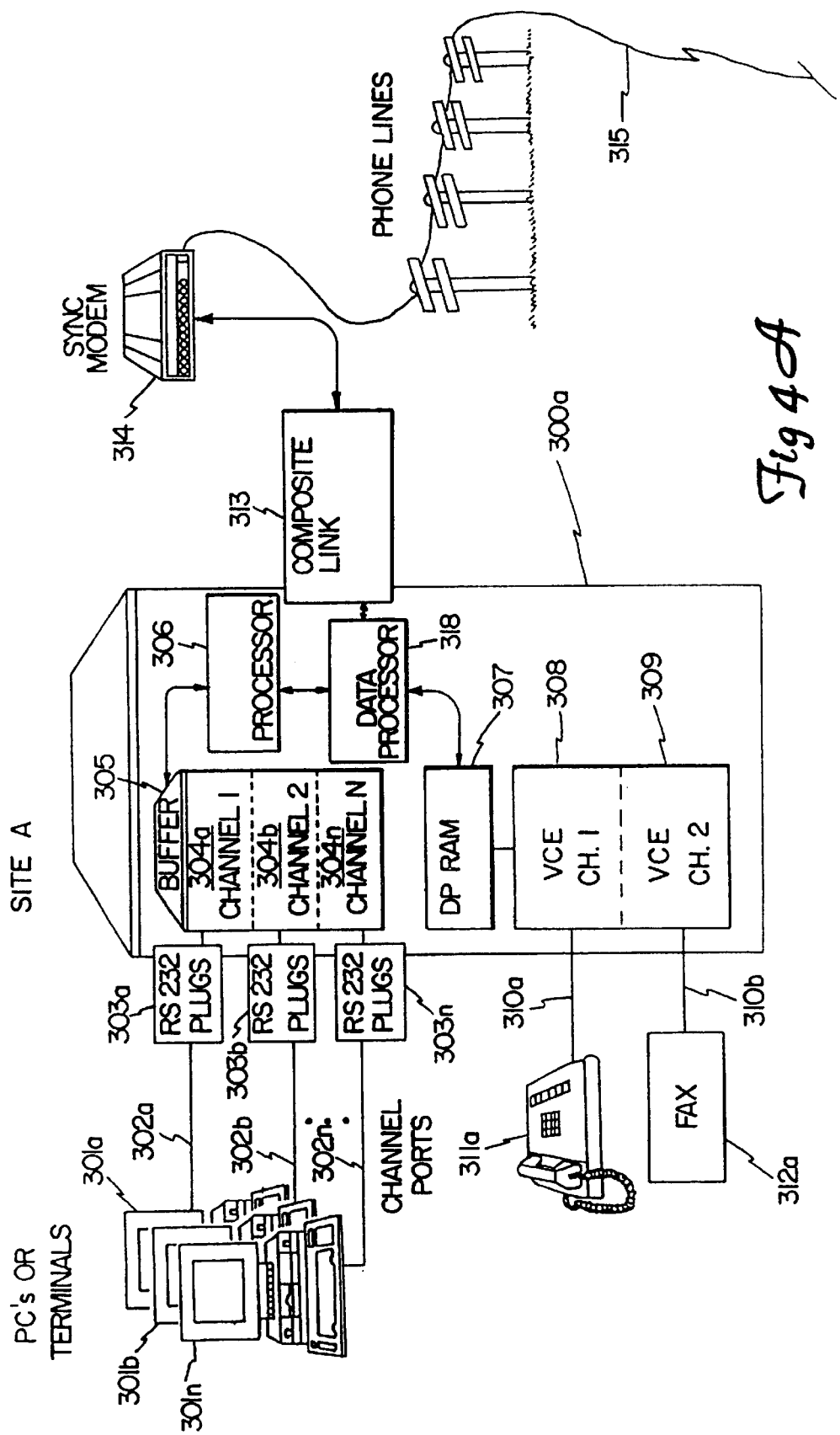
FIG. 4A is a detailed block diagram showing the use of the multiplexor 300 of the present invention to combines both telephone (voice), facsimile through a variety of connections with data over a single composite link to a remote site.
Figure 4A:
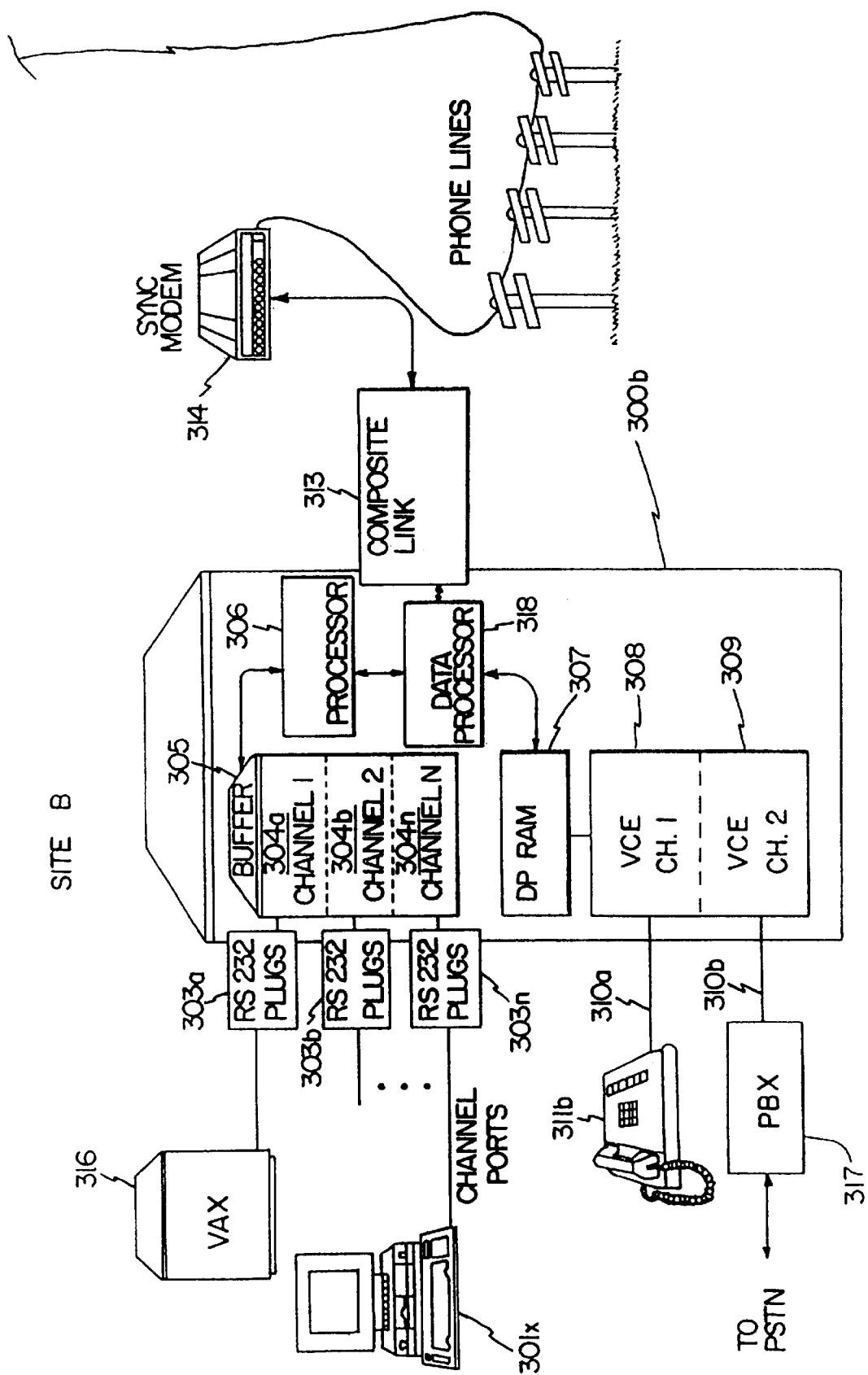

As shown in FIG. 4, the present invention combines a plurality of asynchronous data channels 302a–302n, which in many cases are RS232 interfaces 303a through 303n, along with a data packet stream of compressed voice or facsimile information into a single data stream. The single packetized data stream is transmitted using synchronous modem 314 over a single telephone line 315 to a remote site (Site "B"). As described more fully below, the composite link 313 may be selected to be an analog line such as a public telephone line using synchronous modems, a private leased line using synchronous modems or a digital line using DSU (Digital Service Units). FIG. 4 shows only one such composite link implementation which is a public telephone line 315 using synchronous modems 314.

As shown in FIG. 4, the basic elements at the local site (Site "A") connected to multiplexer 300a are terminals or PCs 301a–301n which are connected to channel ports 302a–302n which in turn connect to RS232 interfaces 303a–303n. The channel ports 302a–302n provide access to data buffers 304a–304n controlled by microprocessor 306 which assembles the data packets for the data processor 318. The combined data packets are connected to the phone line 315 by synchronous modem 314 for transmission at high speeds over the dedicated phone line 315.

Asynchronous data from the individual PC's contain start and stop flags. The asynchronous data is collected from the individual PC's and is assembled into synchronous data packets, each with a header and a trailer. Typically, 85% to 90% of an asynchronous line is not used efficiently since the line is not carrying any data most of the time. By using a statistical multiplexer 314, the sporadic data activity of several individual channels 302a–302n connected to PC's 301a–301n can be combined onto a single line 315 to make more efficient use of that line. The microprocessor statistically multiplexes and collects the asynchronous data and packetizes it into synchronous data packets for transmission.

Synchronous data transmissions also gain efficiency over asynchronous data transmissions by reducing framing overhead. By way of example of the data transmission efficiency gain, asynchronous data is by definition formatted by framing each character with a start and stop bit. This process can account for up to one-third of the bits in a single transmission on an asynchronous link. In contrast to this, synchronous data is transmitted in a packet that first contains a header (which contains destination address), followed by a block of data characters and followed by trailer information (such as error checking codes, checks sums, etc.). Since the packet is addressed, a statistical multiplexer can arrange the packet in any order with the other asynchronous data based on demand and use of the asynchronous data lines.

Data from the asynchronous channels 302a–202n connected to the PC's 301a–301n is sent to the microprocessor for statistical multiplexing after first being buffered through buffer 305 and collected by internal microprocessor 306. The microprocessor 306 assembles the data into the synchronous data stream in the form of synchronous data packets which are framed by the address and error correcting data and sent to data processor 318 for multiplexing with voice and fax data packets for transmission over the synchronous composite link.

The composite link 315 may be a digital or analog network link, a simple analog leased line, a four-wire leased line or private line. Communication over the composite link is through a special synchronous modems operating typically at 300 to 19.2 kbps, 38.4 kbps or DSU's (Digital Service Units) operating at 9600 to 256 Kbps @@56 Kbps in excess of 256 Kbps. The management and control format of the data transmitted over the composite link is described more fully below. This format is similar to the high-level synchronous data link control format (HDLC) used for inter-modem or DSU communication. A proprietary modified form of the HDLC is used with the preferred embodiment of the present invention which is called Modified HDLC or MHDLC. MHDLC is used in combination with a Priority Statistical Multiplexing (PSM) algorithm to achieve a highly efficient use of the composite link.

Multiplexer Overview

Figure 4B:
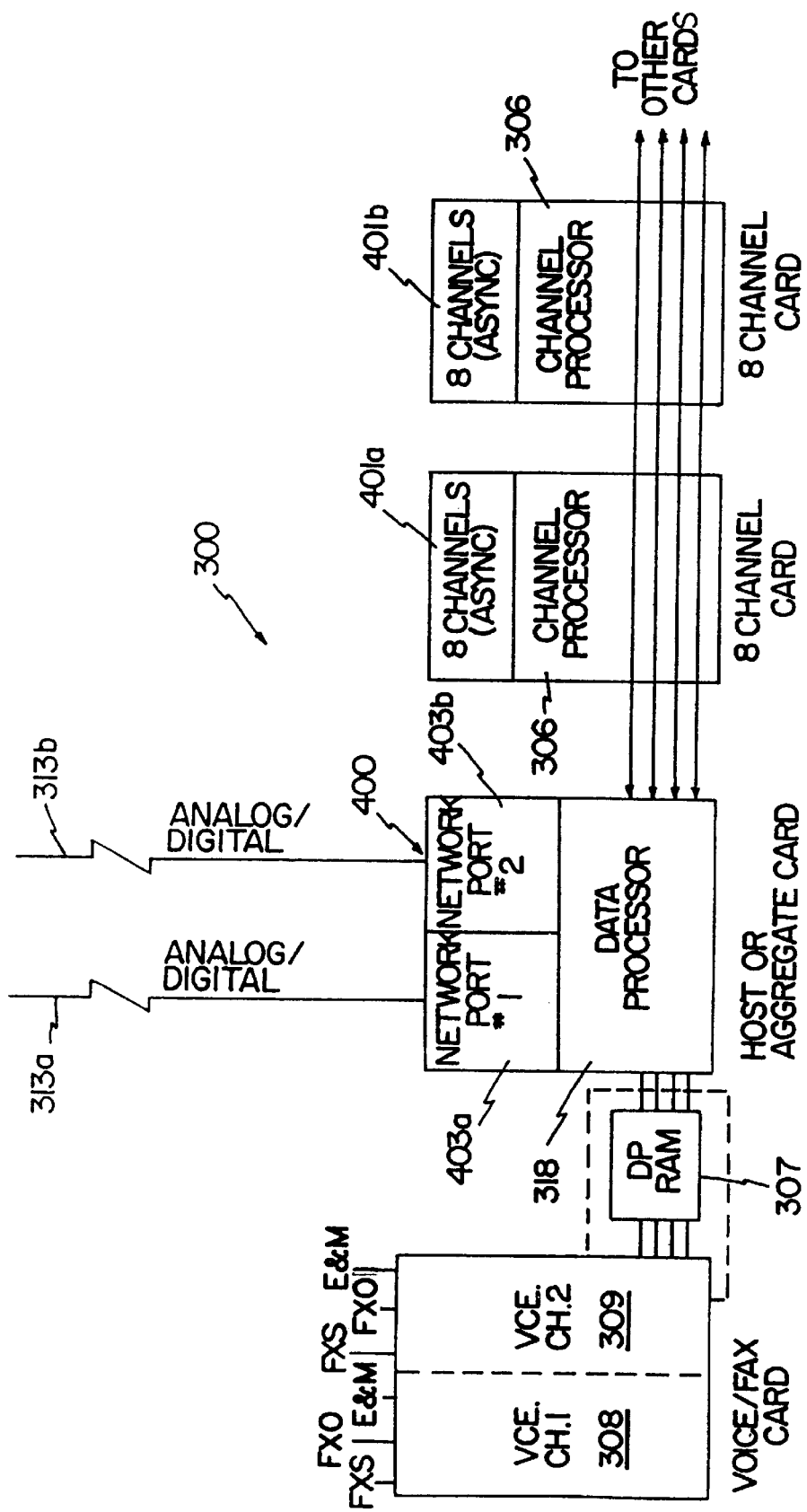
FIG. 4B is a detailed block diagram showing the division of major components of the data/voice/fax multiplexor of FIG. 4A including the FXS, FXO and E&M interfaces.

FIG. 4B is a block diagram of a single data/voice/fax multiplexer 300 with the circuits shown divided according to the physical implementation on multiple cards. Those skilled in the art will readily recognize that the physical implementation of the present invention need not follow the physical partitioning exemplified here. The multiplexer 300 uses statistical time division multiplexing to transmit data, voice and facsimile data in a fashion that appears simultaneous to the user at each end. In the illustrated embodiment of the present invention, two eight-channel interface cards 401a and 401b are included to provide a total of sixteen RS232 asynchronous ports for connection to PC's, mainframe computers, and other DTE devices, although as shown below, more channel cards may be added to extend the number of asynchronous channels serviced. In the preferred implementation, 32 asynchronous channels are interfaced using four 8-channel cards. The channels are buffered and connected to the host or aggregate card 400 of the multiplexer 300 for multiplexing with packetized voice or facsimile information from Voice Channel Equipment (VCE) Channel 1 circuit 308 or VCE Channel 2 circuit 309 (both VCE channels implemented on a single card).

Those skilled in the art will readily recognize that a variable number of asynchronous RS232 port cards and a variable number of voice or facsimile interface cards may be combined in the preferred embodiment of the present invention without limiting the scope of the invention. Thus, the design of the data/voice/fax multiplexor 300 is modular to allow the addition of cards to expand the capability of the system. In the preferred implementation shown in FIG. 4B, two VCE channel circuits 308 and 309 on a single card are used to send/receive facsimile or analog voice information connections for packetizing and transmission over the composite link lines 313a and 313b. As part of the modular design, the preferred implementation of data voice/fax/multiplexor 300 is shown with two dedicated lines 313a and 313b connected to ports 403a and 403b respectively. Network ports 403a and 403b each interface to separate lines using dedicated synchronous modems 314 for analog lines or to DSU's (Data Service Units) for digital lines.

The facsimile information from a fax machine is received as a telephone connection on VCE channel 1 circuit 308 or VCE channel 2 circuit 309. The facsimile information is taken off the analog carrier by demodulating the carrier so that the picture or pixel packets are recovered. The picture or pixel packets are then passed through dual port RAM 307 to be received by the data processor 318. The data processor 318 combine the facsimile or pixel packets with the synchronous data packets received from the asynchronous data channels 401a–401b for statistical multiplexing and transmission over one of the composite link lines 313a or 313b through network ports 403a or 403b, respectively.

In addition, or alternatively, telephone equipment connected to either VCE channel 1 circuit 308 or VCE channel 2 circuit 309 will receive analog voice information, digitize the voice information, compress and encode the digitized voice information into packets and load the packets into dual port RAM (Random Access Memory) 307 for receipt by the data processor 318. These compressed voice packets are then statistically multiplexed with the facsimile picture packets and/or the asynchronous data packets from asynchronous channel cards 401a and 401b for multiplexed transmission over the composite link lines 313a or 313b. The packets are collected and transmitted over the telephone line using a proprietary synchronous data link format which, for purposes of the present discussion, is described as a modified high speed data link control or MHDLC using a proprietary priority statistical multiplexing algorithm described more fully below.

Operation of the Voice/Facsimile Channel Interface

The VCE channel 1 circuit 308 and VCE channel 2 circuit 309 of FIG. 4B are identical circuits which are capable of operating in parallel to transmit and receive signals to and from telephones and facsimile machines. Illustrated in FIG. 4B for VCE channel 1 circuit 308 and VCE channel 2 circuit 309 are three types of telephone line interfaces labeled FXS, FXO, and E&M. The FXS acronym stands for Foreign Exchange Station. The FXS interface mimics the subscriber-side of a standard tip and ring two-wire telephone connection either as a loop or a ground start configuration. The FXO acronym stands for Foreign Exchange Office. The FXO interface mimics the central office or provider-side of a standard tip and ring two-wire telephone connection. The E&M acronym was historically designated in telephone circuit diagrams as the "e" in "received" and the "m" in "transmit" for trunk signalling. The E&M interface mimics a typical PBX trunk interface.

Figure 5A:
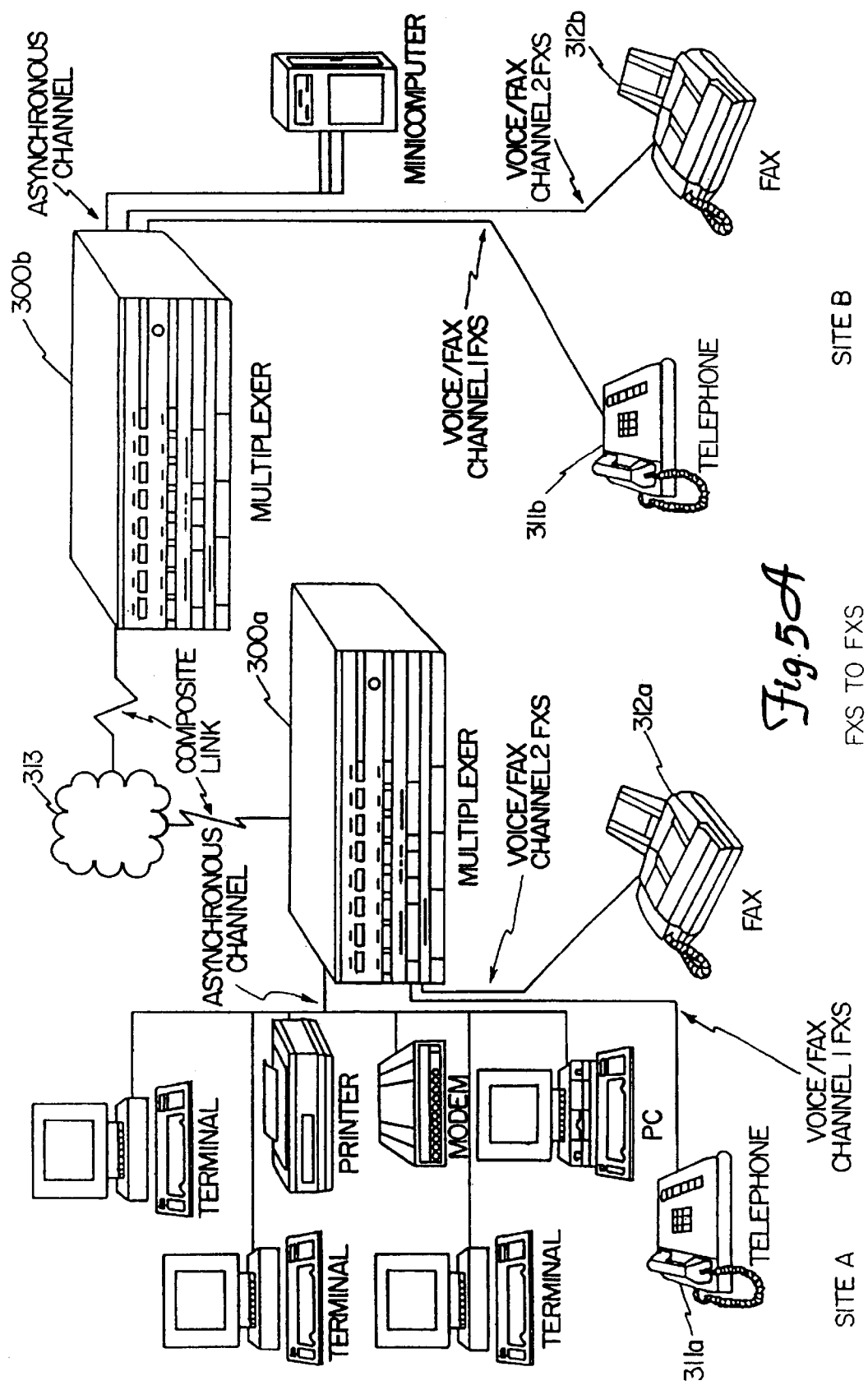
FIG. 5A is a diagram showing a first one of the preferred connections of the present invention which multiplexes voice telephone, facsimile information and digital data information for transmission to and demultiplexing at a remote site for connection to other DTE devices and for connection to remote voice telephone and facsimile equipment.
Figure 6B:
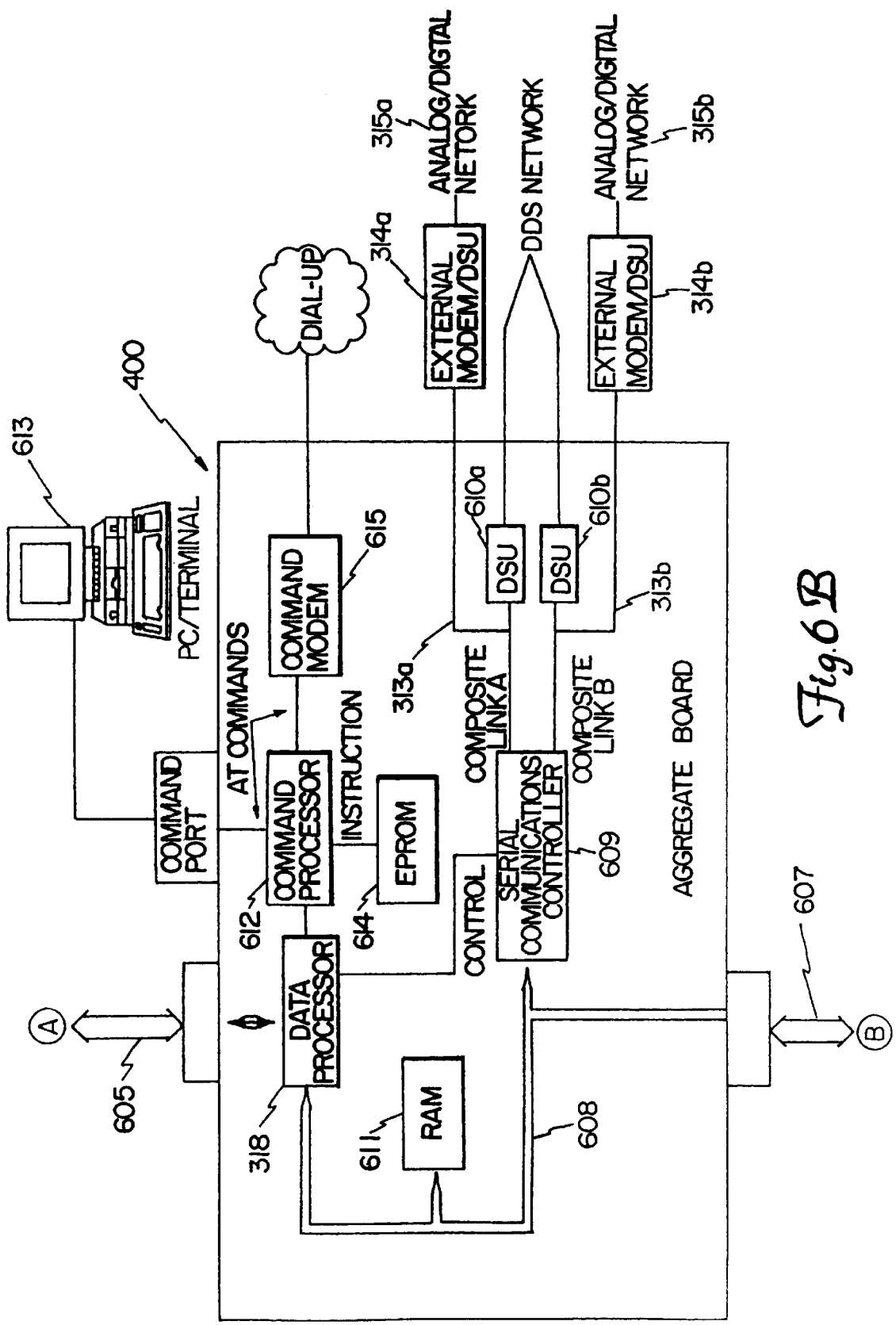
Figure 6C:
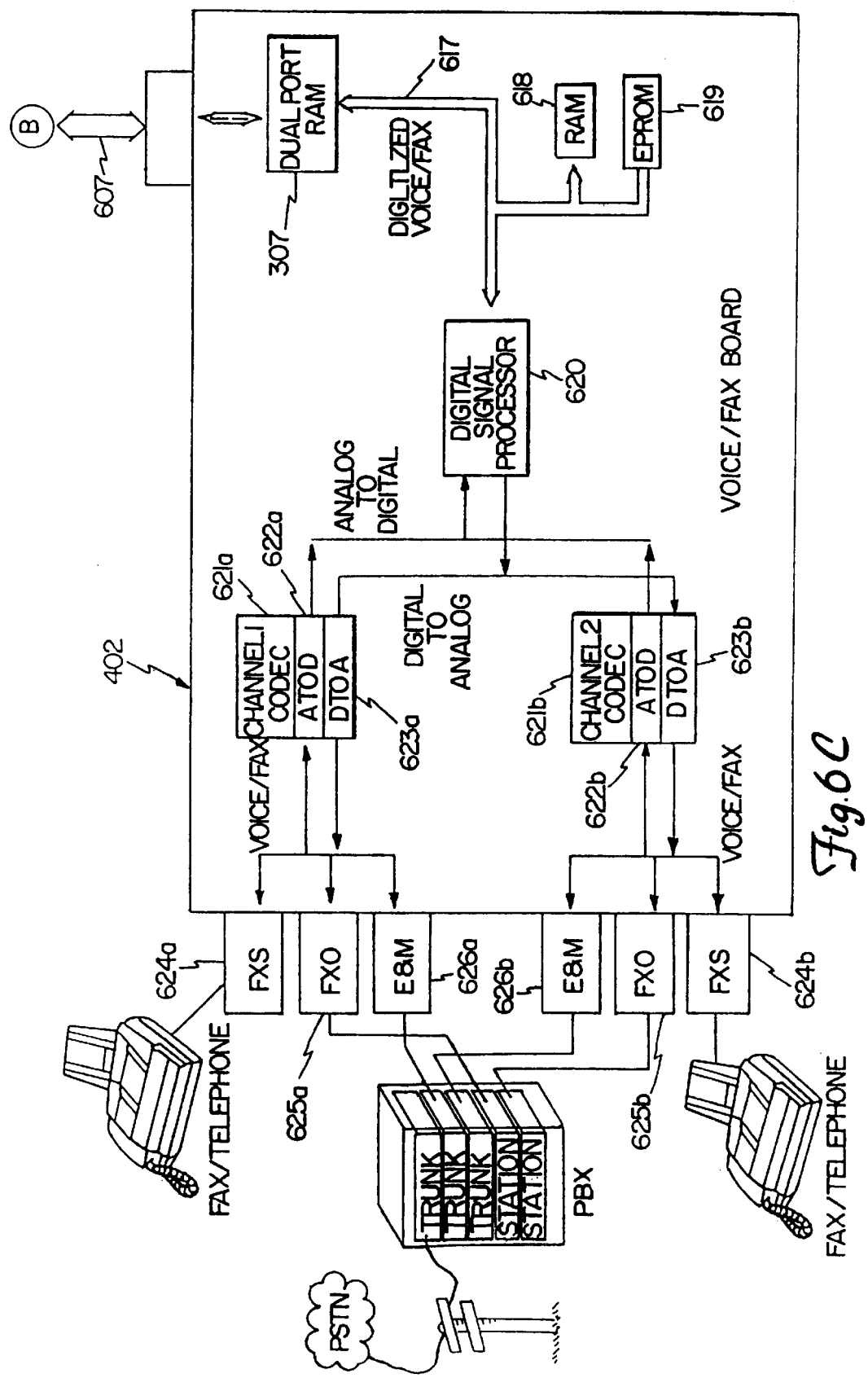

As shown in more detail in FIG. 6C, each voice channel card is capable of handling the three interfaces: FXS, FXO and E&M to provide a wide variety of connectivity for interfacing to different types of telephone equipment. Four of these types of connections are illustrated in FIGS. 5A though 5D.

As shown in FIGS. 5A, a telephone or facsimile machine may be connected to the FXS interface at Site "A", which will appear to this equipment as though it were connected to the subscriber side of a standard tip and ring two-wire analog telephone connection. The FXS connection on VCE channel 1 circuit 308 or VCE channel 2 circuit 309 shown in FIGS. 4A and 4B would appear to be a telephone central office (CO) to this telephone equipment (or a PBX-mimic of a CO). Thus, if a user picked up the handset of a standard telephone connected to the FXS interface at Site "A" of FIG. 5A, the telephone or fax machine at site "B" would ring.

A PBX may be connected to the FXO interface on VCE channel 1 circuit 308 or VCE channel 2 circuit 308 shown in FIGS. 4A and 4B. Referring to FIG. 5B, the PBX at site "B" is attached to the FXO interface of the multiplexer 300b. The PBX at site "B" will see the multiplexer FXO interface as a piece of telephone equipment responding to the PBX connection. A telephone or fax machine at site "A" is connected to the FXS interface of multiplexer 300a but will appear to be connected to the station connection of the PBX at site "B". The telephone or fax machine at site "A" will then be able to dial any extension serviced by the PBX at site "B" or dial out to the local Public Switched Telephones Network (PSTN) from the PBX. The telephone or fax equipment at site "A" appears to be directly connected to the PBX at site "B".

A PBX trunk interface may also be connected to the E&M interface on VCE channel 1 circuit 308 or VCE channel 2 circuit 308 shown in FIGS. 4A and 4B. Referring to FIG. 5C, the trunk interface of the PBX at site "B" is attached to the E&M interface of the multiplexer 300b. The PBX at site "B" will see the multiplexer E&M interface as a trunk telephone line responding to the PBX connection. A telephone or fax machine at site "A" is connected to the FXS interface of multiplexer 300a but will appear to be connected to the PBX at site "B" through the trunk interface. The telephone or fax machine at site "A" will then be able to dial any extension serviced by the PBX at site "B" or dial out to the local Public Switched Telephones Network (PSTN) from the PBX. The telephone or fax equipment at site "A" appears to be directly connected to the PBX at site "B". The telephone or fax equipment serviced by the PBX at site "B" can access the telephone or fax equipment at site "A" by calling the appropriate trunk number for site "A".

A PBX trunk interface of PBX equipment at both sites "A" and "B" may be connected to the E&M interface on VCE channel 1 circuit 308 or VCE channel 2 circuit 308 shown in FIGS. 4A and 4B. Referring to FIG. 5D, a trunk interface of the PBX at site "A" is attached to the E&M interface of the multiplexer 300a and a trunk interface of the PBX at site "B" is attached to the E&M interface of the multiplexer 300b. The PBX at site "A" will see the multiplexer E&M interface as a trunk telephone line responding to the PBX connection and the PBX at site "B" will see the multiplexer E&M interface as a trunk telephone line responding to the PBX connection. Both PBX's will see the other PBX as a direct connection through a trunk line. The telephone or fax machine at site "A" will then be able to dial any extension serviced by the PBX at site "B" or dial out to the local Public Switched Telephones Network (PSTN) from the PBX at site "B" Similarly, the telephone or fax machine at site "B" will then be able to dial any extension serviced by the PBX at site "A" or dial out to the local Public Switched Telephones Network (PSTN) from the PBX at site "A"

Asynchronous Channel Cards

FIG. 6A is a detailed block diagrams of the asynchronous channel cards. As described above, the present system is modular in its design to allow a variable number of asynchronous channel interfaces. Thus, FIG. 6A such channel boards 600a, 600b, 600c, 600d, each capable of collecting asynchronous data from eight RS 232 interfaces for a total of 32 RS 232 asynchronous interfaces.

Each channel board 600a, 600b, 600c, 600d, is identical in design and commonly referenced as channel board 600. Each channel board 600 is controlled by a channel processor 306 to collect and distribute asynchronous data to and from the eight channels through I/O interfaces 602a, 602b, 602c, 602d. The I/O interfaces communicate with channel processor 306 via a bus to share a data path. Channel processor 306 utilizes a local RAM memory 604 for storing the operation and control programs. The asynchronous data collected or the asynchronous data to be distributed is transferred to and from the aggregate card or board 400 of FIG. 6B along channel data bus 605. The channel data bus 605 is continued on FIG. 6B through connection point A.

In an alternate embodiment of the present invention, the channel processor 306 can compress the asynchronous data using a compression algorithm such as the algorithm used in the CCITT V.42bis standard. Also, the channel boards 600a, 600b, 600c, 600d, may operate to receive synchronous data for multiplexing over the composite link.

Aggregate Card

Aggregate card 400 of FIG. 4B is shown in greater detail in the block diagram of FIG. 6B. A data processor 318 controls the internal operation of aggregate card 400 and performs the functions of collecting asynchronous data from bus 605, collecting voice and fax data packets from interface 607, and multiplexing and framing the various data packets and call signalling packets into synchronous data packets. Data processor 318 in the preferred embodiment is a Z180 microprocessor. A RAM memory 611 on internal bus 608 supports data processor 318 to store control programs and to buffer packet information received from the voice/fax board 402 via connection 607. The synchronous data packets are sent from data processor 318 along internal bus 608 to a serial communications controller 609. Serial communications controller 609 operate under the control of the data processor 318 via control lines separate from the internal bus 608. The synchronous data stream may be transmitted via a variety of paths through serial communications controller 609 as composite links. External synchronous modems 314a and 314b provide modem communications over active two-wire or four-wire leased lines or an alternative communication path may be established via DSU (Digital Service Units) 610a and 610b to digital data networks.

Data processor 318 is under direct control of command processor 612 which supports a local connection to a status and control PC 613 and a remote connection to the status and control PC at the remote site through dial-up modem 615 for coordination of configuration information and operating parameters. The command processor maintains the configuration information and operating parameters in a non-volatile EPROM memory 614.

Voice/Fax Card

A dual channel voice/fax card 402 is shown in the detailed block diagram of FIG. 6C. Voice Channel Equipment (VCE) Channel 1 circuit 402a and VCE Channel 2 circuit 402b of FIG. 5 are implemented on a single card 402 shown in FIG. 6C. The local incoming analog voice information or fax carrier is received on the FXS interfaces. The remote reconstructed analog voice information or fax carrier is produced locally on the FXO interfaces. The PBX trunk signalling is produced on the E&M interfaces.

The incoming analog voice information or fax carrier is received on the FXS interface 624a and 624b and converted from analog information to digital samples by analog to digital converters 622a or 622b, respectively. The digital samples are passed to digital signal processor 620 which either decodes the fax carrier information if fax information is detected or compresses the voice data if voice information was detected. The voice compression algorithms are described more fully below. The compressed voice data is placed in packets by the digital signal processor 620 and passed to the data processor 318 of FIG. 6B in via interface 607 through connection point B. The fax picture data is similarly packetized by the digital signal processor 620 and passed to the data processor 318 of FIG. 6B.

Detailed Electrical Schematic Diagrams

Figure 7A:
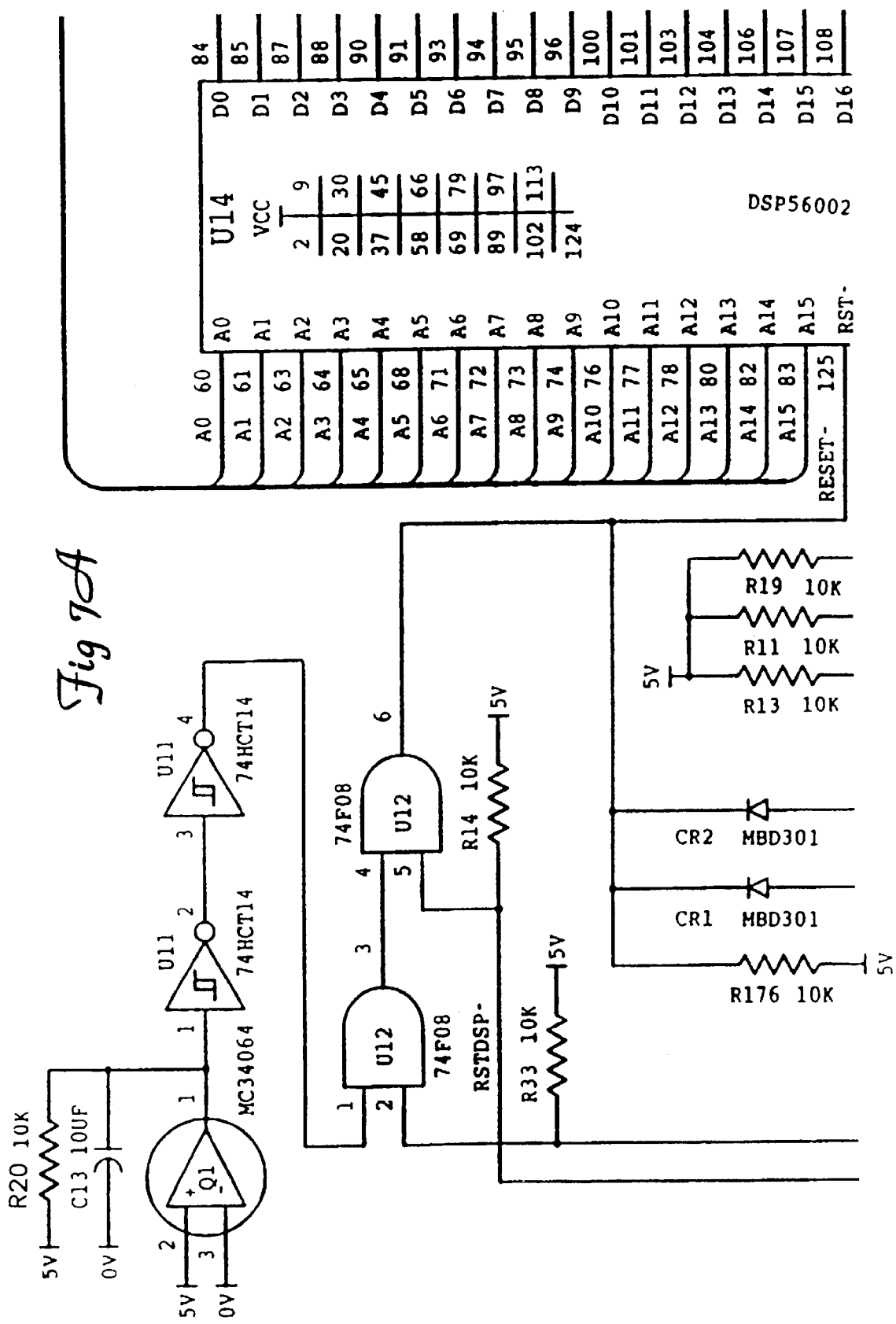
Figure 7B:
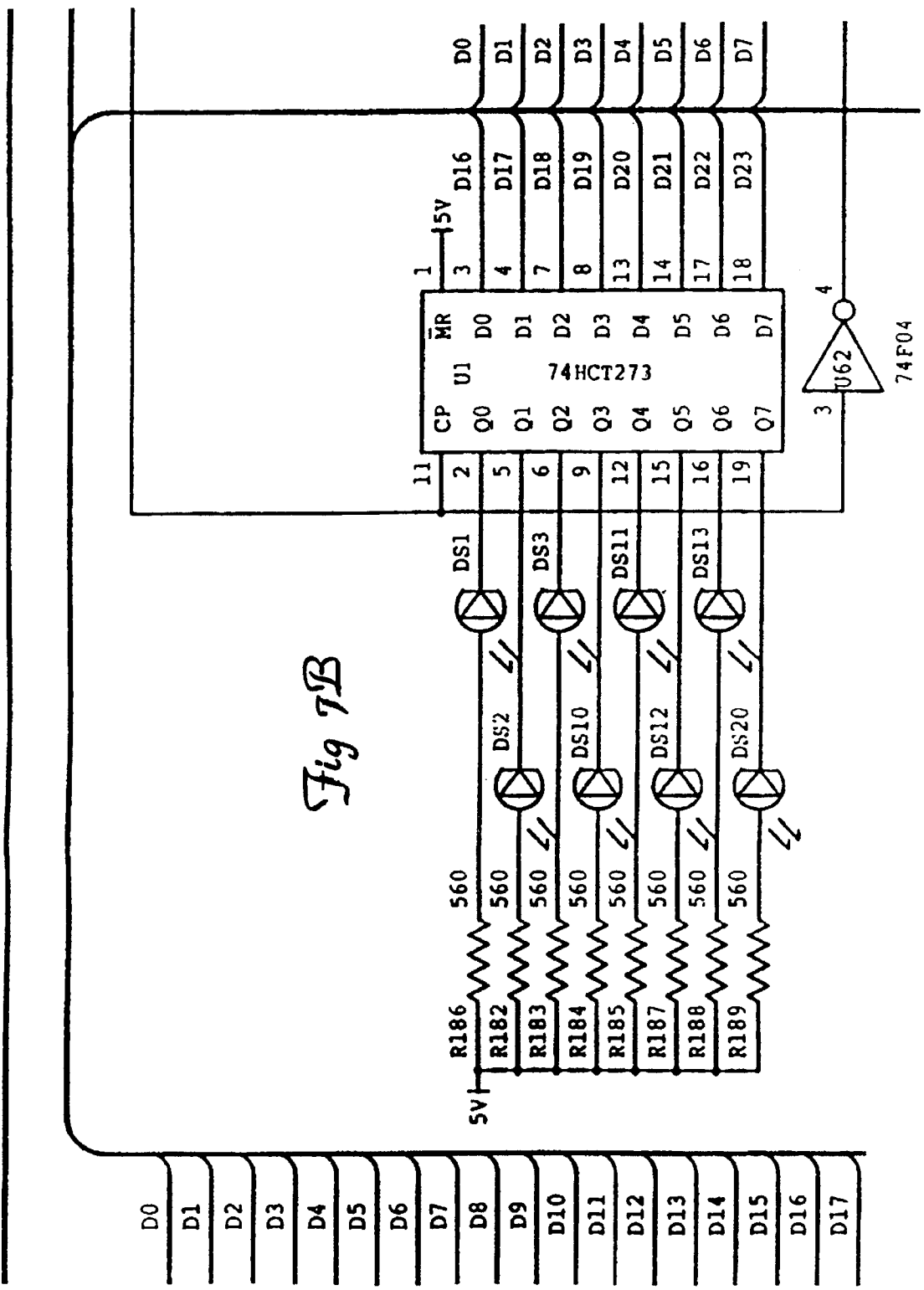
Figure 7C:
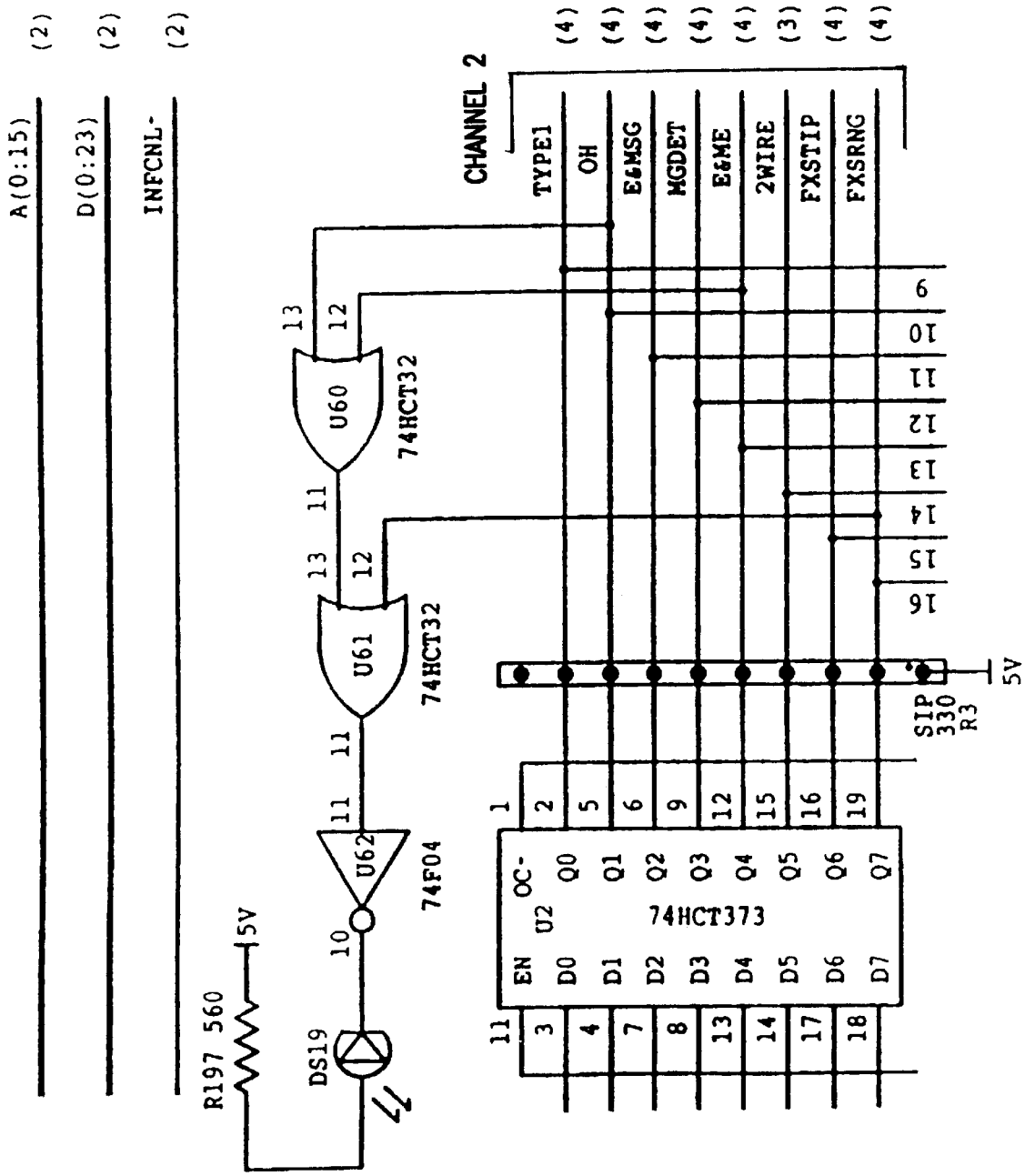
Figure 7D:
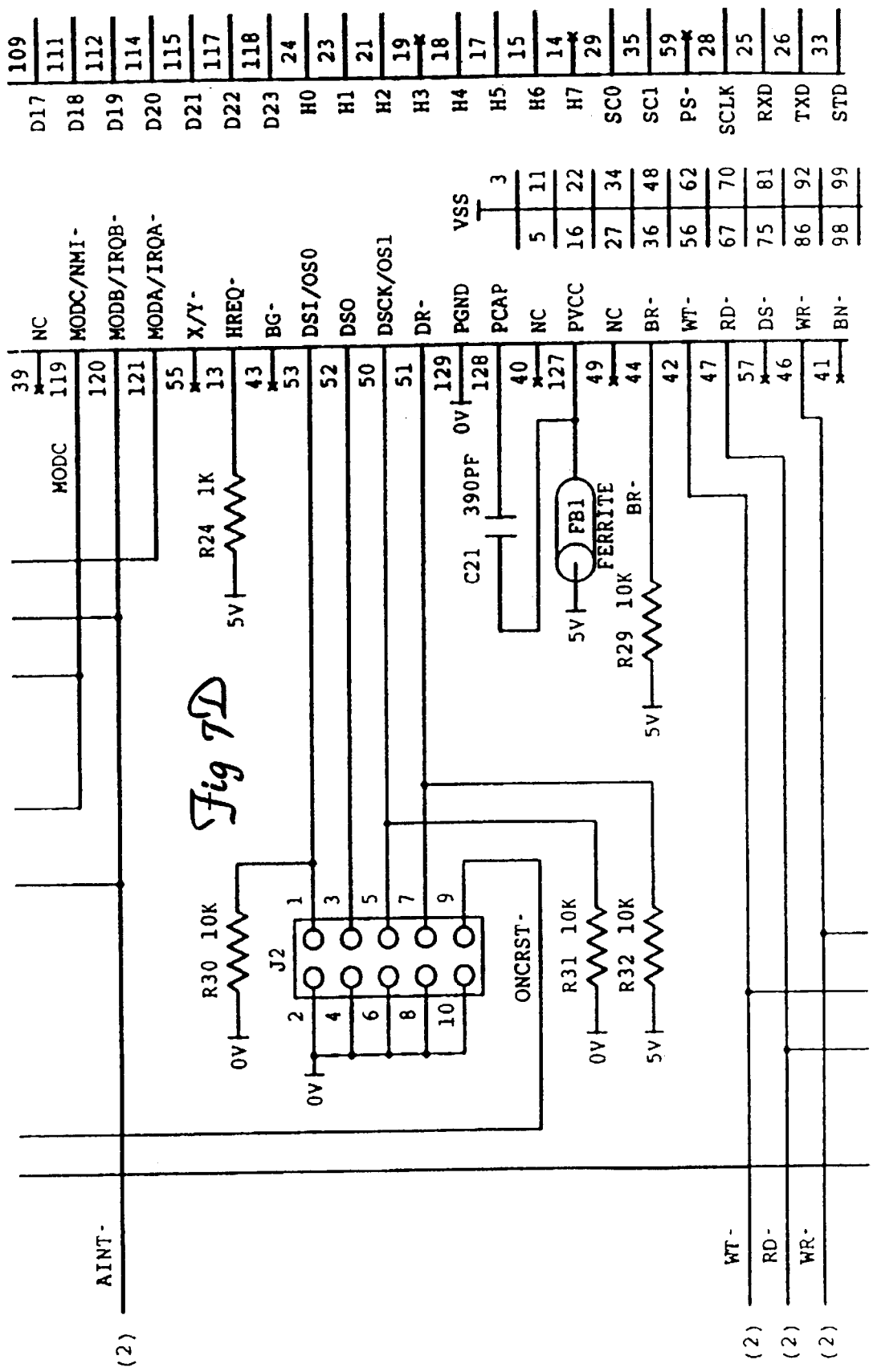
Figure 7E:
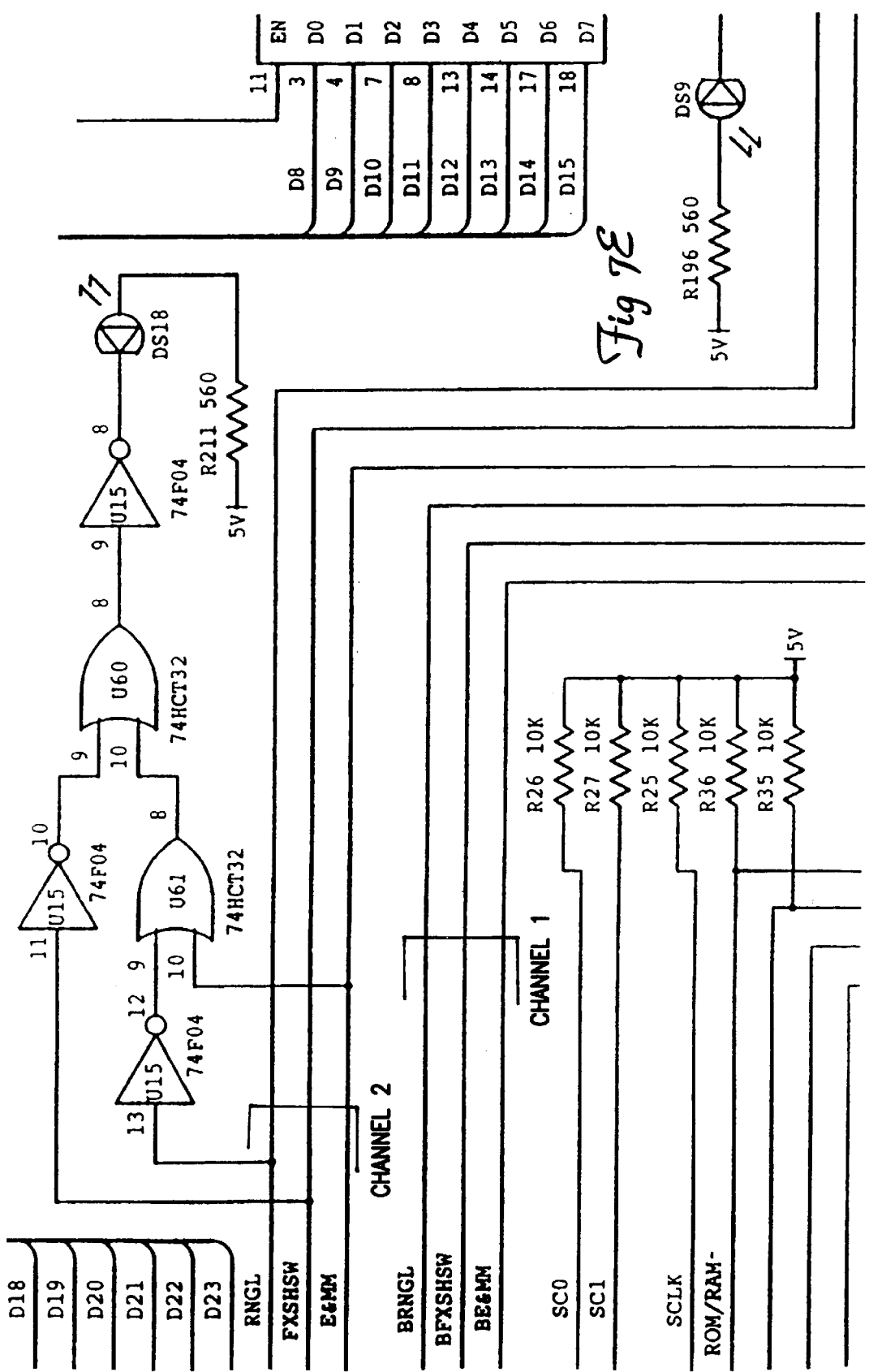
Figure 7F:
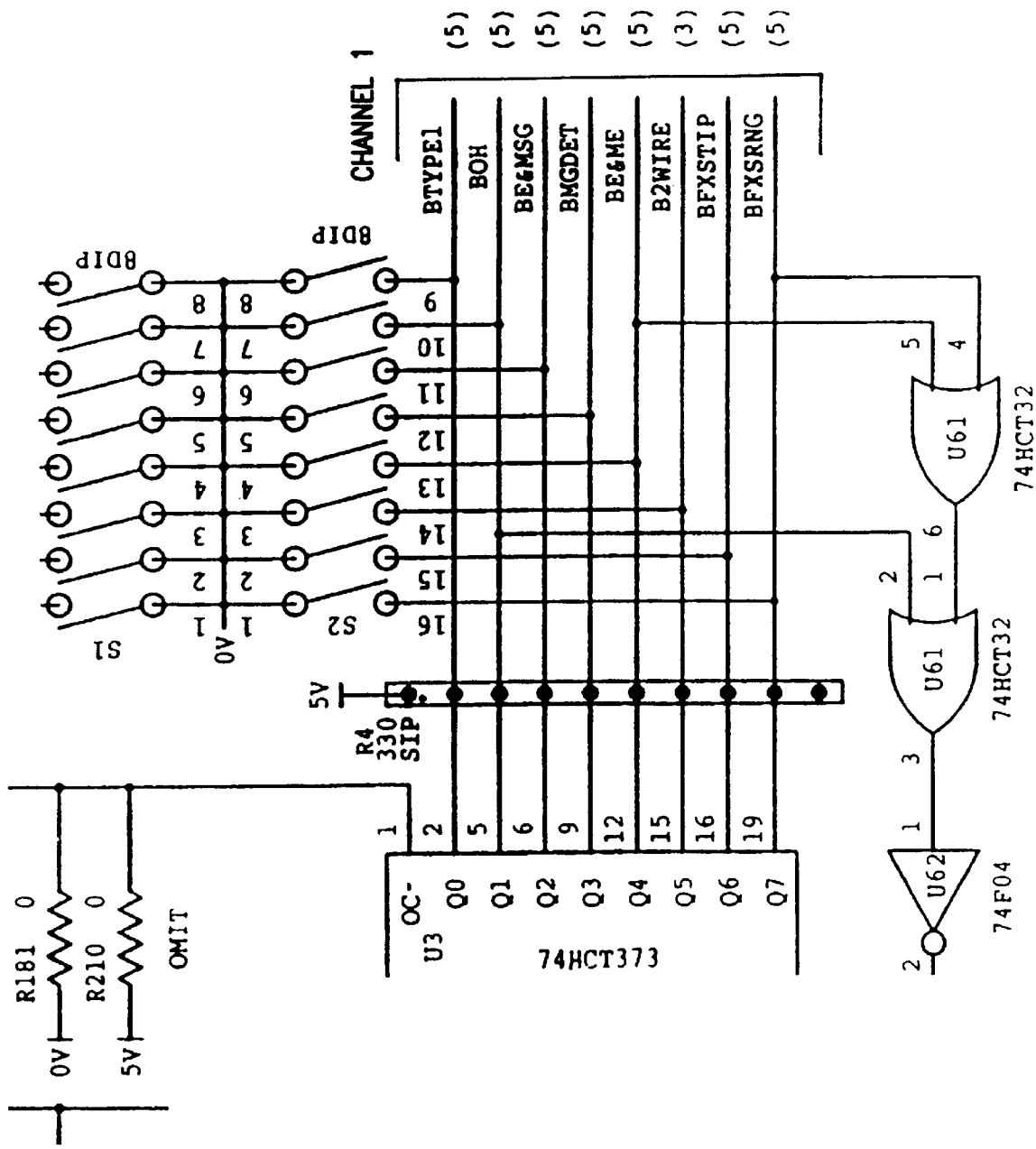
Figure 79:
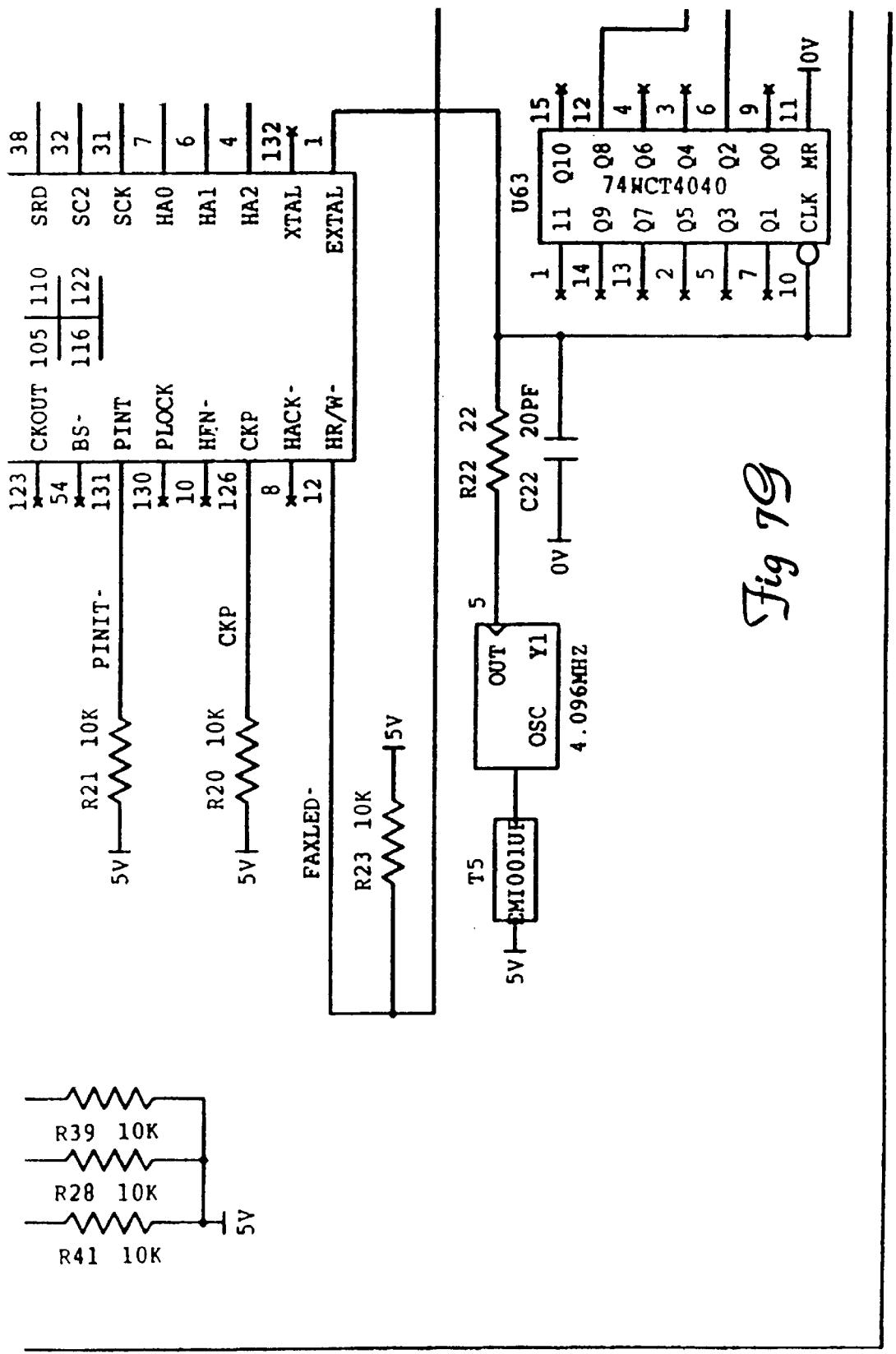
Figure 7H:
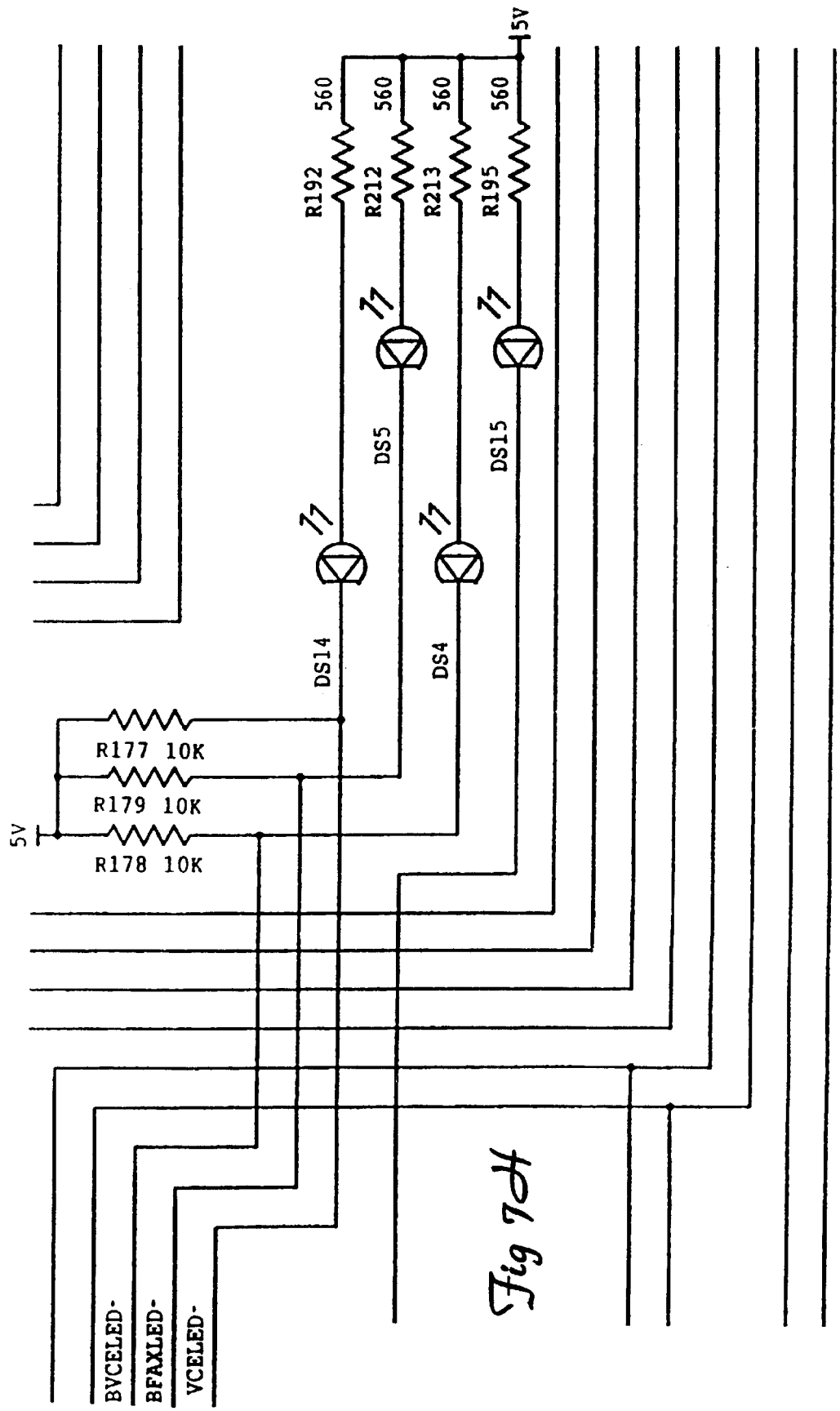
Figure 7D:
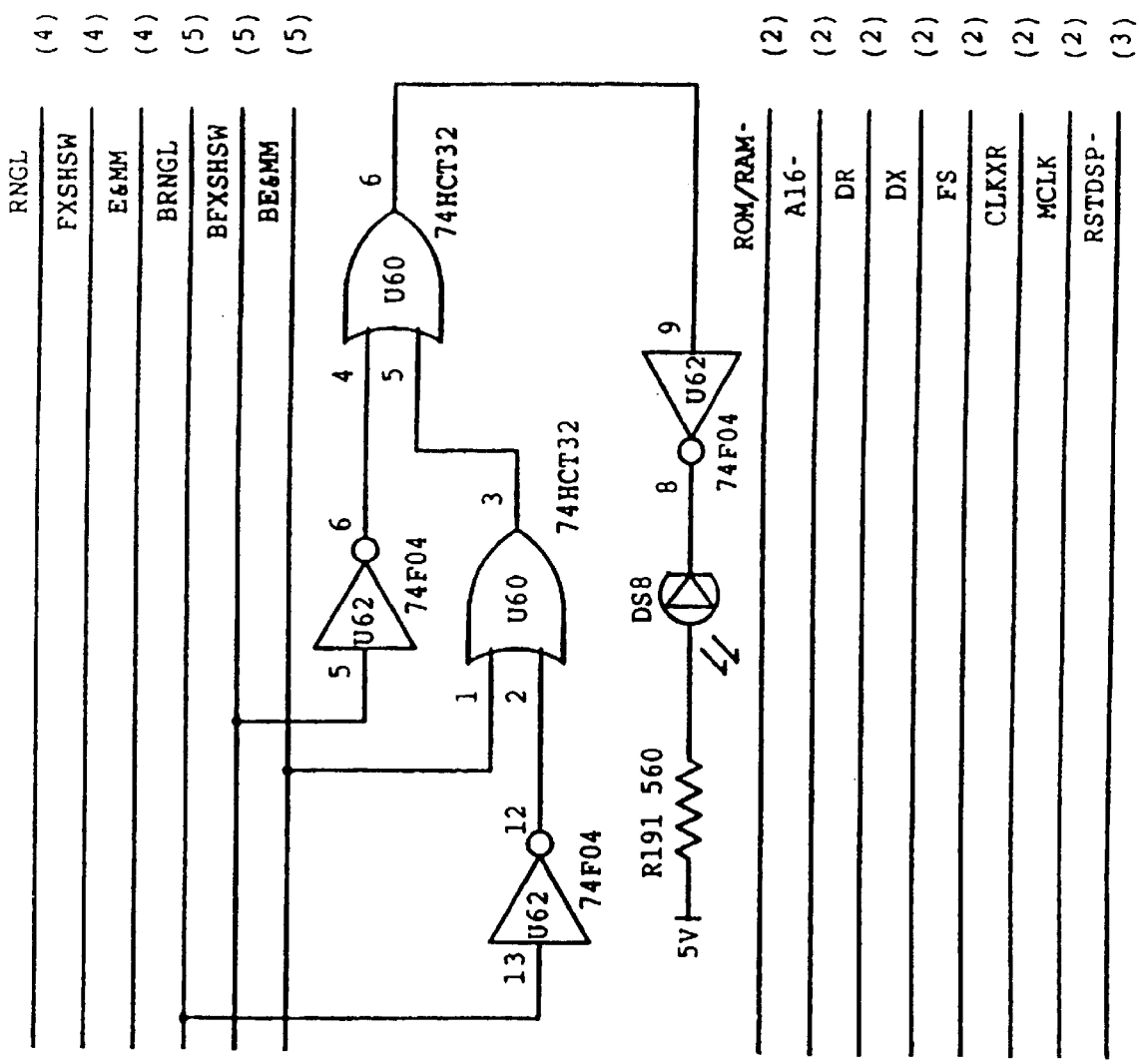

FIGS. 7A–7B, 8A–8B, 9A–9B and 10A–10B are detailed electrical schematic diagrams of the circuits depicted in block diagram form in FIGS. 6C. In FIG. 7A, the DSP 56002 circuit U14 corresponds to the digital signal processor (DSP) 620 of FIG. 6C which functions to compress and decompress digitized voice signals and handle the call progress signals. The call progress signalling establishes the calls before the voice compression or decompression starts through the FXS, FXO and E&M interfaces. DSP 56002 also functions to detect the fax tones and perform fax modulation and demodulation and to perform far-end echo-cancellation in the digital domain.

DSP 56002 circuit U14 controls the FXS, FXO and E&M interfaces to handle the call progress via the data bus D0–D23 through the buffer circuits U2 and U3 for channel 1 and channel 2, respectively. For example, for the FXS interface, the DSP 56002 circuit U14 operates to control the ring of the telephone and detect the off-hook of the telephone. For the FXO interface, DSP 56002 circuit U14 operates to detect the ring from the PBX and returns an off-hook signal to the station side of the PBX. For the E&M interface, DSP 56002 circuit U14 operates to connect to the trunk of the PBX to primarily control the E-lead and M-lead for trunk signalling. Integrated circuit U1 is a buffer circuit used to control the status indicator LED's shown in FIG. 7B.

Figure 10A:
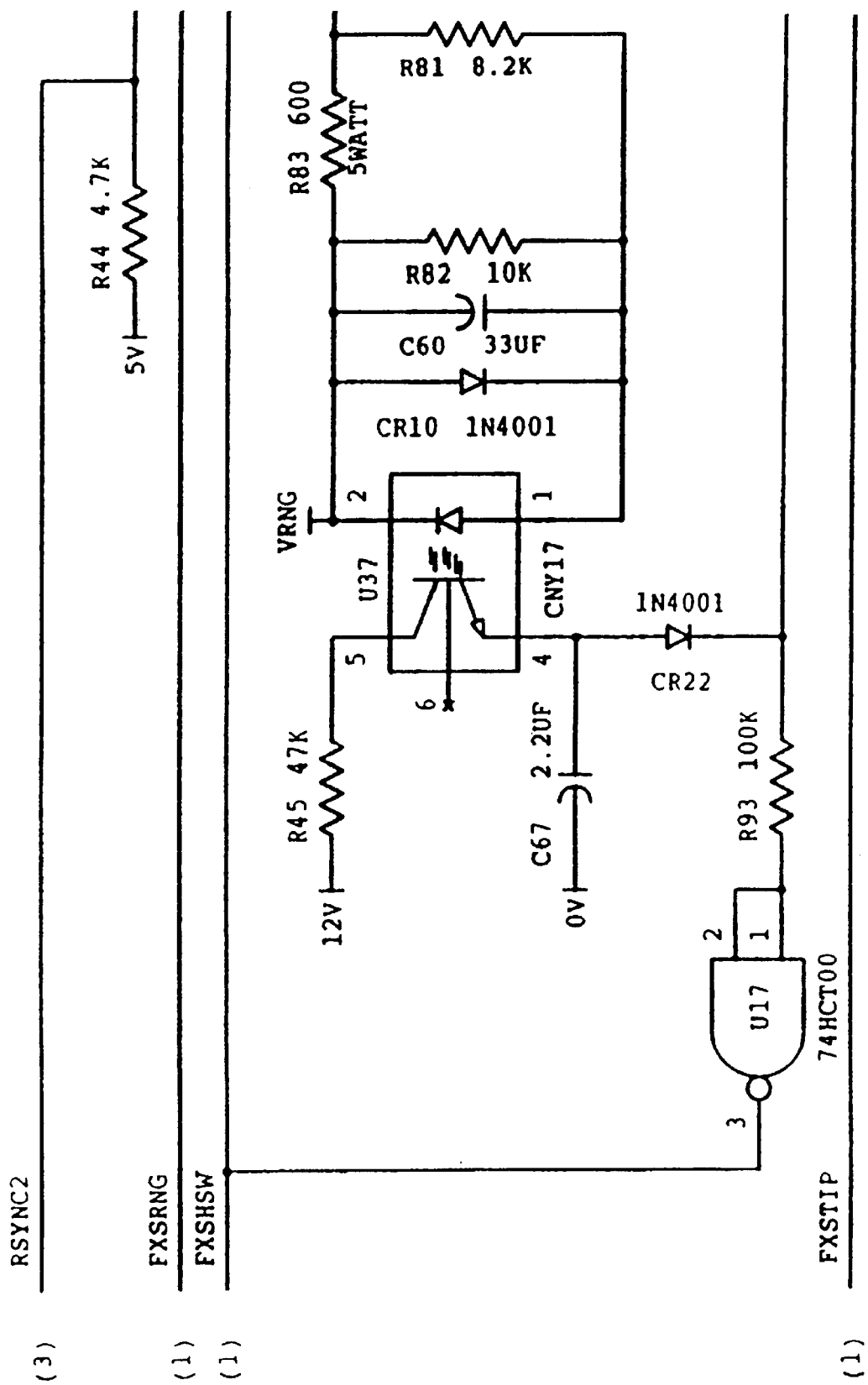
Figure 10B:
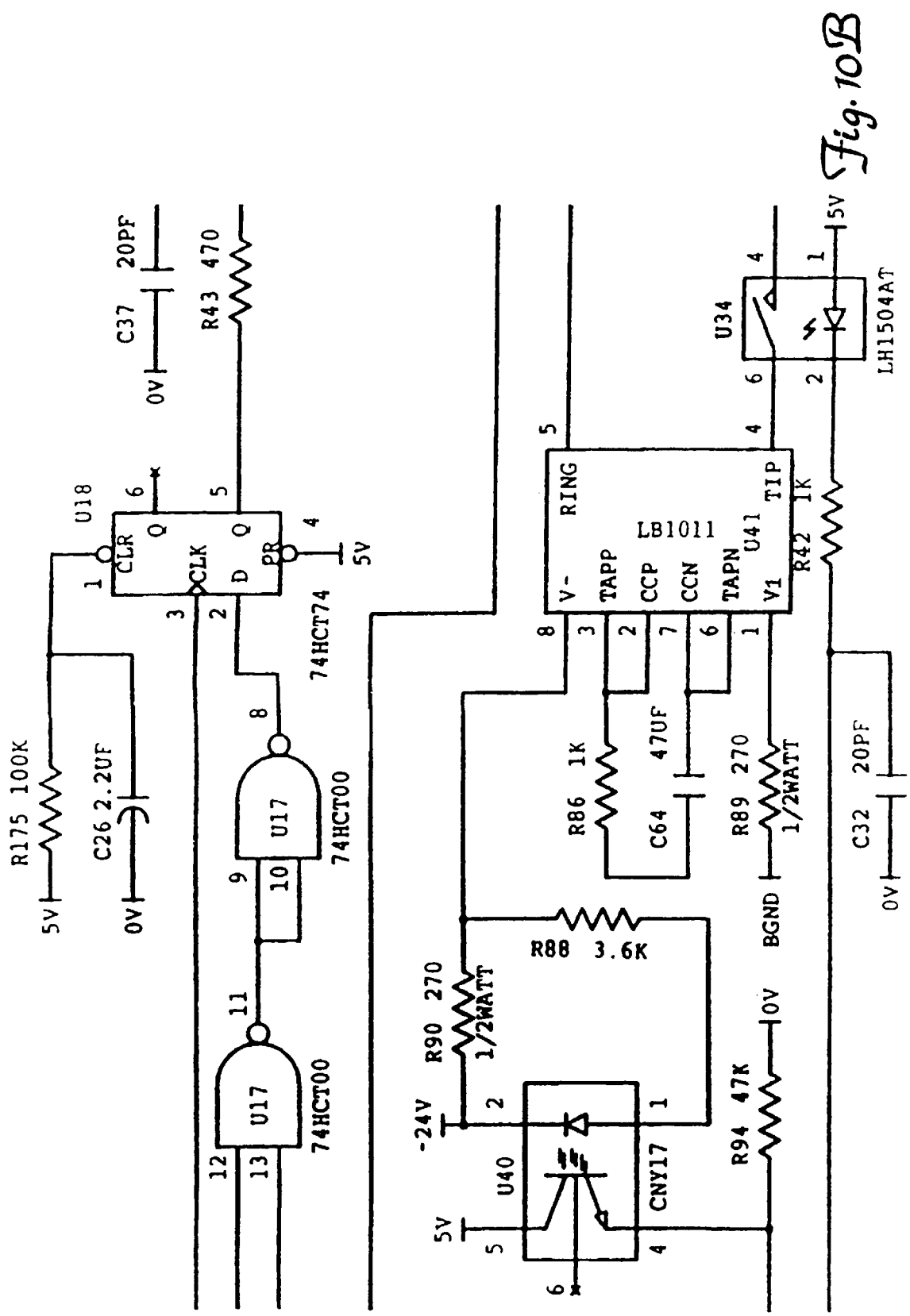
Figure 10C:
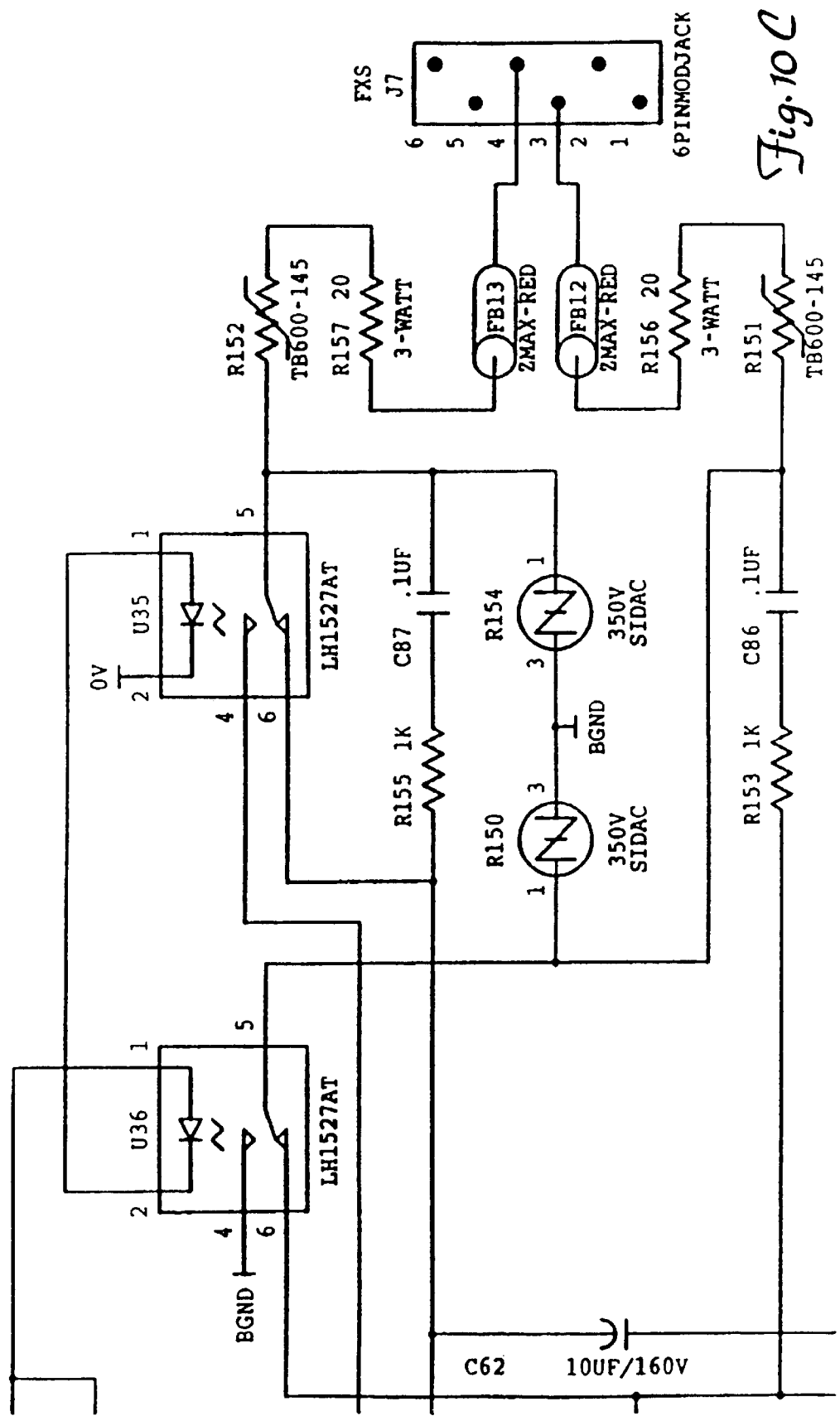
Figure 10D:
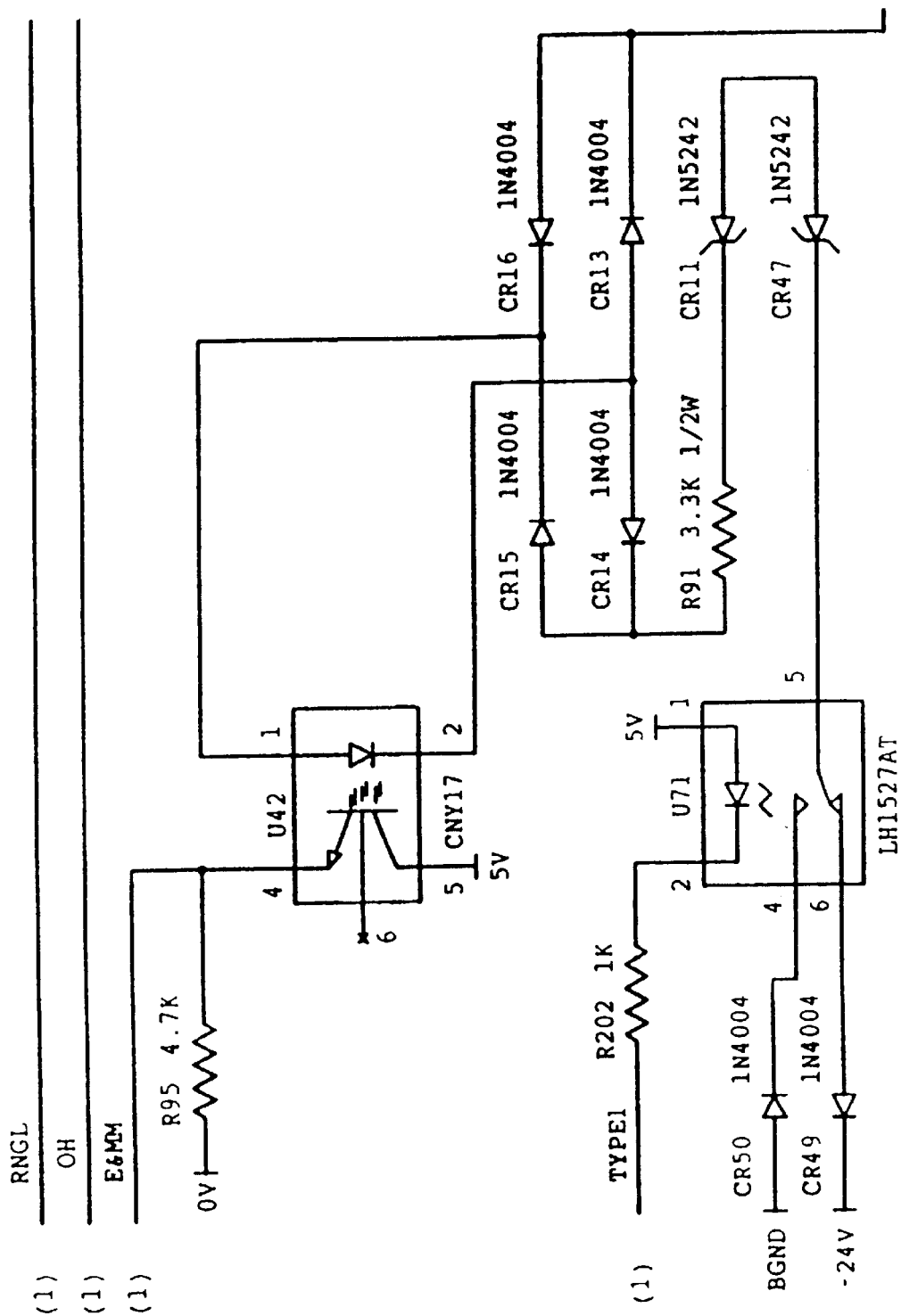
Figure 10E:
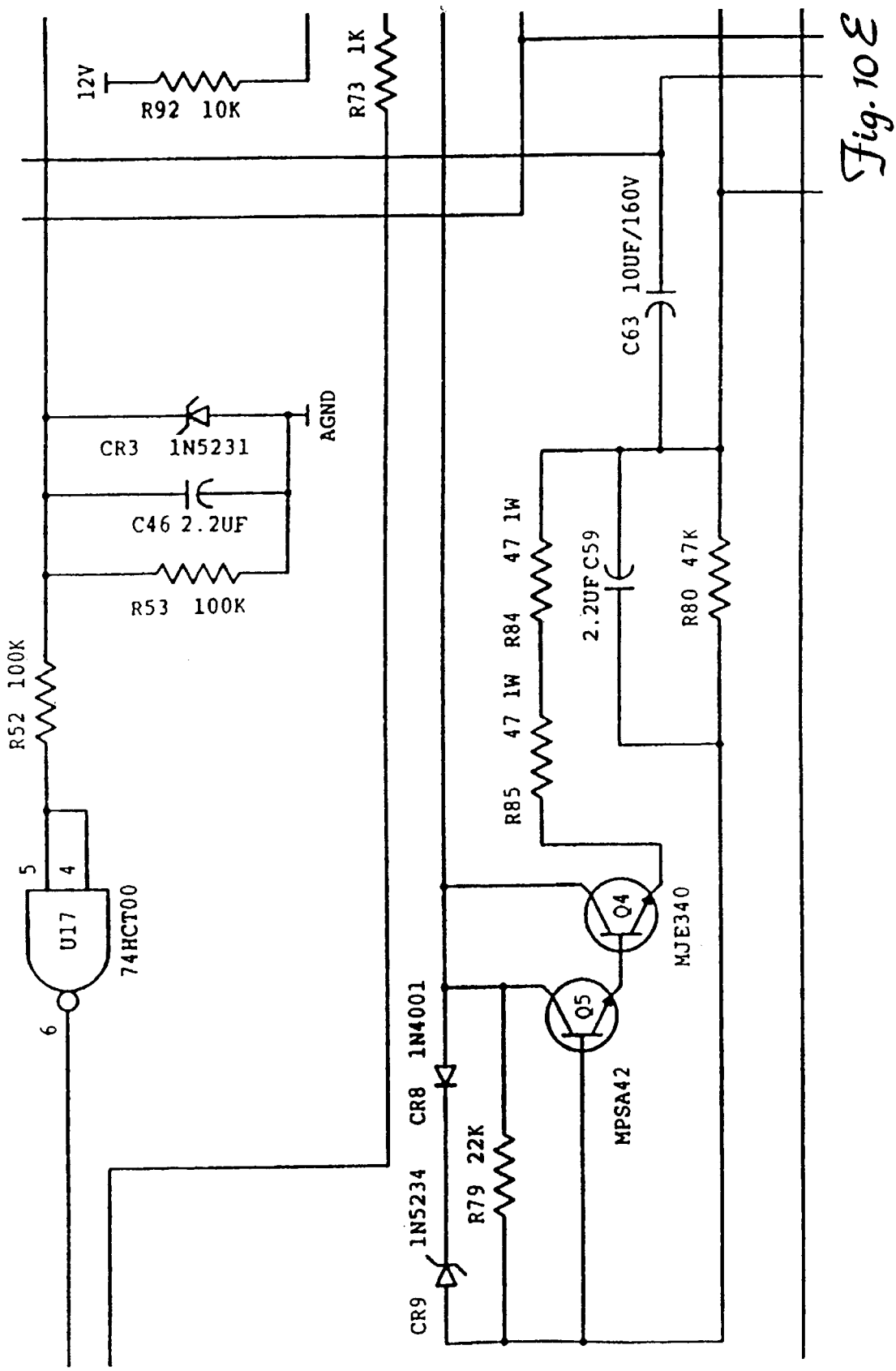
Figure 10J:
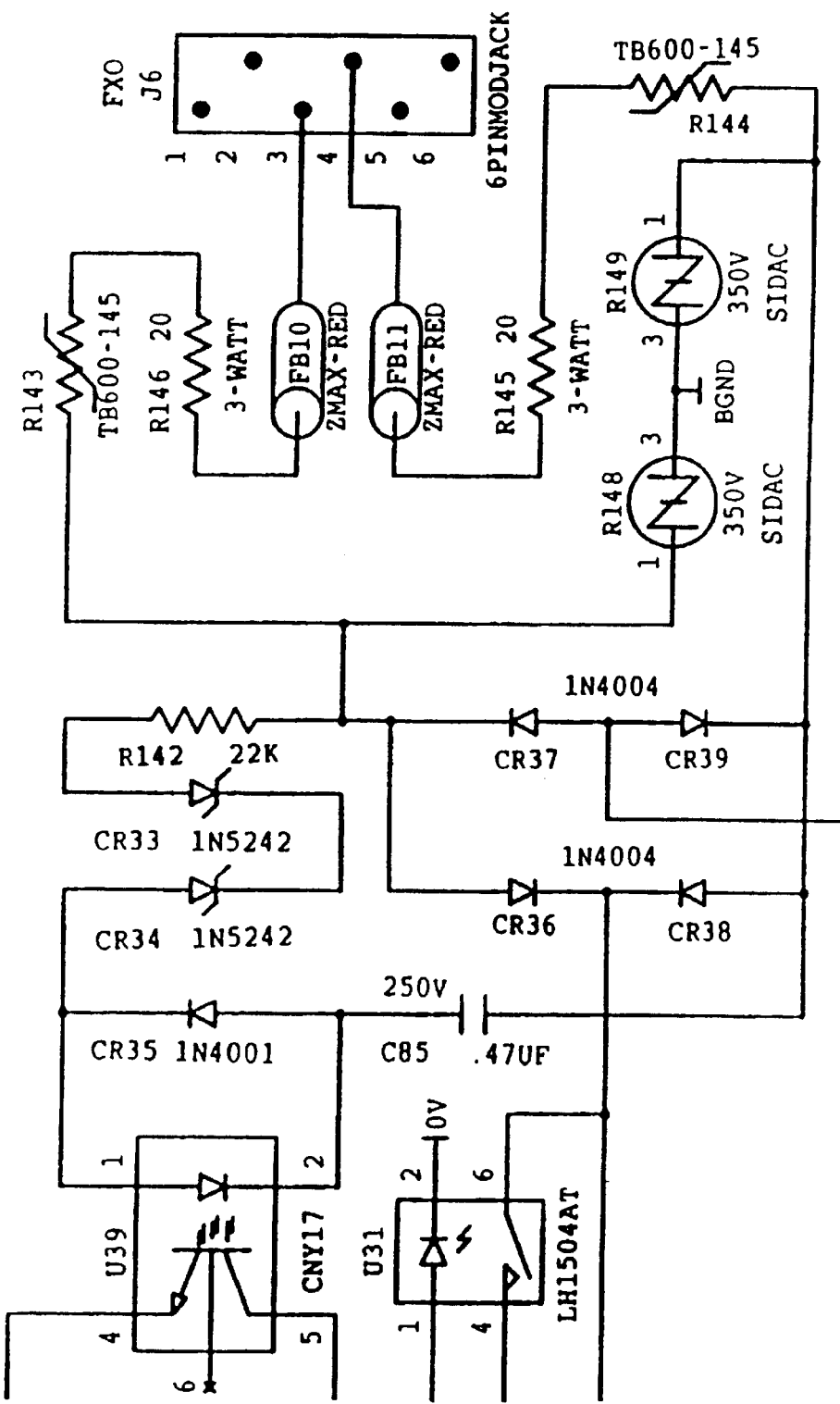
Figure 10G:
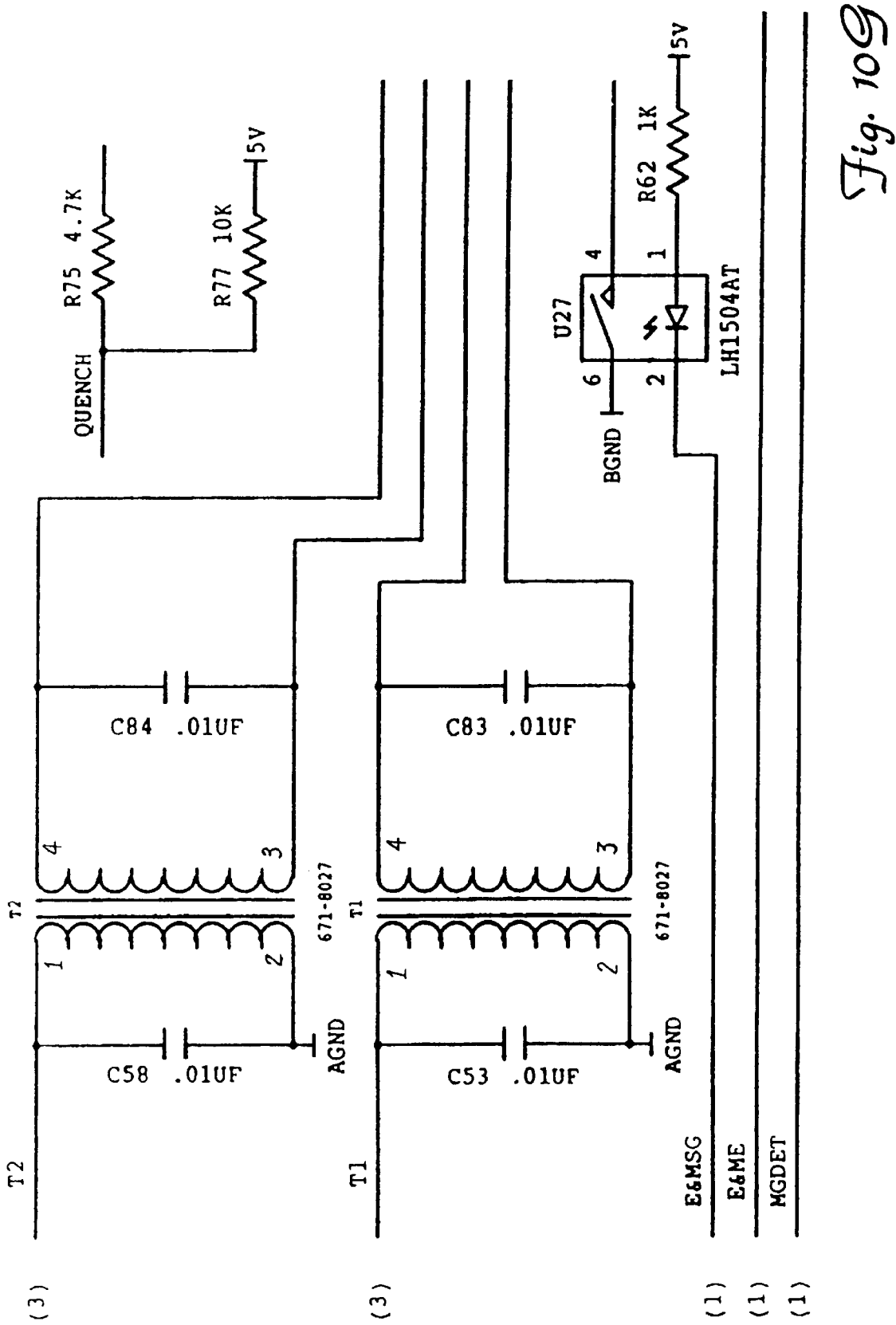
Figure 10H:
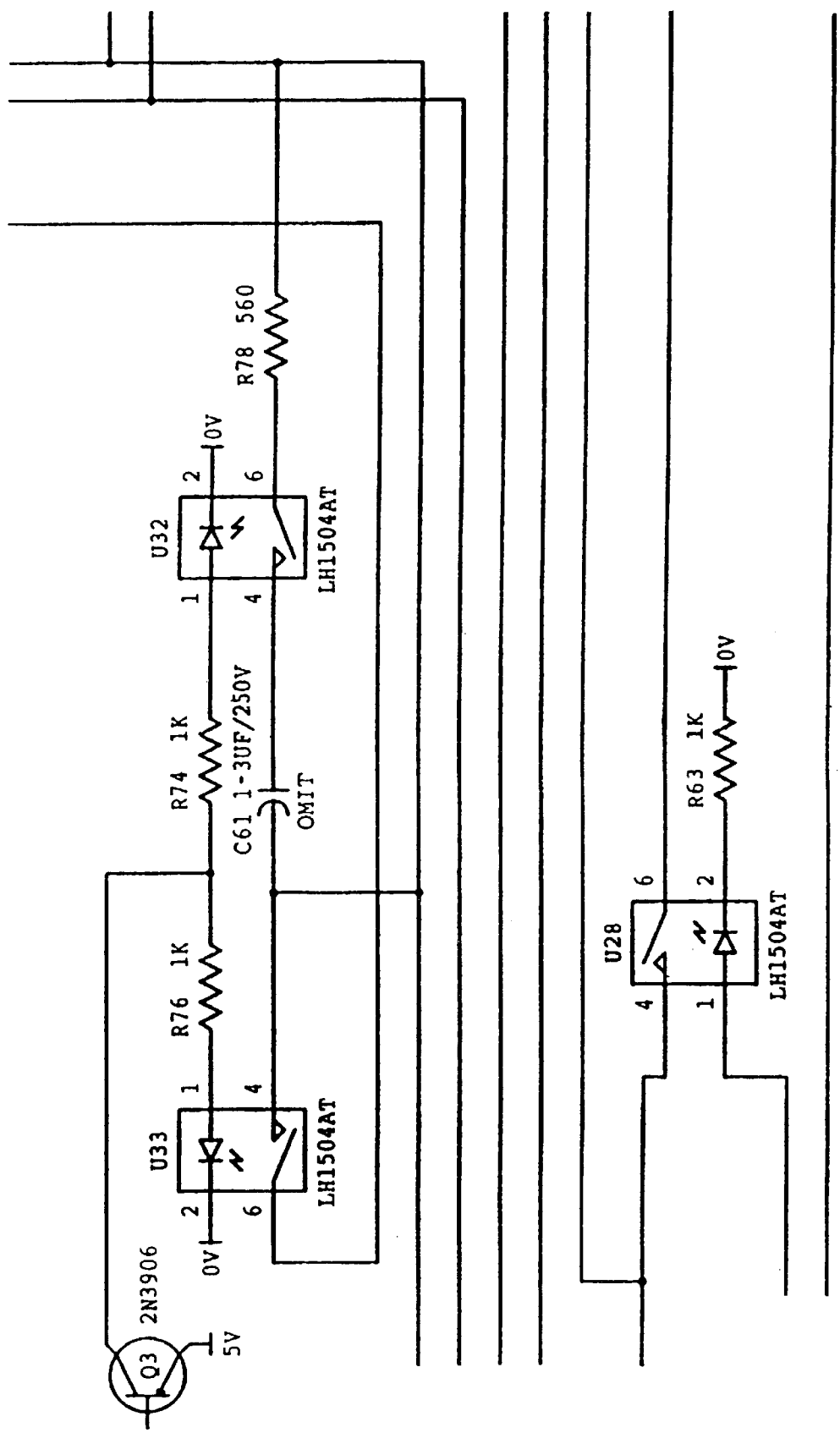
Figure 10J:
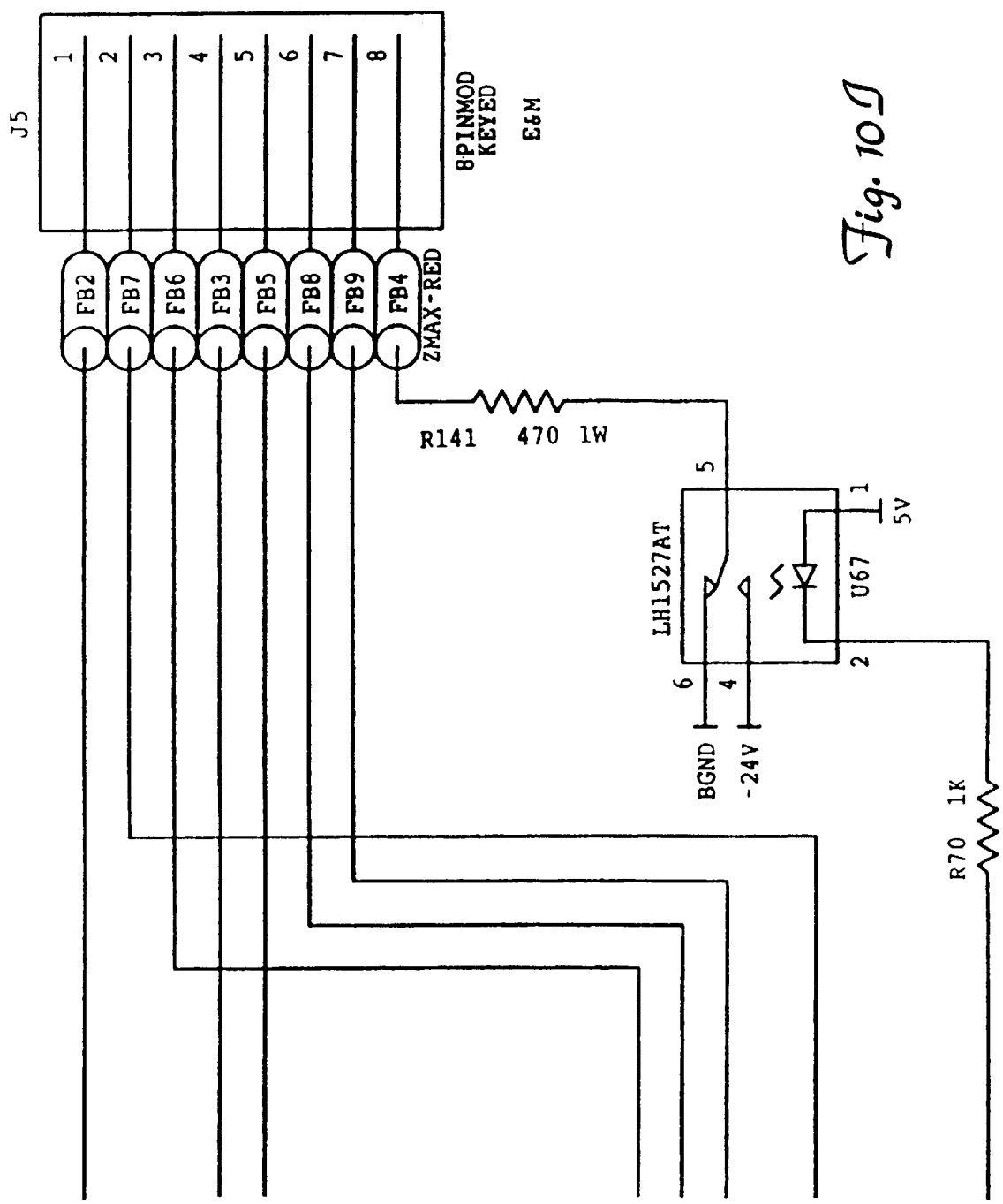

As described above, channel 1 and channel 2 of the voice/fax board are identical and correspond to Voice Channel Equipment (VCE) Channel 1 circuit 402a or VCE Channel 2 circuit 402b of FIG. 5. Only one channel circuit is shown in the electrical schematic diagrams of FIGS. 10A and 10B and the control signal labels shown in the electrical schematic diagram of FIG. 7B match by placing a "B" in front of any control signal label to indicate channel 1. For example, the signal E&ME of the electrical schematic diagram of FIG. 7B matches the signal E&ME of the electrical schematic diagram of FIG. 10A for channel 2 and the signal BE&ME of the electrical schematic diagram of FIG. 7B matches the signal E&ME of the electrical schematic diagram of FIG. 10A for channel 1. In FIGS. 10A and 10B, the FXS, FXO and E&M connections for the voice/fax card 402 are shown to the right of FIG. 10B. The E&M trunk line connector J5 handles both two-wire and four-wire interfaces.

Figure 8A:
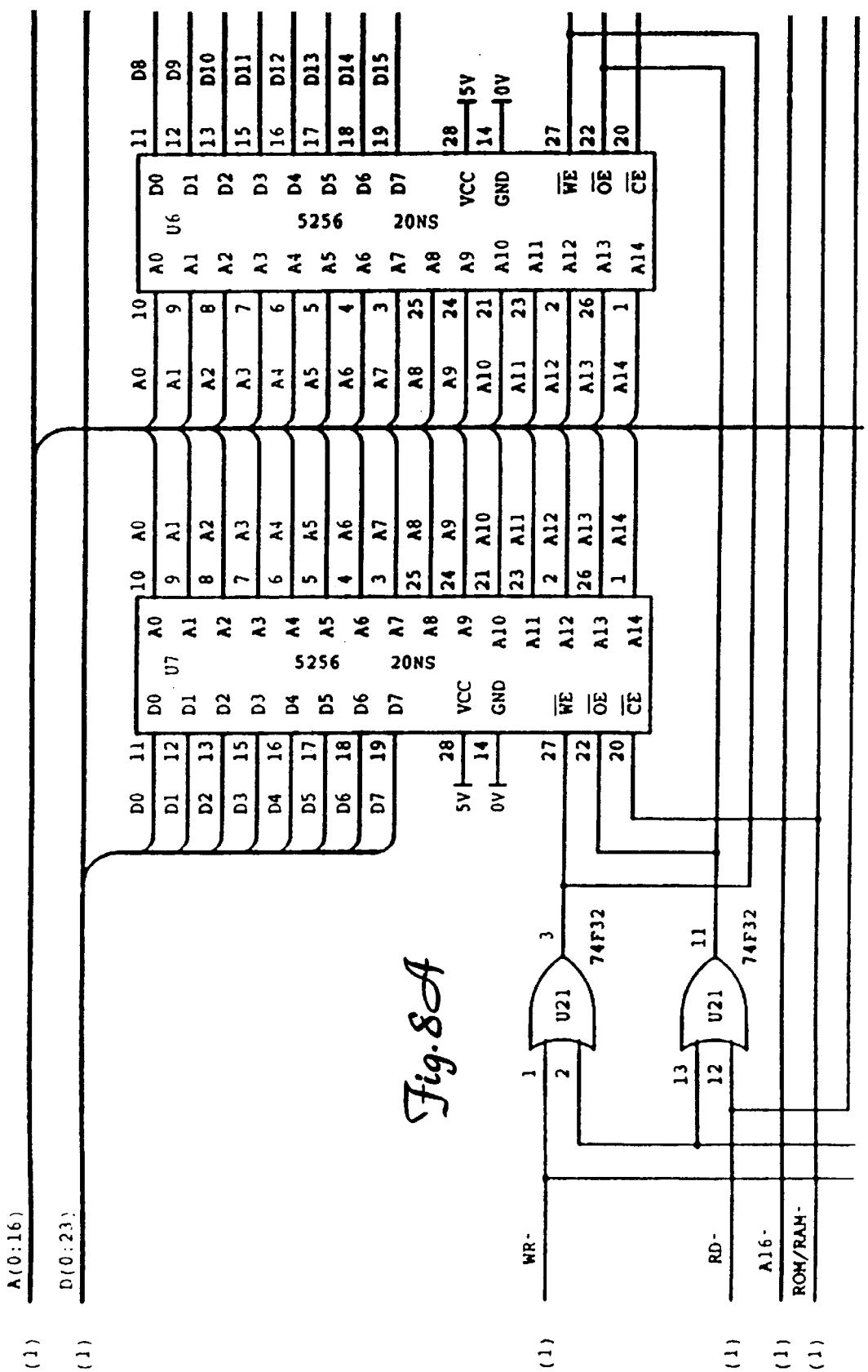
Figure 8B:
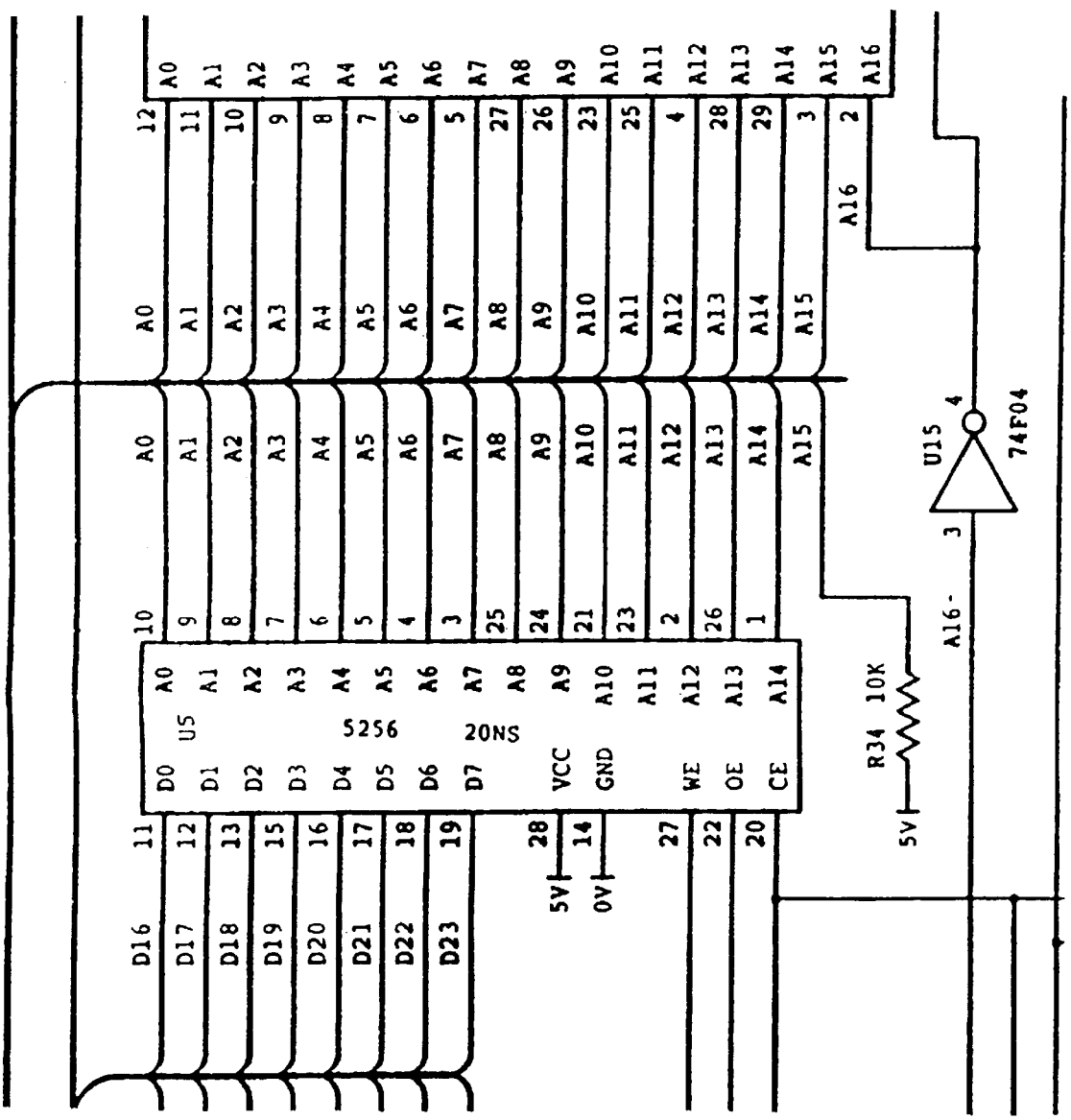
Figure 8C:
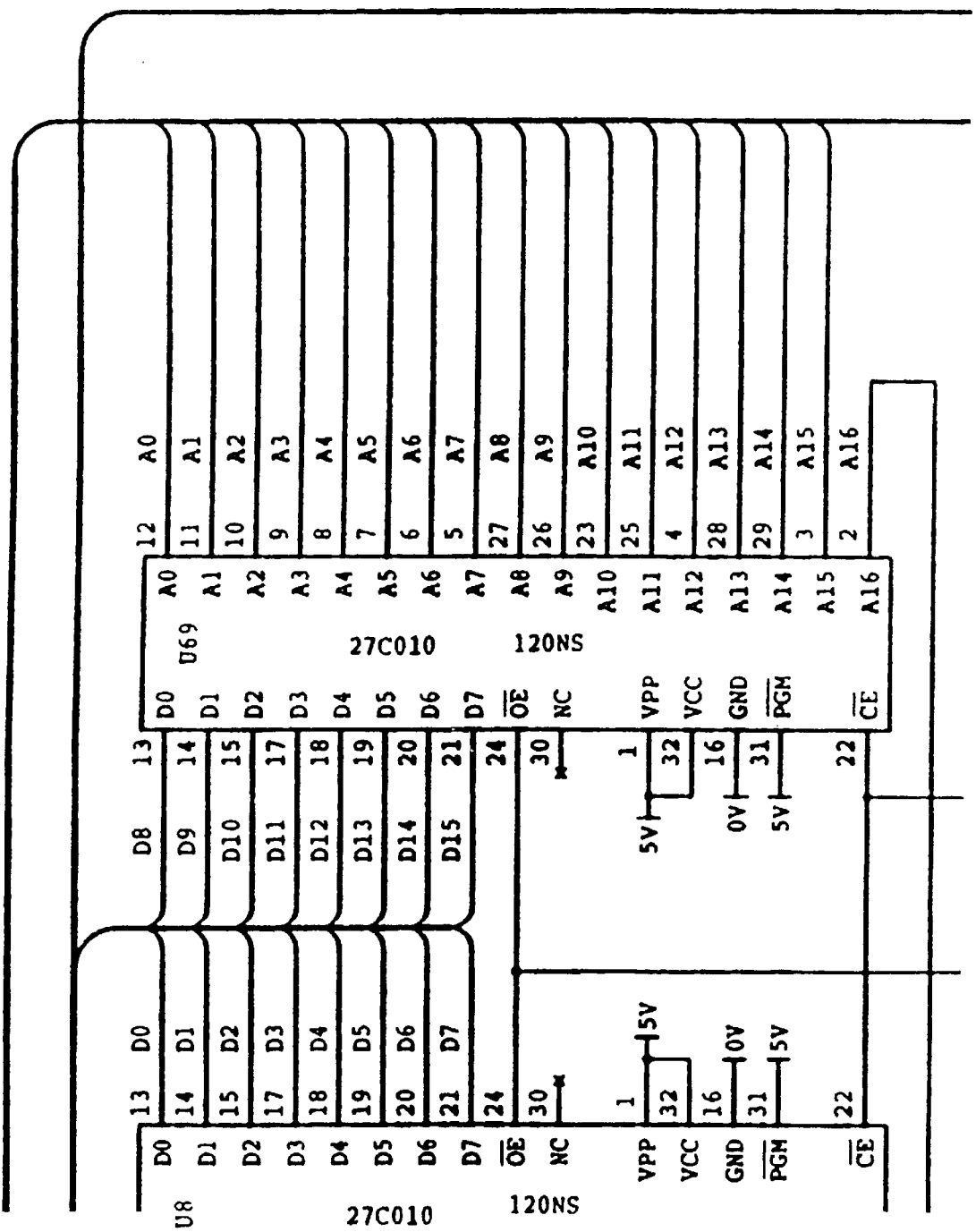
Figure 8E:
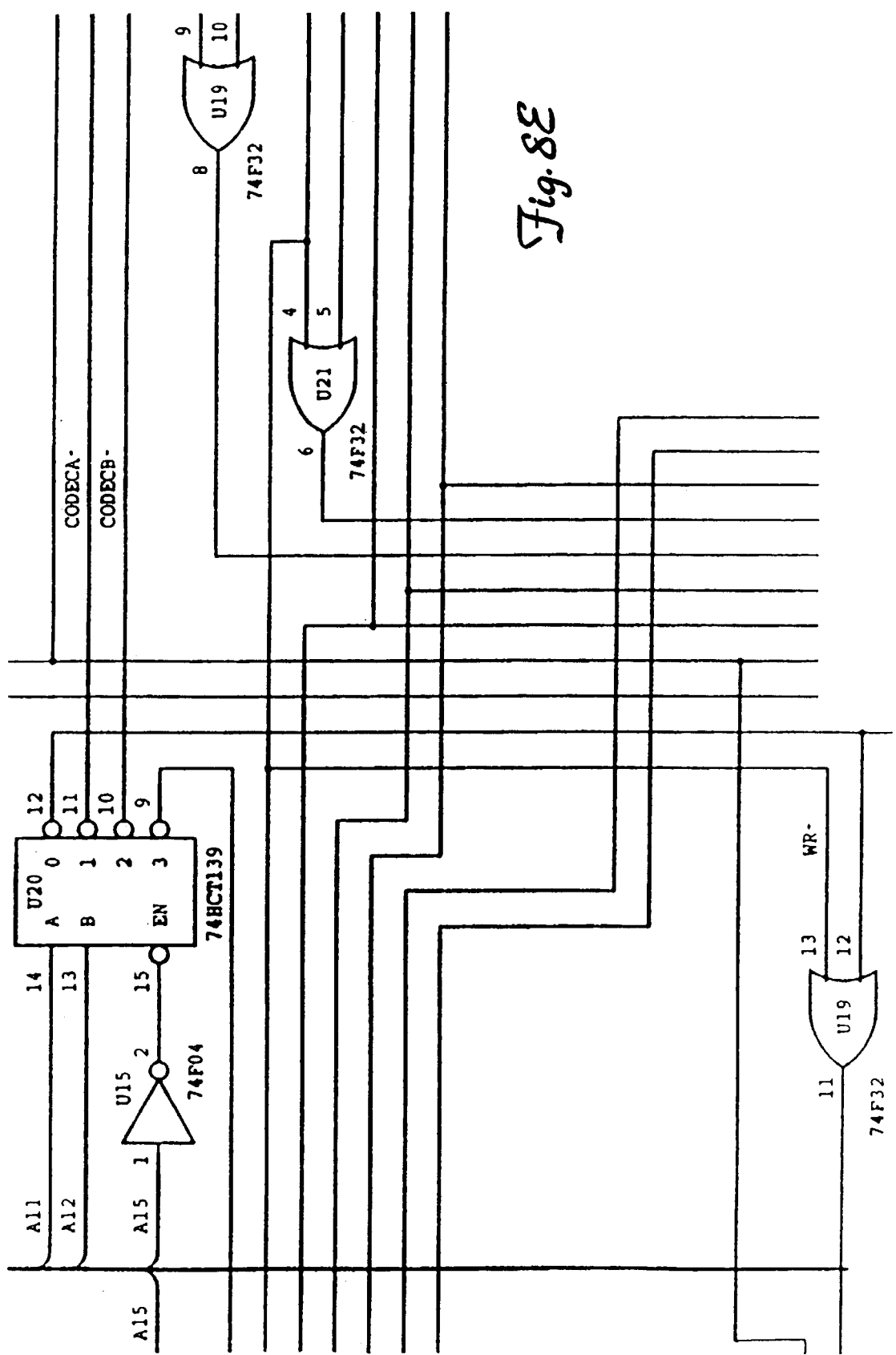
Figure 87:
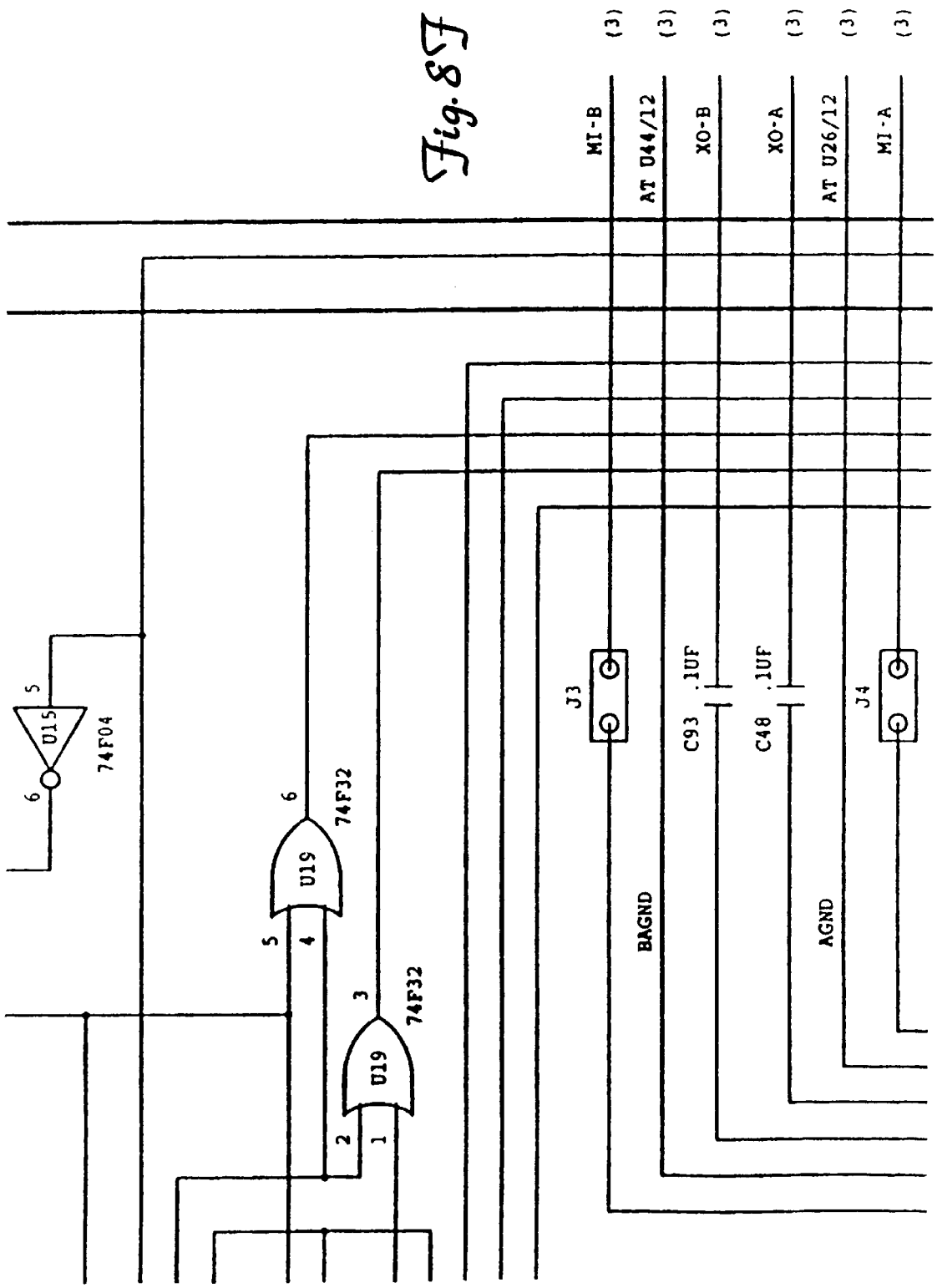
Figure 89:
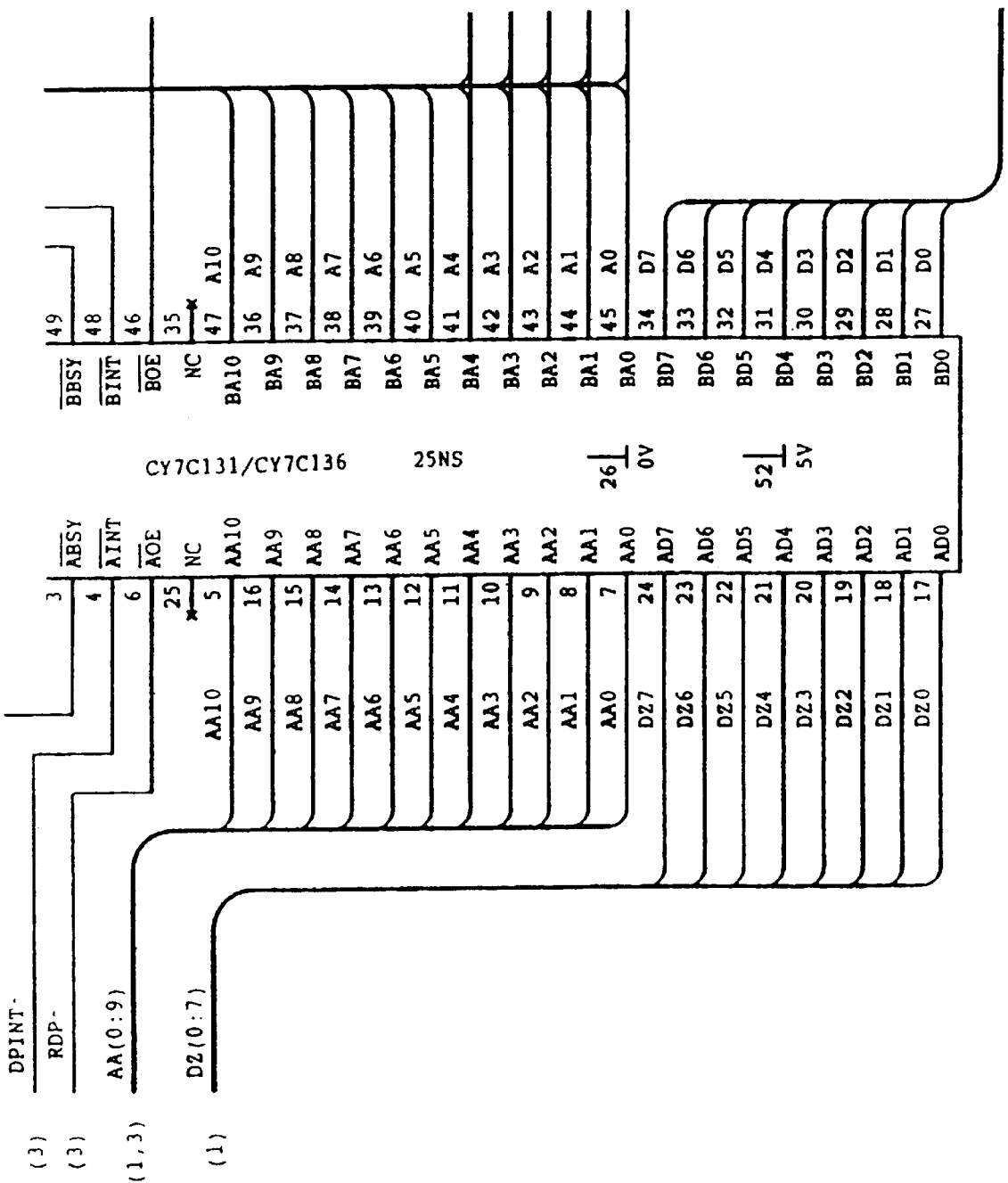
Figure 8H:
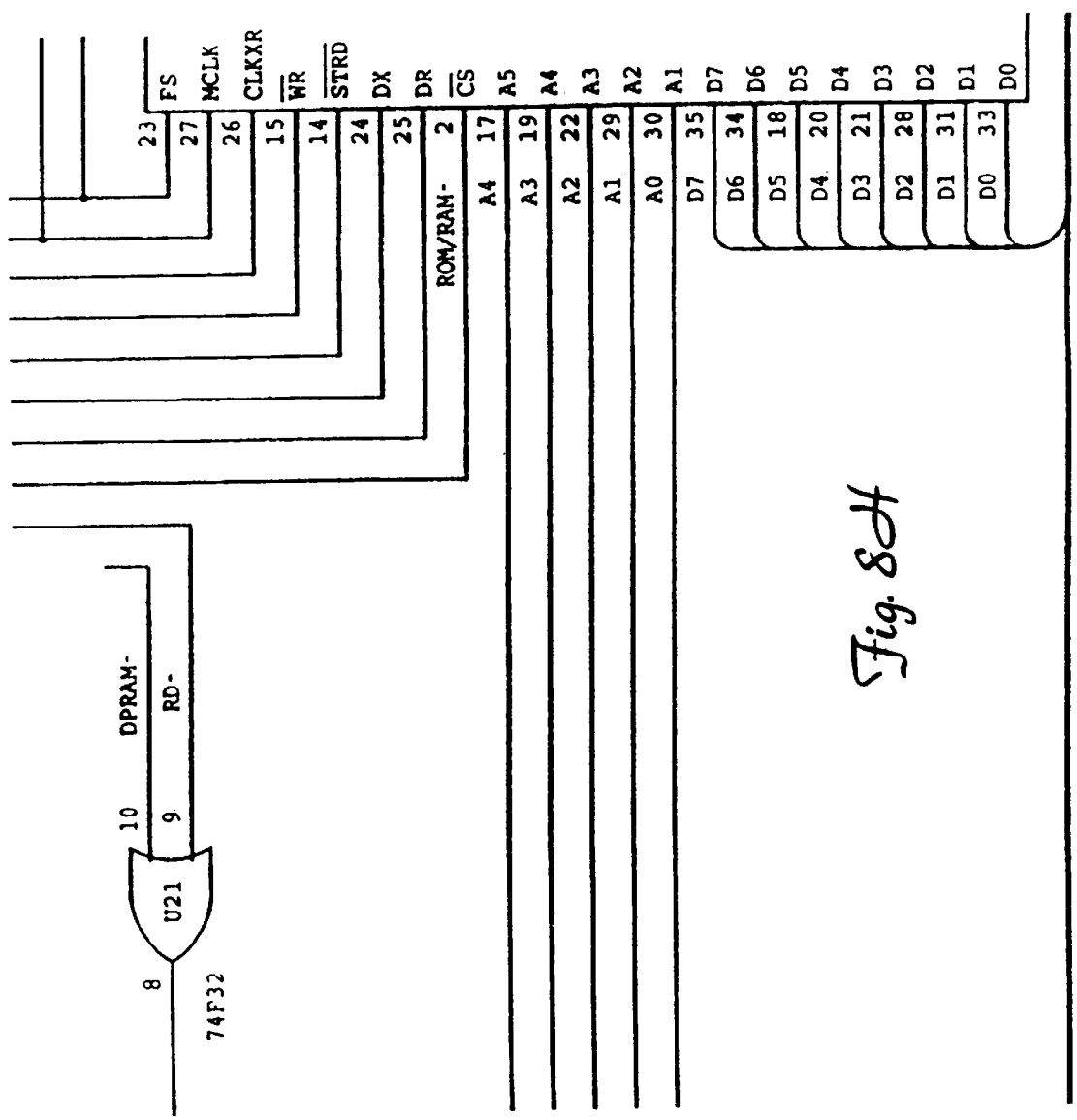
Figure 8J:
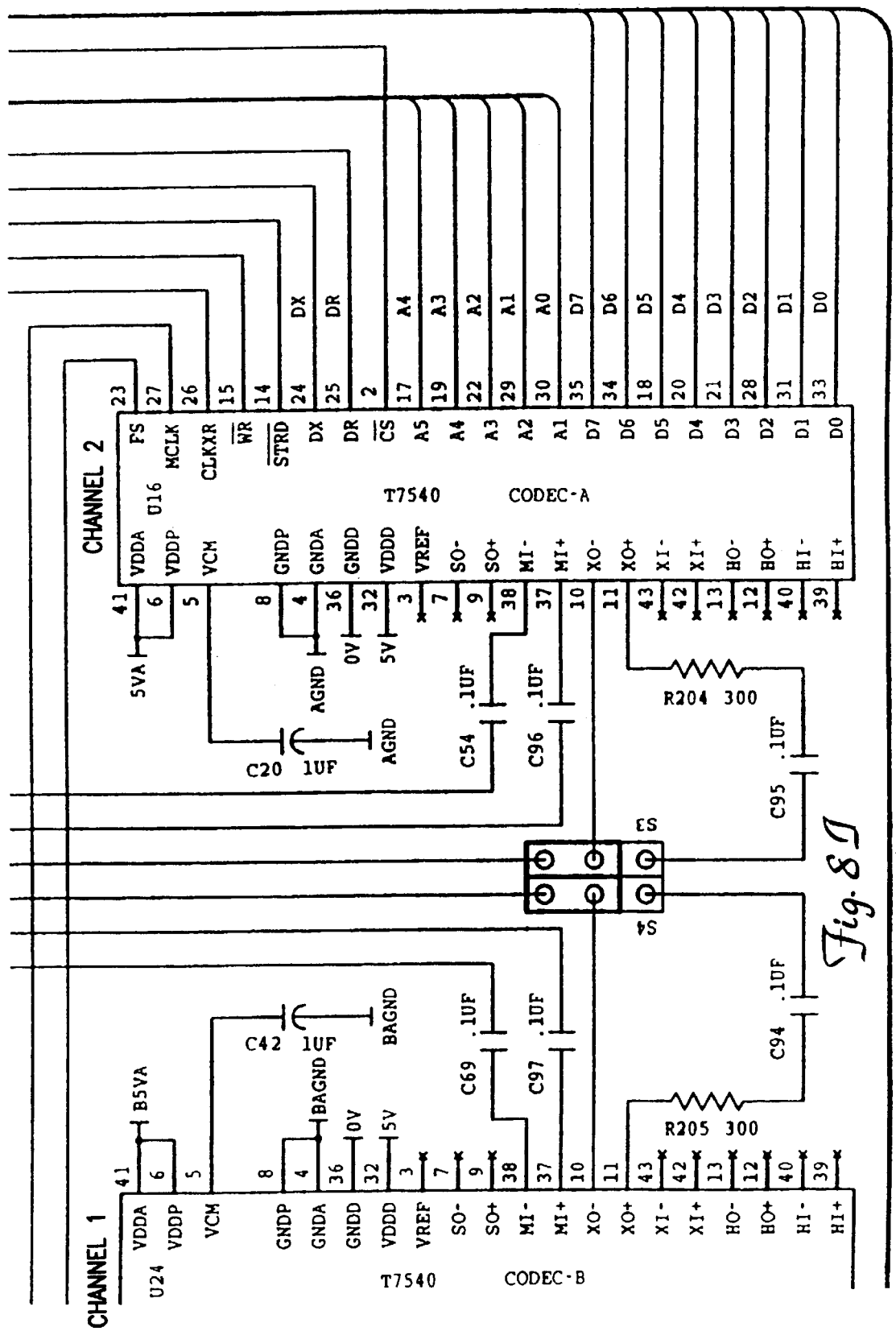

Referring to FIGS. 8A and 8B, the dual port RAM memory U10 corresponds to the dual port RAM memory 307 of FIGS. 6C, 5 and 4. Dual port RAM 307 is used to transfer the voice and fax packets to and from the command processor 612 of FIG. 6B. SRAM circuits U5, U6 and U7 in the upper parts of FIGS. 8A and 8B correspond to the RAM memory 618 of FIG. 6C. This memory contains the operating programs for DSP U14 of FIG. 7A (corresponding to DSP 620 of FIG. 6C). DSP U14 executes the program code from SRAM memory circuits U5, U6 and U7 but the code is permanently stored in non-volatile EPROM memory 619 of FIG. 6C corresponding to EPROM circuits U8 and U69 of FIG. 8B. The code executes much faster from the RAM memory 618 so the operating program code is loaded from the EPROM 618 to the RAM 619 upon power up of the system.

Figure 9A:
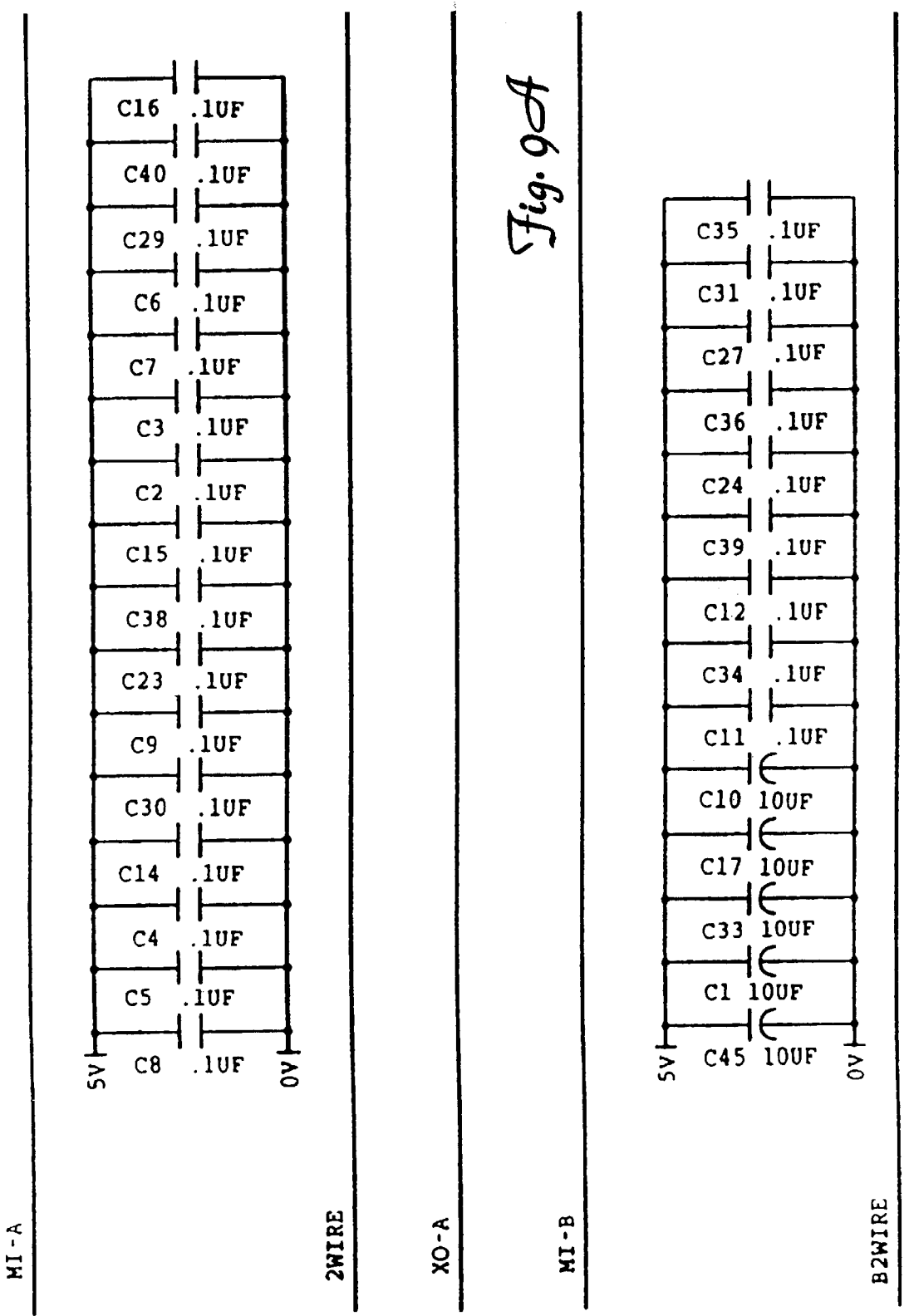
Figure 9B:
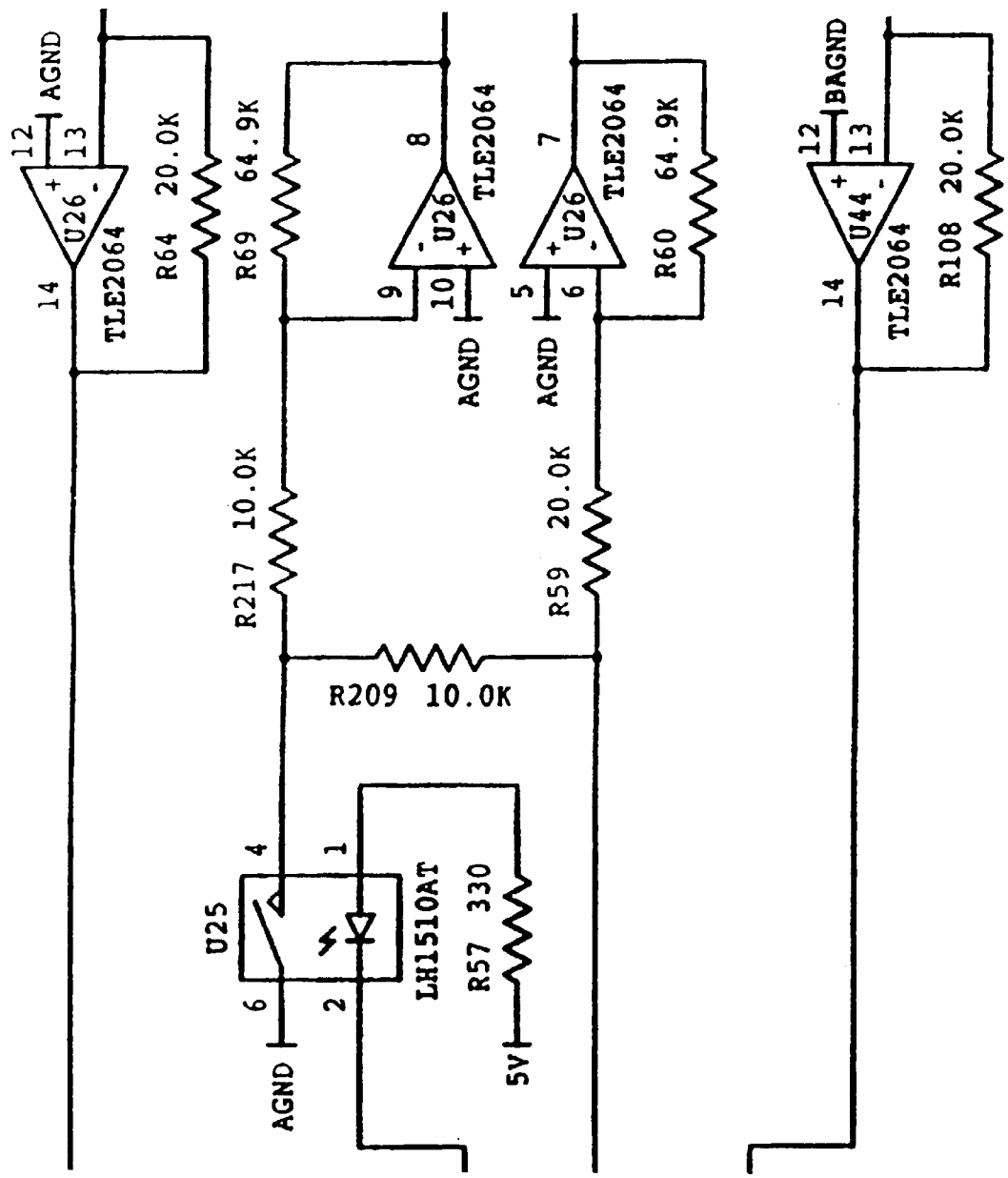
Figure 9C:
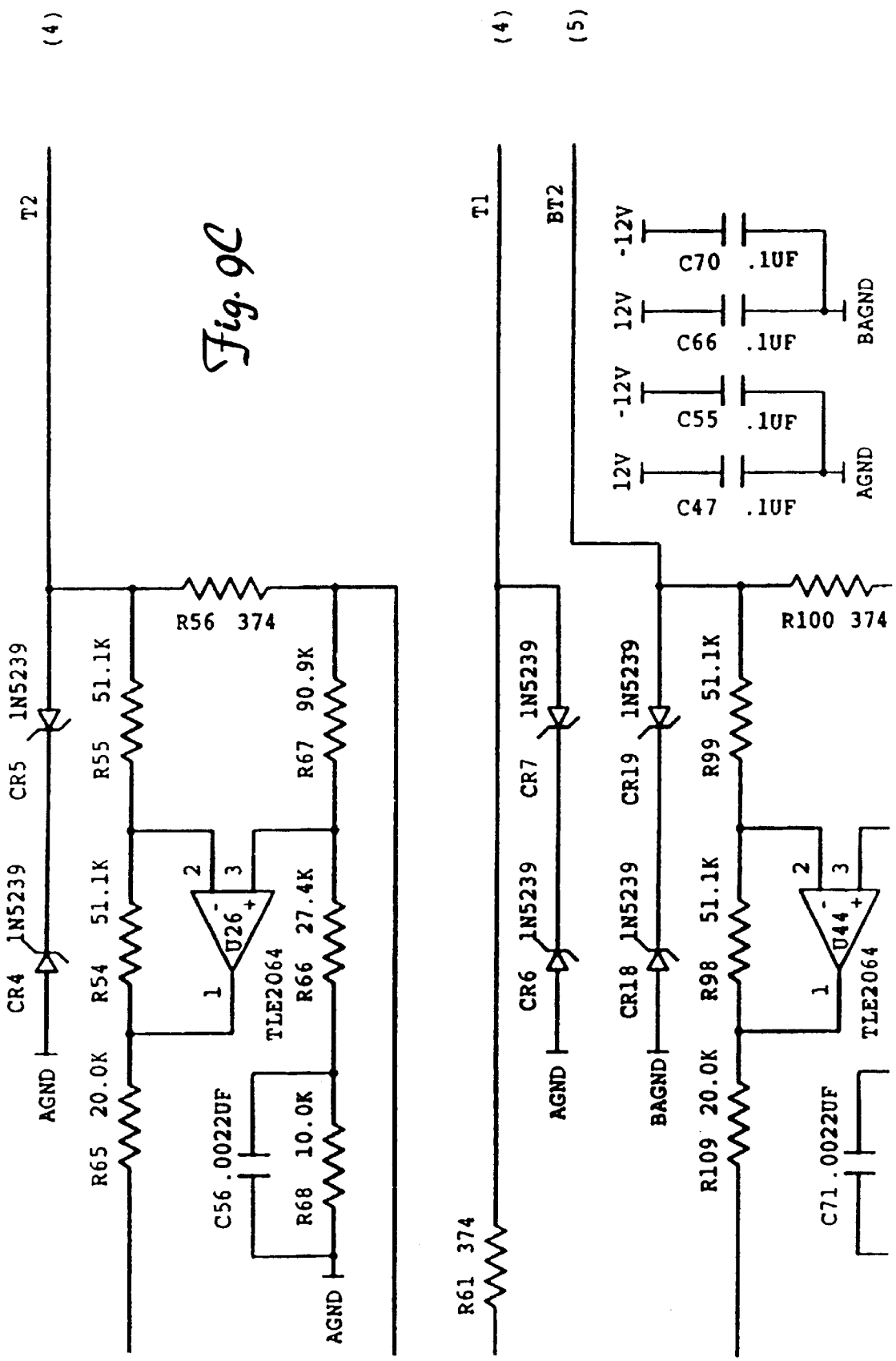
Figure 9D:
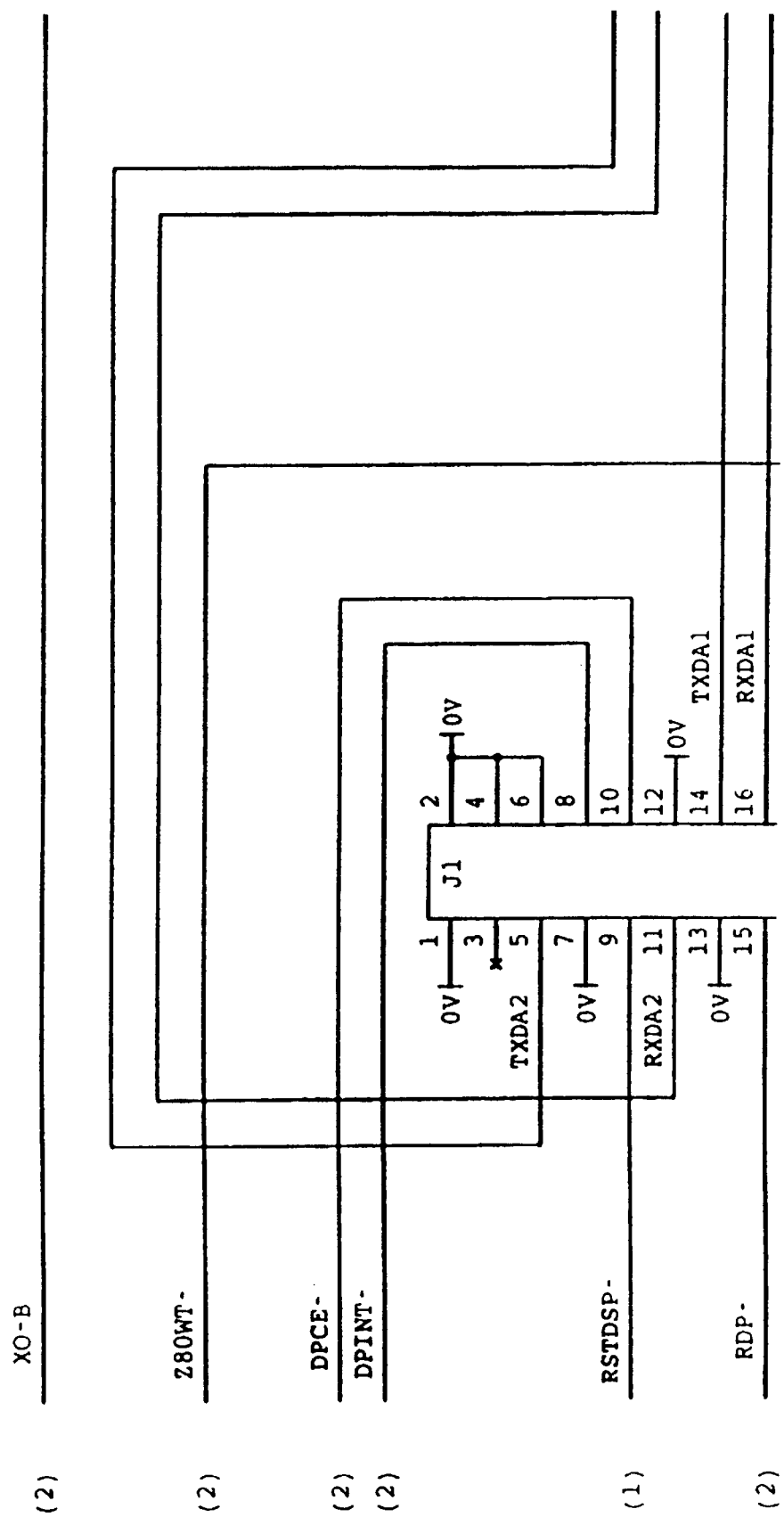
Figure 9E:
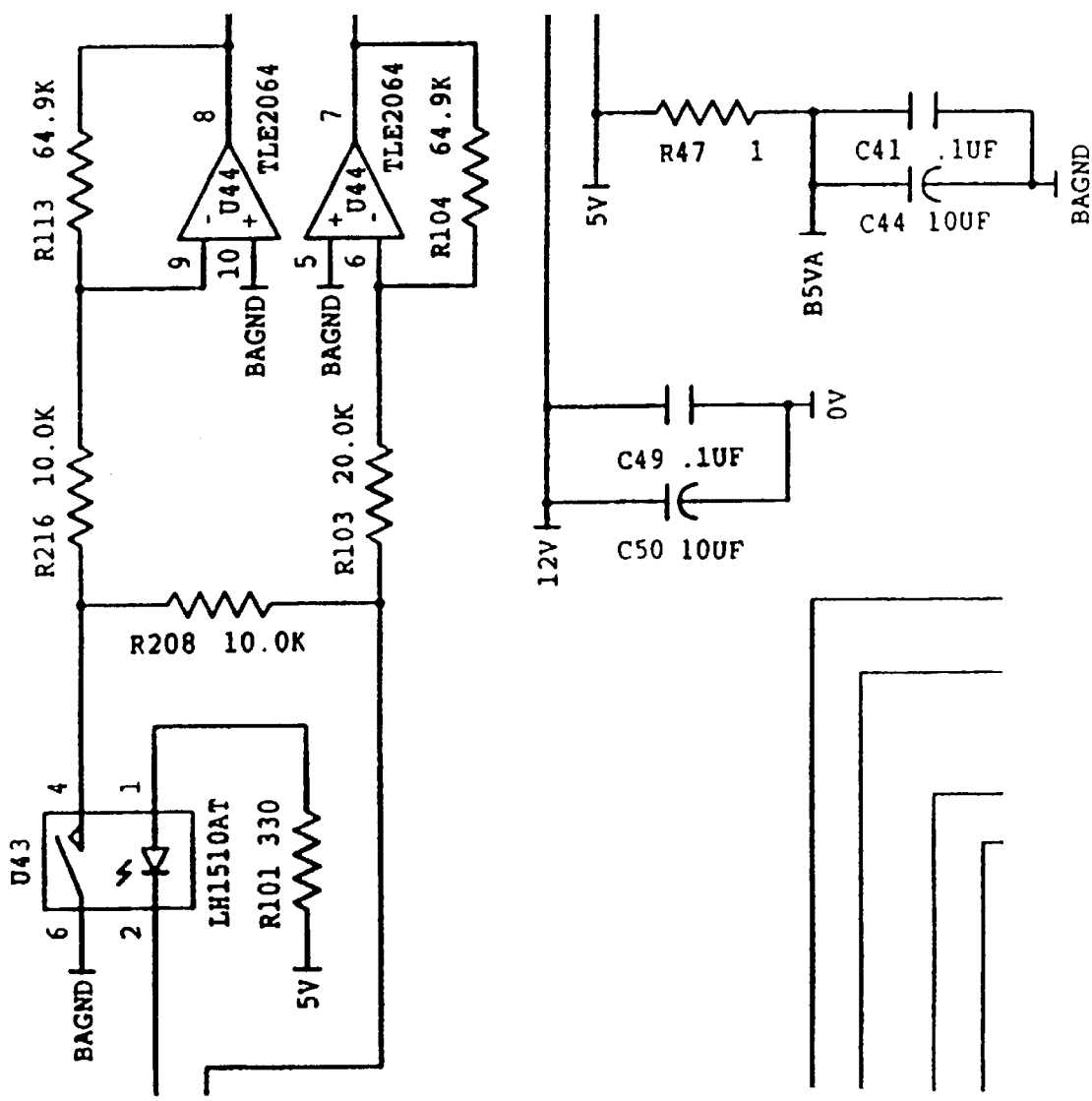
Figure 9J:
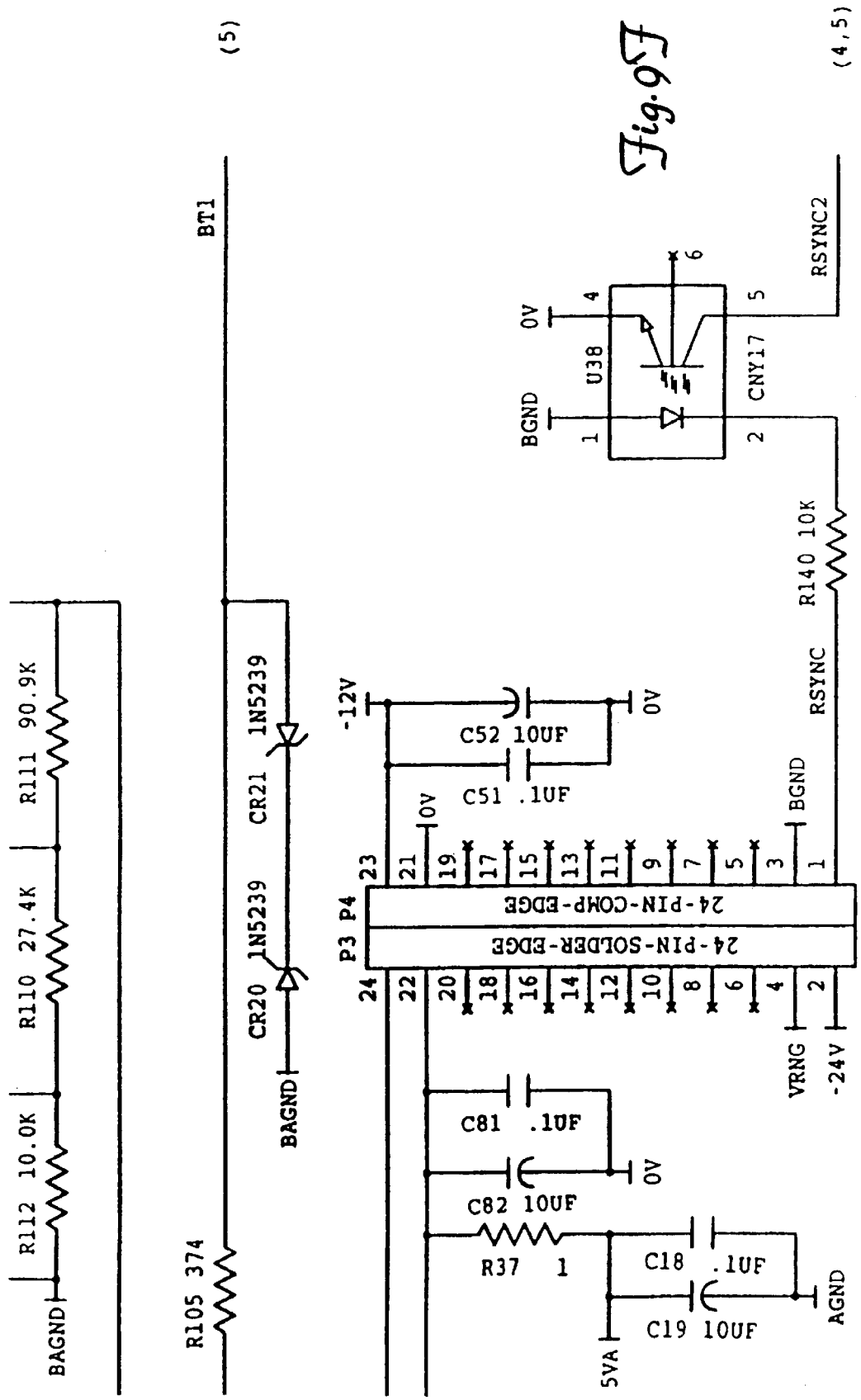
Figure 9G:
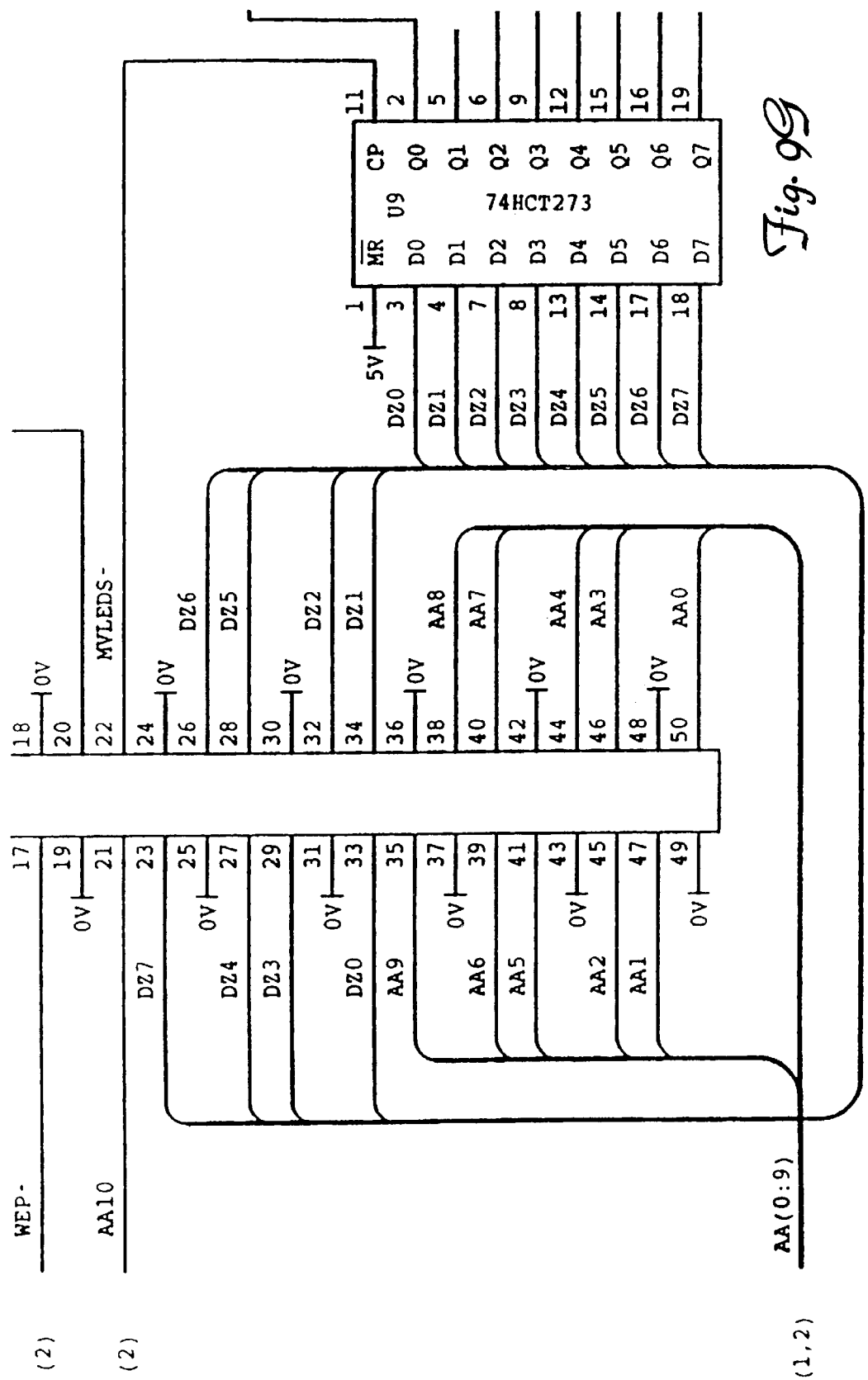
Figure 9H:
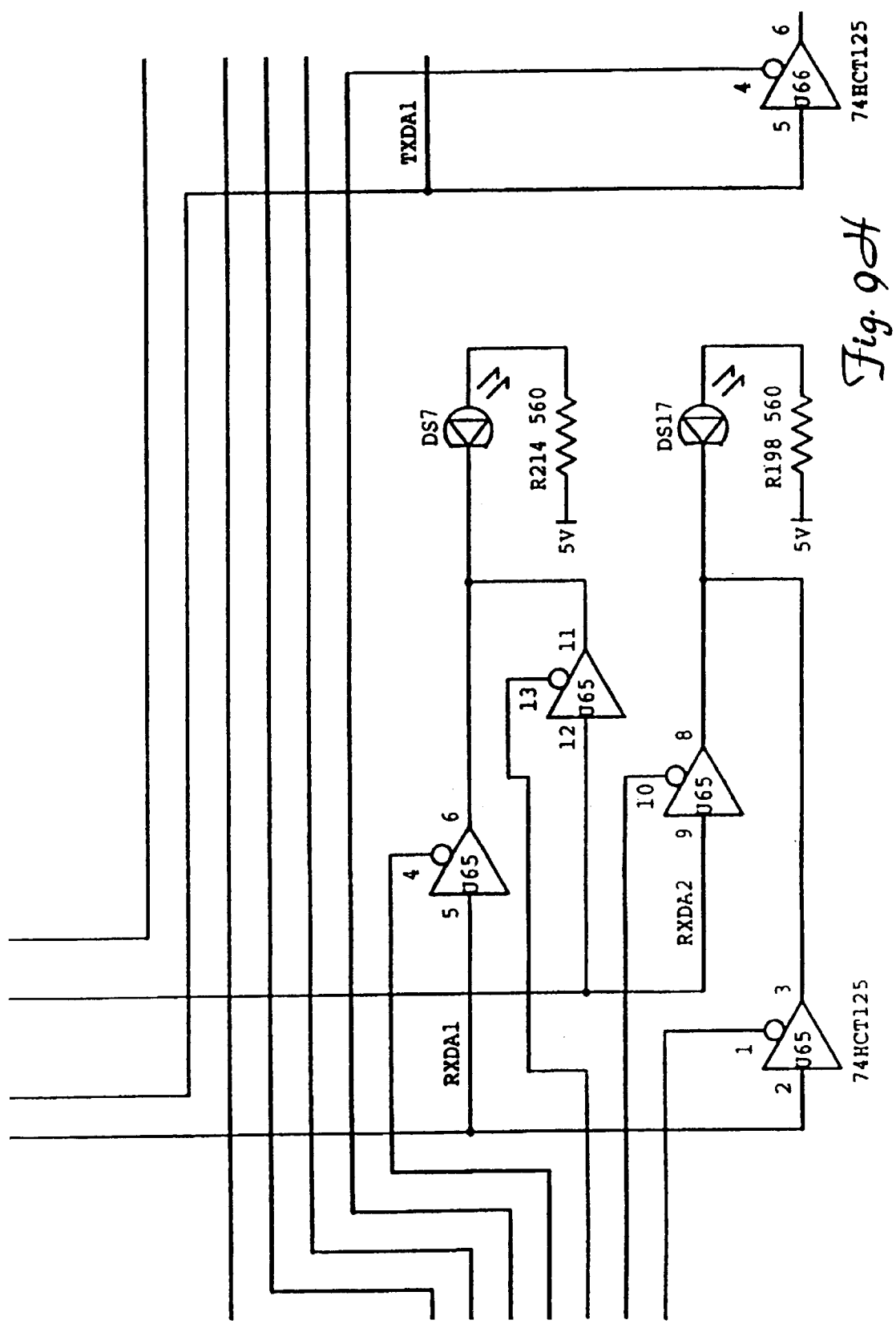

Referring to FIGS. 9A and 9B, connector J1 is the interface 607 with the main aggregate board of FIG. 6B. The operational amplifiers in the top portion of FIG. 9B are used for gain control and level control of the analog voice signals. Not shown in these schematic diagram are the AC (ring voltage) and DC voltage sources.

CODEC 621a for channel 1 of FIG. 6C corresponds to CODEC circuit U24 of FIG. 8B. CODEC 621b for channel 2 of FIG. 6C corresponds to CODEC circuit U16 of FIG. 8B. CODEC's U24 and U16 include an analog to digital (A/D) converter and a digital to analog (D/A) converter.

Additional detail regarding echo cancellation, voice digitization and voice compression can be found in copending U.S. patent application Ser. No. 08/002,467 filed Jan. 8, 1993 entitled "COMPUTER-BASED MULTIFUNCTION PERSONAL COMMUNICATIONS SYSTEM", the complete application of which, including the microfiche appendix, is hereby incorporated by reference. This application is assigned to the same assignee as the present invention. The DSP 56002 DSP U14 is described more fully in the DSP56002 Digital Signal Processor User's Manual published in 1993 Motorola, Inc., which is hereby incorporated by reference. CODEC chips U16 and U24, in the preferred embodiment, are part number T7540 Digital Telephone CODEC manufactured and sold by AT&T Microelectronics. A more detailed description of this telephone CODEC chip U12 is described in the T7540 Digital Telephone CODEC Data Sheet and Addendum published July, 1991 by AT&T Microelectronics, which is hereby incorporated by reference.

Speech Compression

The Speech Compression Algorithm for compressing/decompressing the digitized speech information of the present system is accomplished via the DSP 620 of FIG. 6C. The analog voice signals are received and digitized by the telephone CODEC circuits 621a or 621b. The digitized voice information is passed from the digital telephone CODEC circuits to the digital signal processor (DSP) 620 which is programmed to do the voice compression algorithm. The DSP 620 compresses the speech and places the compressed digital representations of the speech into special voice packets described more fully below. As a result of the voice compression algorithm, the compressed voice information is passed to the dual port RAM circuit 307 for forwarding to the aggregate board in FIG. 6B. The voice packets are approximately 23 bytes for a 9200 baud compression and represent 20 ms of speech each.

Speech Compression Algorithm

To multiplex high-fidelity speech with digital data and transmit both over the over the telephone line, a high available bandwidth would normally be required. In the present invention, the analog voice information is digitized into 8-bit PCM data at an 8 kHz sampling rate producing a serial bit stream of 64,000 bps serial data rate. This rate cannot be transmitted over the telephone line. With the Speech Compression algorithm described below, the 64 kbs digital voice data is compressed into a 9200 bps encoding bit stream using a fixed-point (non-floating point) DSP such that the compressed speech of channel 1 an be transmitted over the telephone line multiplexed with fax data or compressed speech of channel 2 and multiplexed still further with asynchronous data. The present compression algorithms accomplish an approximately 7 to 1 compression ratio. This is accomplished in an efficient manner such that enough machine cycles remain during real time speech compression to allow real time acoustic and line echo cancellation in the same fixed-point DSP 620.

A silence detection function is used to detect quiet intervals in the speech signal which allows the data processor 620 substitute asynchronous data in lieu of voice data packets over the composite link to efficiently time multiplex the voice and asynchronous data transmission. The allocation of time for asynchronous data transmission is constantly changing depending upon how much silence is on either of the voice channels.

The voice compression algorithm of the present system relies on a model of human speech which shows that human speech contains redundancy inherent in the voice patterns. Only the incremental innovations (changes) need to be transmitted. The algorithm operates on 160 digitized speech samples (20 milliseconds), divides the speech samples into time segments of 5 milliseconds each, and uses predictive coding on each segment. With this algorithm, the current segment is predicted as best as possible based on the past recreated segments and a difference signal is determined. The difference value is compared to the stored difference values in a lookup table or code book, and the address of the closest value is sent to the remote site along with the predicted gain and pitch values for each segment. In this fashion, four 5 ms speech segments can be reduced to a packet of 23 bytes or 184 bits (46 bits per sample segment). By transmitting 184 bits every 20 milliseconds, an effective serial data transmission rate of 9200 bps is accomplished.

To produce this compression, the present system includes a unique Vector Quantization (VQ) speech compression algorithm designed to provide maximum fidelity with minimum compute power and bandwidth. The VQ algorithm has two major components. The first section reduces the dynamic range of the input speech signal by removing short term and long term redundancies. This reduction is done in the waveform domain, with the synthesized part used as the reference for determining the incremental "new" content. The second section maps the residual signal into a code book optimized for preserving the general spectral shape of the speech signal.

Figure 11:
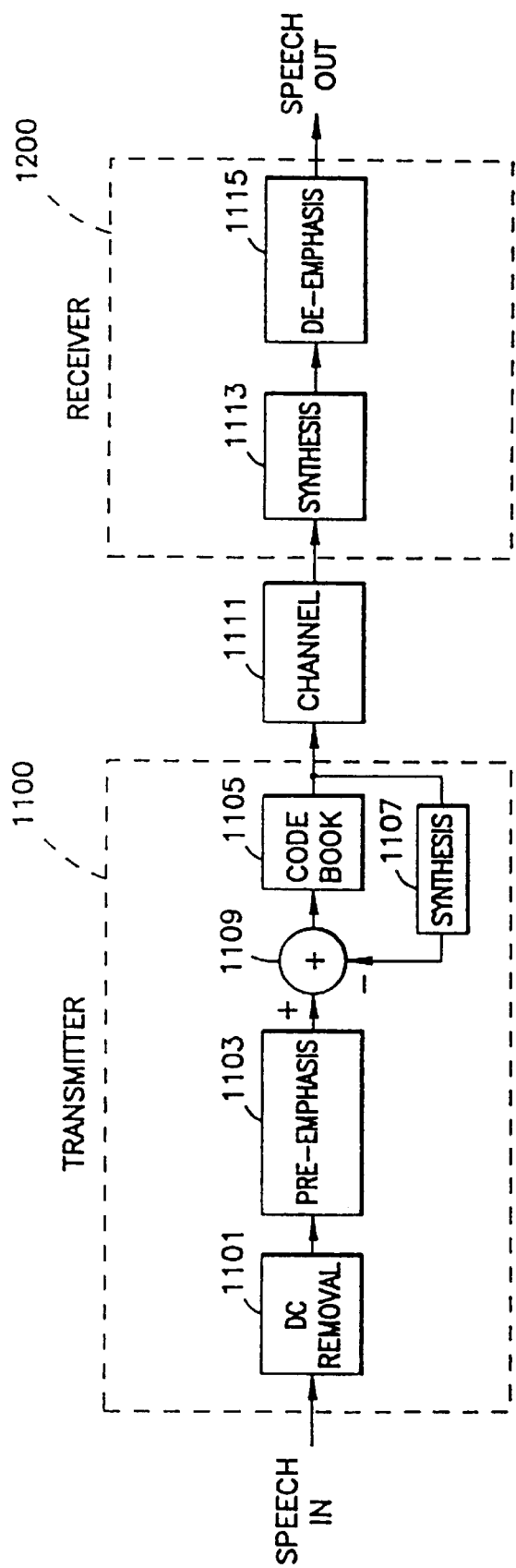
FIG. 11 is a signal flow diagram of the speech compression algorithm.

FIG. 11 is a high level signal flow block diagram of the speech compression algorithm used in the present system to compress the digitized voice for transmission over the telephone line in the voice over data mode of operation or for storage and use on the personal computer. The transmitter and receiver components are implemented using the digital signal processor 620 of FIG. 6C.

The DC removal stage 1101 receives the digitized speech signal and removes the D.C. bias by calculating the long-term average and subtracting it from each sample. This ensures that the digital samples of the speech are centered about a zero mean value. The pre-emphasis stage 1103 whitens the spectral content of the speech signal by balancing the extra energy in the low band with the reduced energy in the high band.

The system finds the innovation in the current speech segment by subtracting 1109 the prediction from reconstructed past samples synthesized from synthesis stage 1107. This process requires the synthesis of the past speech samples locally (analysis by synthesis). The synthesis block 1107 at the transmitter performs the same function as the synthesis block 1113 at the receiver. When the reconstructed previous segment of speech is subtracted from the present segment (before prediction), a difference term in produced in the form of an error signal. This residual error is used to find the best match in the code book 1105. The code book 1105 quantizes the error signal using a code book generated from a representative set of speakers and environments. A minimum mean squared error match is determined in 5 ms segments. In addition, the code book is designed to provide a quantization error with spectral rolloff (higher quantization error for low frequencies and lower quantization error for higher frequencies). Thus, the quantization noise spectrum in the reconstructed signal will always tend to be smaller than the underlying speech signal.

The channel 1111 corresponds to the aggregate board 402 and the composite link in which the compressed speech bits are multiplexed with the asynchronous data using a synchronous packet format described below. The voice bits are sent in 100 ms packets of 5 frames each, each frame corresponding to 20 ms of speech in 160 samples. Each frame of 20 ms is further divided into 4 sub-blocks or segments of 5 ms each. In each sub-block of the data consists of 7 bits for the long term predictor, 3 bits for the long term predictor gain, 4 bits for the sub-block gain, and 32 bits for each code book entry for a total 46 bits each 5 ms. The 32 bits for code book entries consists of four 8-bit table entries in a 256 long code book of 1.25 ms duration. In the code book block, each 1.25 ms of speech is looked up in a 256 word code book for the best match. The 8-bit table entry is transmitted rather than the actual samples. The code book entries are pre-computed from representative speech segments.

On the receiving end 1200, the synthesis block 1113 at the receiver performs the same function as the synthesis block 1107 at the transmitter. The synthesis block 1113 reconstructs the original signal from the voice data packets by using the gain and pitch values and code book address corresponding to the error signal most closely matched in the code book. The code book at the receiver is similar to the code book 1105 in the transmitter. Thus the synthesis block recreates the original pre-emphasized signal. The de-emphasis stage 1115 inverts the pre-emphasis operation by restoring the balance of original speech signal.

The complete speech compression algorithm is summarized as follows:

a) Remove any D.C. bias in the speech signal.
b) Pre-emphasize the signal.
c) Find the innovation in the current speech segment by subtracting the prediction from reconstructed past samples. This step requires the synthesis of the past speech samples locally (analysis by synthesis) such that the residual error is fed back into the system.
d) Quantize the error signal using a code book generated from a representative set of speakers and environments. A minimum mean squared error match is determined in 5 ms segments. In addition, the code book is designed to provide a quantization error with spectral rolloff (higher quantization error for low frequencies and lower quantization error for higher frequencies). Thus, the quantization noise spectrum in the reconstructed signal will always tend to be smaller than the underlying speech signal.
e) At the transmitter and the receiver, reconstruct the speech from the quantized error signal fed into the inverse of the function in step c above. Use this signal for analysis by synthesis and for the output to the reconstruction stage below.
f) Use a de-emphasis filter to reconstruct the output.

The major advantages of this approach over other low-bit-rate algorithms are that there is no need for any complicated calculation of reflection coefficients (no matrix inverse or lattice filter computations). Also, the quantization noise in the output speech is hidden under the speech signal and there are no pitch tracking artifacts: the speech sounds "natural", with only minor increases of background hiss at lower bit-rates. The computational load is reduced significantly compared to a VSELP algorithm and variations of the present algorithm provide bit rates of 8, 9.2, 9.6 and 16 Kbit/s, any one of which could be used in the present invention. The total delay through the analysis section is less than 20 milliseconds in the preferred embodiment. The present algorithm is accomplished completely in the waveform domain and there is no spectral information being computed and there is no filter computations needed.

Detailed Description of the Speech Compression Algorithm

The speech compression algorithm is described in greater detail with reference to FIGS. 11 through 13, and with reference to the block diagram of the hardware components of the present system shown in FIG. 6C. Also, reference is made to the detailed schematic diagrams in FIGS. 7A–10B. The voice compression algorithm operates within the programmed control of the DSP circuit 620. In operation, the speech or analog voice signal is received through the one of the telephone interfaces such as FXS nd is digitized by the CODEC circuit 621a or 621b. The CODEC for circuit 621a or 621b is a companding $\mu$-law CODEC. The analog voice signal from the telephone interface is band-limited to about 3,500 Hz and sampled at 8 kHz by digital telephone CODEC 621a or 621b. Each sample is encoded into 8-bit PCM data producing a serial 64 kb/s signal. The digitized samples are passed to the DSP 620. There, the 8-bit $\mu$-law PCM data is converted to 13-bit linear PCM data. The 13-bit representation is necessary to accurately represent the linear version of the logarithmic 8-bit $\mu$-law PCM data. With linear PCM data, simpler mathematics may be performed on the PCM data.

The sampled and digitized PCM voice signals from the telephone $\mu$-law CODEC 621a or 621b are passed to the DSP 620 via direct data lines clocked and synchronized to an 8 KHz clocking frequency. The digital samples are loaded into DSP 620 one at a time through the serial input and stored into an internal queue held in RAM and converted to linear PCM data. As the samples are loaded into the end of the queue in the RAM of DSP 620, the samples at the head of the queue are operated upon by the voice compression algorithm. The voice compression algorithm then produces a greatly compressed representation of the speech signals in a digital packet form. The compressed speech signal packets are then passed to the dual port RAM circuit 307 shown in FIG. 6C for use by the data processor 318 for transmission.

Concurrent with this transmit operation, DSP 620 is receiving compressed voice data packets from dual port RAM circuit 307, uncompressing the voice data and transferring the uncompressed and reconstructed digital PCM voice data to the digital telephone CODEC 621a or 621b for digital to analog conversion and eventual transfer to the user through on of the telephone interfaces of FIG. 6C. This is the receive mode of operation of DSP 620 corresponding to receiver block 1200 of FIG. 11 and corresponding to the decompression algorithm of FIG. 13. Thus the DSP circuit 620 is processing the voice data in both directions in a full-duplex fashion.

Digital Signal Processor (DSP) 620 operates at a clock frequency of approximately 40 MHz while processing data at sampling rates of approximately 8 KHz in both directions for two channels. The voice compression/decompression algorithms and packetization of the voice data is accomplished in a quick and efficient fashion to ensure that all processing is done in real-time without loss of voice information. This is accomplished in an efficient manner such that enough machine cycles remain in the voice control DSP circuit 620 during real time speech compression to allow real time acoustic and line echo cancellation in the same fixed-point DSP.

In operation, the availability of an eight-bit sample of PCM voice data from the µ-law digital telephone CODEC circuit 621a or 621b causes an interrupt in DSP 620 where the sample is loaded into internal registers for processing. Once loaded into an internal register it is transferred to a RAM address which holds a queue of samples. The queued PCM digital voice samples are converted from 8-bit µ-law data to a 13-bit linear data format using table lookup for the conversion. Those skilled in the art will readily recognize that the digital telephone CODEC circuit 621a or 621b could also be linear CODEC.

Referring to FIG. 11, the digital samples are shown as speech entering the transmitter block 1100. The transmitter block, of course, is the mode of operation of DSP 620 operating to receive local digitized voice information, compress it and packetize it for transfer to the dual port RAM 307 for eventual multiplexing and transmission on the composite link, which corresponds to the channel 1111 of FIG. 11. A frame rate for the voice compression algorithm is 20 milliseconds of speech for each compression. This correlates to 160 samples to process per frame. When 160 samples are accumulated in the queue of the internal DSP RAM, the compression of that sample frame is begun.

The DSP circuit 620 is programmed to first remove the DC component 1101 of the incoming speech. The DC removal is an adaptive function to establish a center base line on the voice signal by digitally adjusting the values of the PCM data. The formula for removal of the DC bias or drift is as follows:

$$S(n)=x(n)-x(n-1)+\alpha*S(n-1)$$

where $$\alpha = \frac{32735}{32768}$$

The removal of the DC is for the 20 millisecond frame of voice which amounts to 160 samples. The selection of α is based on empirical observation to provide the best result.

Figure 12:
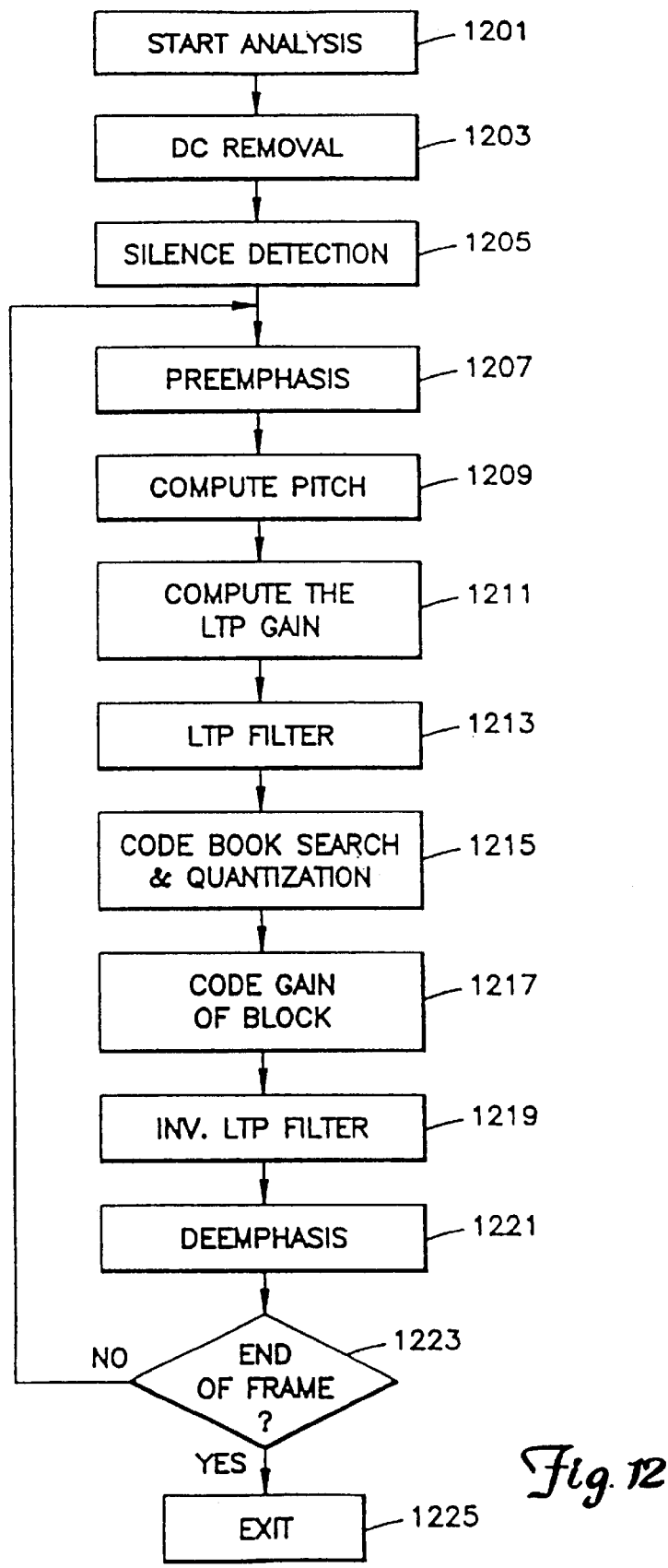
FIG. 12 is a detailed function flow diagram of the speech compression algorithm.

Referring to FIG. 12, the voice compression algorithm in a control flow diagram is shown which will assist in the understanding of the block diagram of FIG. 11. The analysis and compression began at block 1201 where the 13-bit linear PCM speech samples are accumulated until 160 samples representing 20 milliseconds of voice or one frame of voice is passed to the DC removal portion of code operating within the programmed DSP 620. The DC removal portion of the code described above approximates the base line of the frame of voice by using an adaptive DC removal technique.

A silence detection algorithm 1205 is also included in the programmed code of the DSP 620. The silence detection function is a summation of the square of each sample of the voice signal over the frame. If the power of the voice frame falls below a preselected threshold, this would indicate a silent frame. The detection of a silence frame of speech is important for later multiplexing of the V-data and C-data described below. During silent portions of the speech, the data processing 318 will transfer asynchronous digital data over the composite linked in lieu of voice data packets. The formula for computing the power is:

$$PWR = \sum_{n=0}^{160-1} S(n)*S(n)$$

If the power PWR is lower than a preselected threshold, then the present voice frame is flagged as containing silence. The 160-sample silent frame is still processed by the voice compression algorithm; however, the silent frame packets are discarded by the data processor 318 so that more asynchronous data may be transferred in lieu of voice data.

The rest of the voice compression is operated upon in segments where there are four segments per frame amounting to 40 samples of data per segment. It is only the DC removal and silence detection which is accomplished over an entire 20 millisecond frame. The pre-emphasis 1207 of the voice compression algorithm shown in FIG. 12 is the next step. The formula for the pre-emphasis is $$S(n)=S(n)-\tau*S(n-1)$$

where τ=0.55

Each segment thus amounts to five milliseconds of voice which is equal to 40 samples. Pre-emphasis then is done on each segment. The selection of τ is based on empirical observation to provide the best result.

The pre-emphasis essentially flattens the signal by reducing the dynamic range of the signal. By using pre-emphasis to flatten the dynamic range of the signal, less of a signal range is required for compression making the compression algorithm operate more efficiently.

The next step in the speech compression algorithm is the long-term predictor (LTP). The long-term prediction is a method to detect the innovation in the voice signal. Since the voice signal contains many redundant voice segments, we can detect these redundancies and only send information about the changes in the signal from one segment to the next. This is accomplished by comparing the linear PCM data of the current segment on a sample by sample basis to the reconstructed linear PCM data from the previous segments to obtain the innovation information and an indicator of the error in the prediction.

The first step in the long term prediction is to predict the pitch of the voice segment and the second step is to predict the gain of the pitch. For each segment of 40 samples, a long-term correlation lag PITCH and associated LTP gain factor β, (where j=0, 1, 2, 3 corresponding to each of the four segments of the frame) are determined at 1209 and 1211, respectively. The computations are done as follows.

From MINIMUM PITCH (40) to MAXIMUM PITCH (120) for indices 40 through 120 (the pitch values for the range of previous speech viewed), DSP 620 computes the cross correlation between the current speech segment and the previous speech segment by comparing the samples of the current speech segment against the reconstructed speech samples of the previous speech segment using the following formula:

$$Sxy(j) = \sum_{i=0}^{39} S(n_k + i) * S'(n_k + i - j)$$

where j=40, ... 120
S=current sample of current segment
S'=past sample of reconstructed previous segment
$n_k$=0, 40, 80, 120 (the subframe index)
and where the best fit is $$Sxy = MAX \{Sxy\ (j)\}$$

where j=40, ... 120.

The value of j for which the peak occurs is the PITCH. This is a 7 bit value for the current segment calculated at 1209. The value of j is an indicator of the delay or lag at which the cross correlation matches the best between the past reconstructed segment and the current segment. This indicates the pitch of the voice in the current frame. The maximum computed value of j is used to reduce the redundancy of the new segment compared to the previous reconstructed segments in the present algorithm since the value of j is a measure of how close the current segment is to the previous reconstructed segments.

Next, DSP 620 computes the LTP gain factor β at 1211 using the following formula in which Sxy is the current segment and Sxx is the previous reconstructed segment:

$$\beta_{segment} = \frac{Sxy(j)}{Sxx(j)}$$

where $$Sxx = \sum_{i=0}^{39} S'^2(i + \text{MAX\_PITCH} - \text{best\_pitch})$$

The value of the LTP gain factor β is a normalized quantity between zero and unity for this segment where β is an indicator of the correlation between the segments. For example, a perfect sine wave would produce a β which would be close to unity since the correlation between the current segments and the previous reconstructed segments should be almost a perfect match so the LTP gain factor is one.

The LTP gain factor is quantized from a LTP Gain Table. This table is characterized in Table 1.

TABLE 1

| LTP Gain Quantization |
|---|
| <———┤ ├———┤ ├———┤ ├———┤ ├———┤ ├———> |
| 0.1   0.3   0.5   0.7   0.9 |
| β = 0   β = 1   β = 2   β = 3   β = 4   β = 5 |

The gain value of β is then selected from this table depending upon which zone or range $\beta_{segment}$ was found as depicted in Table 1. For example, if $\beta_{segment}$ is equal to 0.45, then β is selected to be 2. This technique quantizes the β into a 3-bit quantity.

Next, the LTP (Long Term Predictor) filter function 1213 is computed. The pitch value computed above is used to perform the long-term analysis filtering to create an error signal e(n). The normalized error signals will be transmitted to the other site as an indicator of the original signal on a per sample basis. The filter function for the current segment is as follows:

$$e(n)=S(n)-\beta*S'(n--\text{pitch})$$

where n=0, 1, ... 39

Next, the code book search and vector quantization function 1215 is performed. First, DSP 620 computes the maximum sample value in the segment with the formula:

$$\text{GAIN=MAS}\ \{|e(n)|\}$$

where n=0, 1, ... 39

This gain different that the LTP gain. This gain is the maximum amplitude in the segment. Next, DSP 620 normalizes the LTP filtered speech by the quantized GAIN value by using the maximum error signal |e(n)| (absolute value for e(n)) for the current segment and dividing this into every sample in the segment to normalize the samples across the entire segment. Thus the e(n) values are all normalized to have values between zero and one using the following:

$$e(n)=e(n)/\text{GAIN}\ n=0\ ...\ 39$$

Each segment of 40 samples is comprised of four sub-segments of 10 samples each. The DSP circuit 620 quantizes 10 samples of e(n) with an index into the code book. The code book consists of 256 entries (256 address) with each code book entry consisting of ten sample values. Every entry of 10 samples in the code book is compared to the 10 samples of each subsequent. Thus, for each subsegment, the code book address or index is chosen based on a best match between the 10-sample subsequent and the closest 10-sample code book entry. The index chosen has the least difference according to the following minimization formula:

$$\text{Min}\left\{\sum_{i=0}^{10-1}(x_i - y_i)^2\right\}$$

where
$x_i$=the input vector of 10 samples, and
$y_i$=the code book vector of 10 samples This comparison to find the best match between the subsegment and the code book entries is computationally intensive. A brute force comparison may exceed the available machine cycles if real time processing is to be accomplished. Thus, some shorthand processing approaches are taken to reduce the computations required to find the best fit. The above formula can be computed in a shorthand fashion by precomputing and storing some of the values of this equation. For example, by expanding out the above formula, some of the unnecessary terms may be removed and some fixed terms may be precomputed:

$$(x_i - y_i)^2 = (x_i - y_i)*(x_i - y_i)$$
$$= (x_i^2 - x_i y_i - x_i y_i + y_i^2)$$
$$= (x_i^2 - 2x_i y_i + y_i^2)$$

where $x_i^2$ is a constant so it may be dropped from the formula, and where the value of ½ $\Sigma y_i^2$ may be precomputed and stored as the eleventh value in the code book os that the only real-time computation involved is the following formula:

$$\text{Min}\left\{\sum_{i=0}^{10-1}(x_i y_i)\right\}$$

Thus, for a segment of 40 samples, we will transmit 4 code book indexes corresponding to 4 subsegments of 10 samples each. After the appropriate index into the code book is chosen, the LTP filtered speech samples are replaced with the code book samples. These samples are then multiplied by the quantized GAIN in block 1217.

Next, the inverse of the LTP filter function is computed at 1219:

$$e(n)=e(n)+\beta*S'(n-\text{pitch})\ n=0,\ldots,39$$

$$S'(i)=S'(n)\ n=40,\ldots,120;\ i=0,\ldots(120-40)$$

$$S'(i)=e(i)\ i=0,\ldots 40$$

Figure 13:
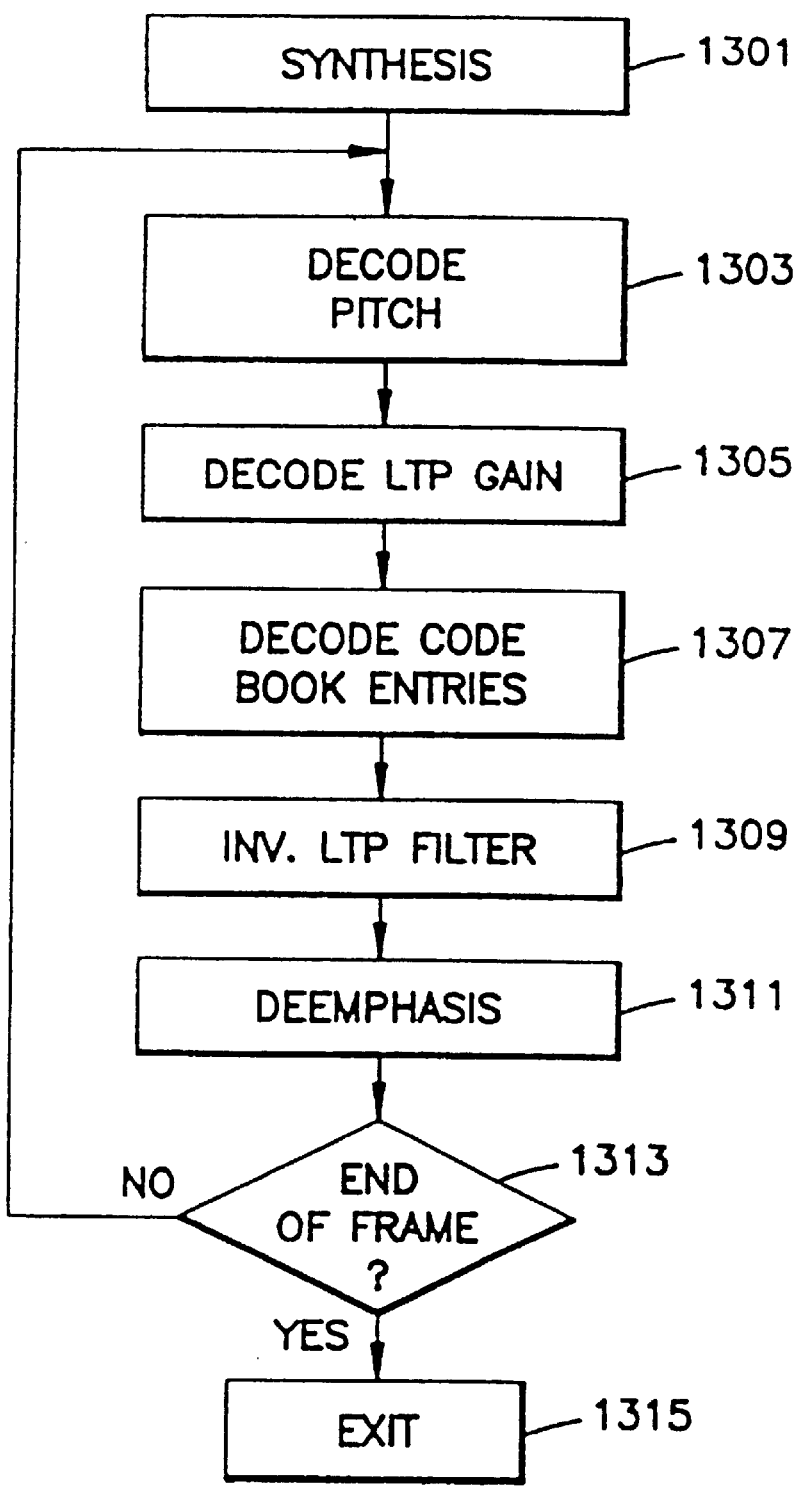
FIG. 13 is a detailed function flow diagram of the speech decompression algorithm.

The voice is reconstructed at the receiving end of the voice-over-data link according to the reverse of the compression algorithm as shown as the decompression algorithm in FIG. 13. The synthesis of FIG. 13 is also performed in the compression algorithm of FIG. 12 since the past segment must be synthesized to predict the gain and pitch of the current segment.

Voice or Fax Data Packet

When the DSP circuit 620 completes the compression of one 20 ms portion of voice or fax information, it will send a block of voice or fax data every 20 ms to the dual port RAM 307 where the data processor 318 can retrieve it for transmission. Each voice of fax data packet has three header bytes and 23 bytes of voice or fax data (for 9200 baud voice compression) or 43 bytes of voice data (for 16K baud voice compression) in the dual port RAM. The header bytes indicate the destination address, destination channel, frame ID, byte count, etc. Bits 6 and 7 of the first header byte indicate the packet type. The voice/fax packet is described in Table 2 below.

TABLE 2

Compressed Voice Packet Structure

| | | | | | | |
|---|---|---|---|---|---|---|
| | | $P_0$ | | | $\beta_0^0$ | 1 |
| | | $P_1$ | | | $\beta_0^1$ | 2 |
| | | $P_2$ | | | $\beta_0^2$ | 3 |
| | | $P_3$ | | | $\beta_1^0$ | 4 |
| $\beta_3$ | | $\beta_2$ | | $\beta_1^2$ | $\beta_1^1$ | 5 |
| | $G_1$ | | | $G_0$ | | 6 |
| | $G_3$ | | | $G_2$ | | 7 |
| | | $Vd_0$ | | | | 8 |
| | | $Vd_1$ | | | | 9 |
| | | ⋮ | | | | |
| | | $Vd_{15}$ | | | | 23 |

Where
$P_n$ = pitch (7 bits) where n = subframe number
$\beta_n^m$ = Beta (3 bits)
$G_n$ = Gain (4 bits)
Vd = Voice data (4 × 8 bits)
Effective Bit Rate = 184 bits/20 msec = 9200 bps Bits 6 to 7 of the first byte of the header contains the packet identifier which identifies the contents of the packet. These bits are defined as follows:
  00=the following voice packet contains silent sound
  01=the following voice/fax packet contains information
  10=the following packet contains telephone signalling or control information
  11=reserved

Silence Suppression

If there is a silence period indicated by the DSP 620 in an empty packet sent to the data processor 318 through the dual port RAM 307, the data processor 318 will not send the silence packets to the remote site. Instead, the data processor will send a two-byte packet indicating no voice information to be sent or the data processor will set a bit in one of the acknowledgement, data, or network control packets to alert the receiving side. The detection and suppression of the transmission of the voice packets frees up bandwidth for the transmission of other data. In this fashion, the use of the bandwidth over the composite link is dynamically allocated between voice, fax and data. Since human speech is typically 60% silence (pauses between spoken words and sentences), a highly efficient multiplexing is accomplished.

HDLC Protocol With Priority Statistical Multiplexing

Figure 14:
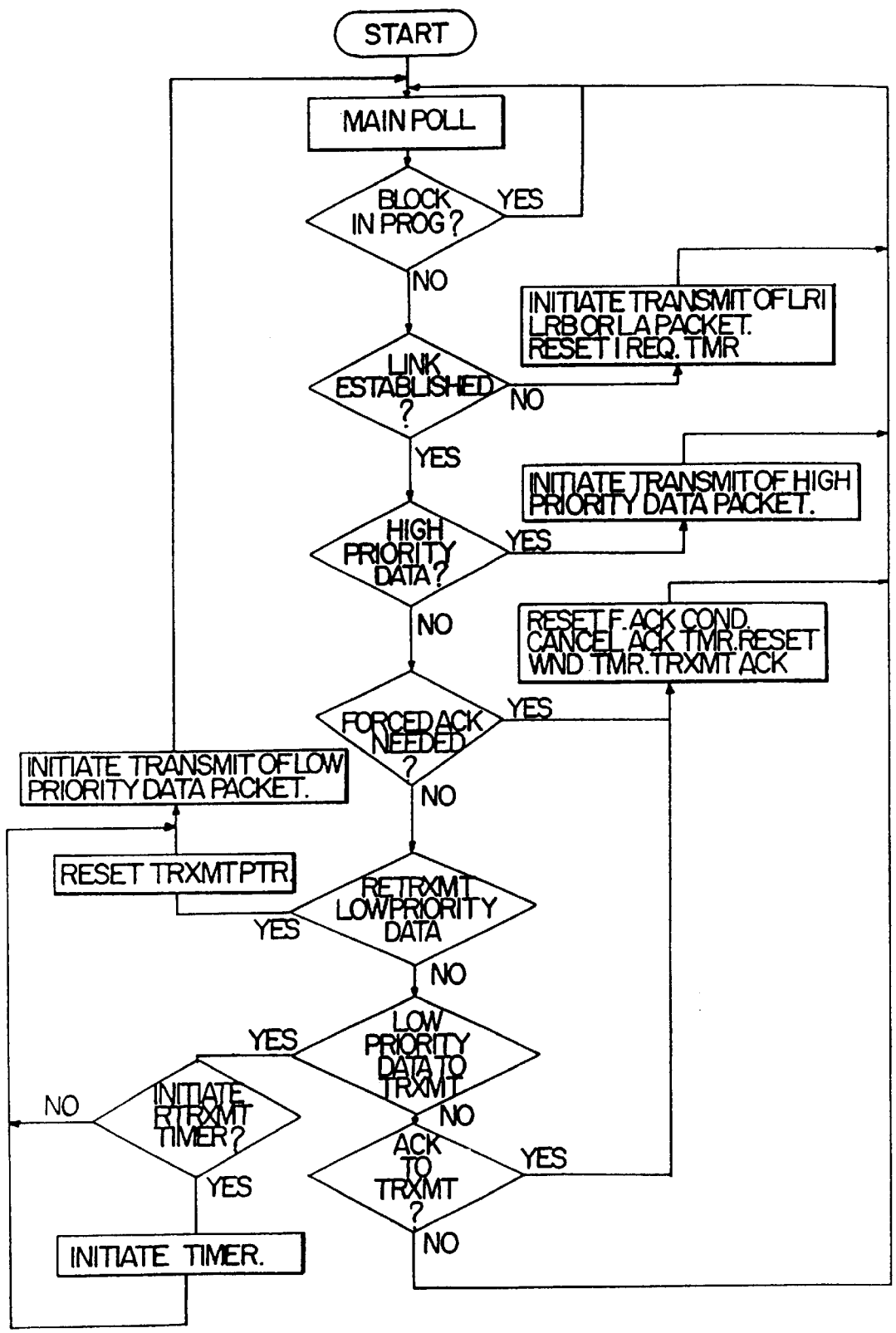
FIG. 14 is a flow chart of the modified HDLC transmission packet protocol using priority statistical multiplexing of the data/voice/fax multiplexor of FIGS. 6A, 6B and 6C.

Referring once again to FIG. 4, the multiplexed data over composite link 313 between the synchronous multiplexors 300 uses priority statistical multiplexing (PSM) on top of a modified form of high-level synchronous data link control (HDLC) to transmit and receive the data packets. In general, this protocol follows the CCITT V.32 standard and the like for handshaking and communication. In the initial handshake period in establishing a communications link, a special link protocol is used. This protocol is described in the flow chart of FIG. 14.

Link Protocol

Figure 15:
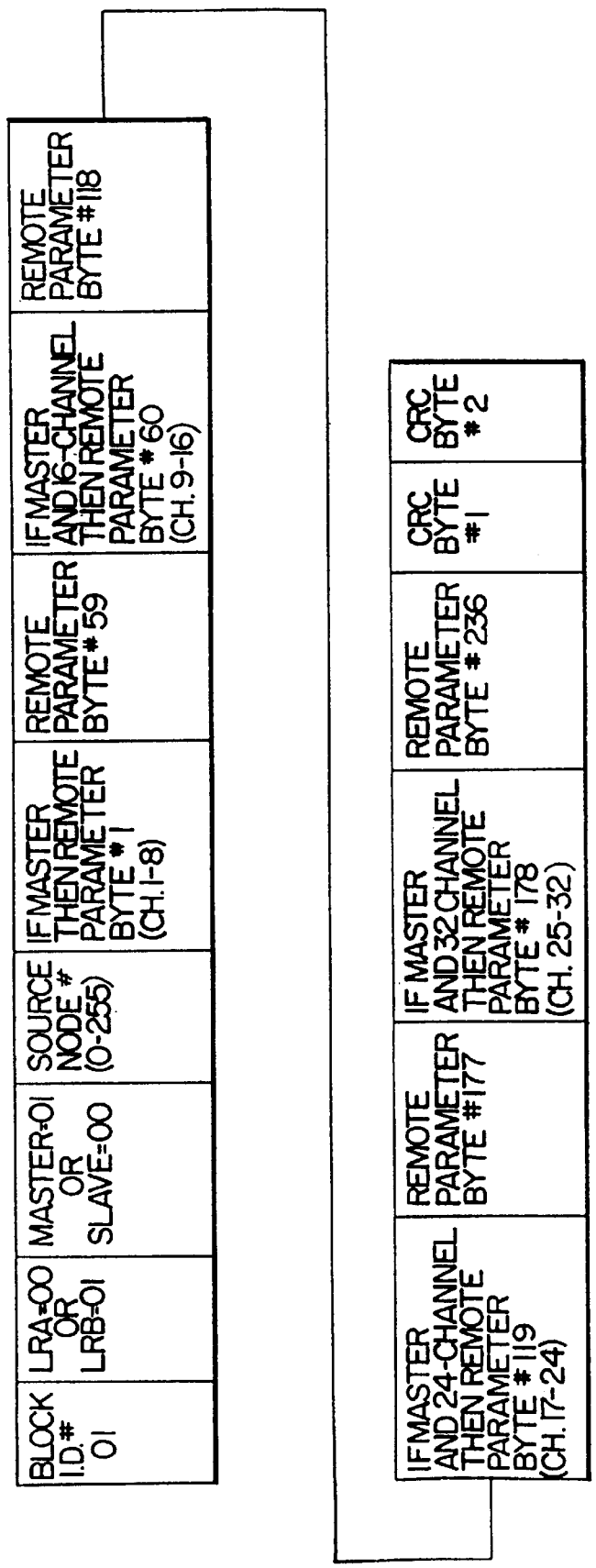
FIG. 15 shows a Link Request Frame used to initiate and establish a connection between multiplexers using modified HDLC with Priority Statistical Multiplexing.

Both multiplexors 300 and the associated composite link (either analog or digital) transmit and receive a link request A or link request B, and a link acknowledgement as shown in FIG. 15. Data cannot be transferred until the link has been established. Link Request A (LRA) is transmitted by the initiating modem to the remote and receiving modem to initiate a link process. This link request is retransmitted every three seconds until link request B is received.

The called, or receiving, modem transmits Link Request B (LRB) to the transmitting multiplexor after LRA is received. LRB is transmitted every three seconds until link acknowledgement is received. Link Acknowledgement (LA) is transmitted to remote multiplexors only after LRA is sent and LRB is received, and LRA is received and LRB is sent, by the transmitting and receiving modems, respectively.

Acknowledgements

Acknowledgement blocks are used to acknowledge valid (uncorrupted) data blocks that were received as well as to relay control information to the remote multiplexer. An acknowledgement is always transmitted with the sequence number of the last received data block as shown in FIG. 19. Forced acknowledgements are acknowledgements which must be transmitted immediately. If one of the following conditions exist, a forced acknowledgement is required:
  1.) Control information needs to be sent to the remote multiplexer. For example, a receive buffer of a local channel is full.

2.) Four data blocks have been received without an acknowledgement.

3.) Two consecutive out-of-sequence data blocks are received.

4.) A window flow time expires (see below).

Unforced acknowledgements are transmitted only after all of the following conditions are checked:

1.) A forced acknowledgement condition doesn't exist.

2.) A retransmissions of a data block is not necessary.

3.) There are not new data blocks to send.

4.) One or more data blocks have been received without an acknowledgement being transmitted.

Data Transfer

A voice/fax data frame is shown in FIG. 16 and an asynchronous channel data frame is shown in FIG. 18. Transfer of data takes place under the following conditions:

A.) A retransmission of data blocks is needed if one or two events occur:
  1.) Duplicate acknowledgements (consecutive acknowledgements with the same sequence number) are received while outstanding data blocks still exist.
  2.) The retransmission timer expires.

Retransmission of a data block should start with the first unforced acknowledgement. Data blocks follow in sequential order.

B.) New data blocks are transmitted only if data exists in the transmit buffer and all of the following conditions are met:
  1.) Forced acknowledgement condition doesn't exist.
  2.) Retransmission of data is not necessary.
  3.) The source channel doesn't have more than four outstanding unacknowledged conditions.
  4.) The total number of outstanding data blocks doesn't exceed seven.

Timers

The following timers are used for the present modified HDLC.

1. A link request timer is a three second timer which is initiated on a reset of the multiplexer 300 or if the Link Request A (described above) is received. This timer is cancelled once the link has been established. This timer is resent each time LRA (Link Request A), LRB (Link Request B) or LA (Link Acknowledgement) is transmitted.

2.) A window flow timer is a three second timer which is initiated after the link has been established. This timer is reset only when an acknowledgement (forced or unforced) is transmitted. If this timer expired, a forced acknowledgement is required.

3.) An acknowledgement timer is a two second timer which is initiated when a valid data block is received. This timer is cancelled when an acknowledgement is transmitted. This timer is never reset but it is either initiated or cancelled. If this timer expires, a forced acknowledgement is required.

4.) A retransmit timer is a four second timer which is initiated at the time a data block is transmitted. This timer is reset when a positive acknowledgement (an acknowledgement for any outstanding data blocks) is received or when a duplicate acknowledgement is received while an outstanding exists. The latter is a retransmission condition. This timer is cancelled when all outstanding data blocks have been acknowledged. This timer should only be initiated if this timer has been cancelled and a data block is to be transmitted. If this timer expires, retransmission of all blocks is required starting with the first unacknowledged block.

Miscellaneous

Receive Status Bytes are bytes which are included in the acknowledgement frame. The number of Receive Status Bytes is a minimum of one byte (for an eight channel multiplexer) and a maximum of four (for a thirty-two channel multiplexer) in the preferred embodiment. One bit is assigned per channel whereby each bit represents the status of the corresponding channel receive buffer (ie.: bit zero of Receive Status Byte number one corresponds to channel 1 and bit five of Receive Status Byte number four corresponds to channel 30). Each bit being set indicates that the corresponding channel receive buffers is full. In such a condition, the remote multiplexer will hold any data block that are intended for that channel. If the bit is clear, then the corresponding receive buffer is clear for receiving data. Any change in status of any of these bits causes a forced acknowledgement to be sent.

Remote Parameter Bytes are byte used to configure the remote slave unit (mutliplexer) 300 and are included in the LRA (Link Request A) and LRB (Link Request B) frames only if the local multiplexer 300 is configured as a master unit. The configuration of a master or slave is by selection of switches on the multiplexer 300. There are 59 bytes per eight channels with a minimum of 59 bytes (for eight channels) and a maximum of 236 bytes (for a 32 channel multiplexer).

The present invention will emulate the Hewlett-Packard ENQ/ACK flow control. If the ENQ is received by a channel port, it is passed through to the remote site and an ACK (acknowledgement) is immediately transmitted by the local channel to the HP device. If the remote channel detects ENQ in its data stream to the HP (Hewlett-Packard) device, it will transmit the ENQ and wait for a ACK (acknowledgement) to be received before transmitting any more data. Once the ACK is received, transmission is continued and the ACK is discarded.

Network Control

The multiplexor 300 may be a part of a series or chain of identical multiplexers 300 connected to pass data, voice and fax information along the chain. Thus, aggregate card 400 of FIG. 6B shows two composite links 610a and 610b which may be connected to "upstream" and "downstream" multiplexer 300. The aggregate card 400 contains pass-through buffers which simply pass along packets to the other multiplexers if those packets are not addressed to the local site.

The network control frame shown in FIG. 17 is used for network congestion control. If the pass-through buffers of the local multiplexer become full, the local multiplexer must tell the upstream multiplexers that are sending packets to stop until the downstream multiplexers have emptied the local pass-through buffers. The network control frame of FIG. 17 is sent upstream to all multiplexers until it is received by the multiplexer on the end of the chain. The packet of FIG. 17 is then returned downstream as a form of acknowledgement that all multiplexers upstream have ceased sending packets.

Priority Statistical Multiplexing

The present invention uses a proprietary priority statistical multiplexing (PSM) paradigm implemented in conjunction with the above-described modified HDLC protocol to allow high-priority (time sensitive) data such as voice, fax, LAN (local area network) synchronous and video to be multiplied with low priority data (such as asynchronous data) over a composite link. The fundamental difference between the two groups of data is the absence of the modified HDLC protocol overhead with high priority data. This absence of the modified HDLC protocol overhead is due to the time-sensitive nature of the high priority data which requires that the high-priority data be transmitted and received with a minimal amount of delay. The time sensitive condition removes any type of error correction or detection scheme, any type of retransmissions or any type of acknowledgements that are associated with the modified HDLC protocol employed with high priority data.

This priority statistical multiplexing uses variable-length packets and statistical multiplexing of low priority channels for efficiency during inactivity (idle time) of higher priority channels. Priority statistical multiplexing also assures predictable and minimal delay of higher priority packets by limiting the maximum length of lower priority packets. The lower priority packet maximum length is determined dynamically by taking the difference between the composite link speed and the combined data rates of all high priority channels for a time interval of 20 milliseconds. The example in Table 3 is for two voice/vax channels (high priority channels) with a 9600 baud voice compression and a single composite link speed of 56K bps. This example indicates the worst case of how long the multiplexer can wait before it must check to see if a non-silent voice packet is available to send.

TABLE 3

Example of Maximum Asynchronous Data Packet Length

Composite link speed = 56,000 bits per second
Combined voice compression rates (2 channels × 9600 bps) = 19,200 bps.
(20 msec) × (56,000 bps) × (1 byte/8 bits) = 140 bytes
(20 msec) × (19,200 bps) × (1 byte/8 bits) = 48 bytes
Maximum length = 140 − 48 − 10 (voice/fax overhead) − 9 (data overhead) = 73 bytes This formula ensures there will be a maximum of 20 milliseconds delay of voice/fax data. The maximum byte length for asynchronous data packets is set at the time the multiplexer is configured and does not change. The multiplexer periodically checks to see if there is a voice or facsimile packet to send over the composite link. If there is no voice to send, a silence packet is found in the dual port RAM and the data processor indicates this to the other side of the composite link without sending the voice or facsimile packet. The indicator used is a two-byte packet instead of the 23 byte packet for the voice of facsimile packet. In the alternative, a one-bit flag may be set in an acknowledgement packet, a data packet or a network control packet to indicate no voice packet is being sent.

Priority statistical multiplexing is also used to pass high priority data through intermediate multiplexers 300 in applications with multiple multiplexers configured in a chain. Priority statistical multiplexing has the ability to route an incoming packet on one composite link out the other composite link after receiving the second byte of the packet. This produces a minimal delay for higher priority packets going through intermediate multiplexers on the network which assures quality and integrity of high priority data.

Demodulating of Facsimile Information

The transmission of facsimile information is performed by demodulating the fax transmissions, sending only the facsimile image packets over the multiplexed composite link and remodulating the facsimile signals at the remote site for transmission over an analog telephone line to a remote facsimile machine. The demodulating and remodulating of the facsimile image packets by the present invention is transparent to the facsimile machines except that certain proprietary facsimile protocols are suppressed by the stripping off the proprietary information from the facsimile header packets. The facsimile tone is demodulated in the digital domain by DSP 620 and the facsimile data is placed in a data packet similar to the voice data packet described above in Table 2 except the header of the packet distinguishes between voice data and facsimile data.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations of variations of the present invention. Therefore, it is manifestly intended that this invention be limited only by the claims and the equivalents thereof.

We claim:

1. A multiplexer, comprising:
   a local area network (LAN) data interface means;
   collection means for collecting LAN data from the LAN data interface means, and for producing therefrom collected LAN data packets;
   a telephone interface means for receiving voice band signals;
   conversion means for converting the voice band signals into digital samples;
   compression means for compressing and encoding the digital samples and for producing therefrom compressed digital voice data;
   means for placing the compressed digital voice data into compressed digital voice data packets;
   multiplexer means connected for receiving the collected LAN data packets, for receiving the compressed digital voice data packets and for multiplexing the collected LAN data packets and the compressed digital voice data packets into a data stream; and
   means for transmitting the data stream.

2. The multiplexer of claim 1, wherein the data stream includes a synchronous data stream.

3. The multiplexer of claim 1, wherein the telephone interface means is further operable for receiving facsimile data and the multiplexer means is further operable for receiving the facsimile data and for multiplexing the collected LAN data packets, the compressed digital voice data packets and the facsimile data into a data stream.

4. The multiplexer of claim 3, wherein the data stream includes a synchronous data stream.

5. The multiplexer of claim 1, wherein the telephone interface means further includes a PBX interface means for connecting to a PBX for exchange of voice or facsimile signals.

6. A method comprising:
   receiving analog voice information signals;
   digitizing the analog voice information signals to produce digital voice information;
   compressing the digital voice information to produce compressed voice information packets;
   collecting local area network (LAN) data and producing therefrom LAN data packets;

multiplexing the compressed voice information packets with the LAN data packets to produce a data stream; and sending the data stream over a composite link.

7. The method of claim 6, wherein multiplexing the compressed voice information packets with the LAN data packets to produce a data stream includes multiplexing the compressed voice information packets with the LAN data packets to produce a synchronous data stream.

8. A multiplexed information network, comprising:
a first multiplexer having a first telephone line interface, a first local area network (LAN) data port, a first data processor connected for receiving LAN data from the first LAN data port and for placing the LAN data into LAN data packets each having separate headers, a first voice channel circuit means connected for receiving voice signals from the first telephone line interface and for digitizing and compressing the voice signals into compressed voice packets each having separate headers, the first data processor further operable for receiving the compressed voice packets from the voice channel circuit means and for multiplexing the LAN data packets and the compressed voice packets into a data stream, and the first data processor further connected to a first line interface for transmitting the data stream;

a second multiplexer having a second telephone line interface, a second LAN data port, a second data processor connected to a second line interface for receiving the data stream, the second data processor operable for demultiplexing the data stream to reproduce the LAN data packets and the compressed voice packets and for sending the compressed voice packets to a second voice channel circuit means, the second data processor further operable for removing the LAN data from the LAN data packets and for sending the LAN data to the second LAN data port, the second voice channel circuit means operable for decompressing and decoding the compressed voice packets to reproduce the voice signals and connected for sending the voice signals to the second telephone line interface; and a composite link connected between the first line interface of the first multiplexer and the second line interface of the second multiplexer.

9. The network of claim 8, wherein the first telephone line interface of the first multiplexer is connected to a PBX and wherein the second telephone line interface of the second multiplexer is connected to a telephone.

10. The network of claim 8, wherein the first telephone line interface of the first multiplexer is connected to a PBX and wherein the second telephone line interface of the second multiplexer is connected to a PBX.

11. The network of claim 8, wherein the first telephone line interface of the first multiplexer is connected to a telephone and wherein the second telephone line interface of the second multiplexer is connected to a telephone.

12. The network of claim 8, wherein the composite link is an analog network link.

13. The network of claim 8, wherein the composite link is a digital network link.

14. The network of claim 8, wherein the composite link is an analog telephone line.

15. The network of claim 8, wherein the composite link is an analog leased line.

16. The network of claim 8, wherein the composite link is a public telephone line.

17. The network of claim 8, wherein the composite link is a private leased line.

18. The network of claim 8, wherein the composite link is a digital line.

19. The network of claim 8, wherein the first multiplexer comprises:
means for determining a link speed between the first multiplexer and the second multiplexer;
means for selecting a time interval for sending high priority data packets each having a header;
means for dynamically assigning a packet size for a low priority data packet having a header with the packet size for the low priority data packet limited in length based upon the link speed and the time interval; and
means for sending as many low priority data packets as will fit between the sending of high priority data packets within the time interval for sending high priority packets.

20. A multiplexer, comprising:
a local area network (LAN) data interface;
collection means for collecting LAN data from the LAN data interface, and for producing therefrom collected LAN data packets each having a header;
a telephone interface for receiving voice band signals;
conversion means for converting the voice band signals into digital samples;
compression means for compressing and encoding the digital samples and for producing therefrom compressed digital voice data;
means for placing the compressed digital voice data into compressed digital voice data packets each having headers;
multiplexer means connected for receiving the collected LAN data packets for receiving the compressed digital voice data packets and for multiplexing the collected LAN data packets and the compressed digital voice data packets into a data stream, the multiplexer means including:
means for determining a link speed between the multiplexer and a second site;
means for selecting a time interval for sending high priority data packets each having a header;
means for dynamically assigning a packet size for a low priority data packet having a header with the packet size for the low priority data packet limited in length based upon the link speed and the time interval; and
means for sending as many low priority data packets as will fit between the sending of high priority data packets within the time interval for sending high priority packets; and
means for transmitting the data stream.

21. The multiplexer of claim 20, wherein the data stream includes a synchronous data stream.

22. The multiplexer of claim 20, wherein the telephone interface is further operable for receiving facsimile data and the multiplexer means is further operable for receiving the facsimile data and for multiplexing the collected LAN data packets, the compressed digital voice data packets and the facsimile data into a data stream.

23. The multiplexer of claim 22, wherein the data stream includes a synchronous data stream.

24. The multiplexer of claim 20, wherein the telephone interface further includes PBX interface means for connecting to a PBX for exchange of voice or facsimile signals.

* * * * *